US012611629B2

(12) United States Patent
Kemp et al.

(10) Patent No.: US 12,611,629 B2
(45) Date of Patent: Apr. 28, 2026

(54) SYSTEMS AND METHODS FOR CAPTURING CARBON DIOXIDE AND REGENERATING A CAPTURE SOLUTION

(71) Applicant: Carbon Engineering ULC, Squamish (CA)

(72) Inventors: Kyle Wayne Kemp, Coquitlam (CA); Andrew Logan Ostericher, Squamish (CA); Douglas Edward Olmstead, Squamish (CA)

(73) Assignee: Carbon Engineering ULC, Squamish (CA)

( * ) Notice: Subject to any disclaimer, the term of this patent is extended or adjusted under 35 U.S.C. 154(b) by 373 days.

(21) Appl. No.: 17/735,943

(22) Filed: May 3, 2022

(65) Prior Publication Data

US 2022/0362707 A1 Nov. 17, 2022

Related U.S. Application Data

(60) Provisional application No. 63/183,533, filed on May 3, 2021.

(51) Int. Cl.
*B01D 53/14* (2006.01)
*B01D 53/78* (2006.01)
(Continued)

(52) U.S. Cl.
CPC ..... *B01D 53/1425* (2013.01); *B01D 53/1475* (2013.01); *B01D 53/78* (2013.01);
(Continued)

(58) Field of Classification Search
CPC .......... B01D 2257/504; B01D 53/1425; B01D 53/1475; B01D 53/78; B01D 61/422;
(Continued)

(56) References Cited

U.S. PATENT DOCUMENTS 7,604,724 B2 10/2009 Mortson
8,088,197 B2 1/2012 Wright et al.
(Continued)

FOREIGN PATENT DOCUMENTS

CA 2592926 1/2009
EP 2163294 3/2010
(Continued)

OTHER PUBLICATIONS

Invitation to Pay Additional Fees in International Application No. PCT/US2022/027523, mailed on Aug. 5, 2022, 21 pages.
(Continued)

*Primary Examiner* — Ciel P Contreras
(74) *Attorney, Agent, or Firm* — Fish & Richardson P.C.

(57) ABSTRACT

Techniques according to the present disclosure include capturing carbon dioxide from a dilute gas source with a $CO_2$ capture solution to form a carbonate-rich capture solution; separating at least a portion of carbonate from the carbonate-rich capture solution; forming an electrodialysis (ED) feed solution; flowing a water stream and the ED feed solution to a bipolar membrane electrodialysis (BPMED) unit; applying an electric potential to the BPMED unit to form at least two ED product streams including a first ED product stream including a hydroxide; and flowing the first ED product stream to use in the capturing the carbon dioxide from the dilute gas source with the $CO_2$ capture solution.

36 Claims, 13 Drawing Sheets

(51) Int. Cl.
    *B01D 61/42*         (2006.01)
    *C25B 1/20*         (2006.01)
    *C25B 1/23*         (2021.01)

(52) U.S. Cl.
    CPC .............. *B01D 61/422* (2013.01); *C25B 1/20* (2013.01); *C25B 1/23* (2021.01); *B01D 2251/304* (2013.01); *B01D 2251/306* (2013.01); *B01D 2251/604* (2013.01); *B01D 2257/504* (2013.01); *B01D 2311/2643* (2022.08)

(58) Field of Classification Search
    CPC ........ B01D 2251/304; B01D 2251/306; B01D 2251/604; B01D 2311/2643; C25B 1/20; C25B 1/23
    See application file for complete search history.

(56) References Cited

U.S. PATENT DOCUMENTS

| | | | |
|---|---|---|---|
| 8,119,091 | B2 | 2/2012 | Keith et al. |
| 8,357,270 | B2 | 1/2013 | Gilliam et al. |
| 8,535,502 | B2 | 9/2013 | Littau et al. |
| 8,679,312 | B2 | 3/2014 | Inoue et al. |
| 8,679,314 | B1 | 3/2014 | Seth et al. |
| 8,894,830 | B2 | 11/2014 | Gilliam et al. |
| 9,493,881 | B2 | 11/2016 | Kosmoski et al. |
| 10,941,046 | B2 | 3/2021 | Mack et al. |
| 10,981,114 | B2 | 4/2021 | Torres et al. |
| 11,219,860 | B1 | 1/2022 | Jakobsen |
| 11,577,202 | B2 | 2/2023 | Demeter |
| 11,857,914 | B2 | 1/2024 | Omosebi et al. |
| 12,006,580 | B2 | 6/2024 | Berlinguette et al. |
| 12,030,016 | B2 | 7/2024 | Cohen-Cole et al. |
| 12,083,478 | B2 | 9/2024 | Lackner |
| 12,115,498 | B2 | 10/2024 | Gobaille-Shaw et al. |
| 12,187,629 | B2 | 1/2025 | Mustafa et al. |
| 12,274,977 | B1 | 4/2025 | Scherpbier et al. |
| 12,331,414 | B2 | 6/2025 | Zhang et al. |
| 2007/0187247 | A1 | 8/2007 | Lackner et al. |
| 2010/0051859 | A1 | 3/2010 | House et al. |
| 2010/0059377 | A1 * | 3/2010 | Littau .................... C02F 1/4693 |
| | | | 204/627 |
| 2015/0083607 | A1 | 3/2015 | Gilliam et al. |
| 2020/0317512 | A1 | 10/2020 | Davis et al. |
| 2021/0001270 | A1 | 1/2021 | Lu et al. |
| 2021/0371282 | A1 | 12/2021 | Ning et al. |
| 2022/0170166 | A1 | 6/2022 | Li et al. |
| 2023/0249133 | A1 | 8/2023 | Oloman |
| 2023/0294043 | A1 | 9/2023 | Makaruk et al. |
| 2023/0390702 | A1 | 12/2023 | Jakobsen |
| 2024/0002246 | A1 | 1/2024 | Luis Alconero et al. |
| 2024/0182340 | A1 | 6/2024 | Atwater et al. |
| 2024/0198280 | A1 | 6/2024 | Behr |
| 2024/0238721 | A1 | 7/2024 | Cohen-Cole et al. |
| 2024/0252980 | A1 | 8/2024 | Ding et al. |
| 2024/0368776 | A1 | 11/2024 | Berlinguette et al. |
| 2024/0392449 | A1 | 11/2024 | Berlinguette et al. |
| 2024/0424446 | A1 | 12/2024 | Gobaille-Shaw et al. |
| 2025/0018340 | A1 | 1/2025 | Zhao et al. |
| 2025/0018341 | A1 | 1/2025 | Lv |
| 2025/0050273 | A1 | 2/2025 | Lackner |
| 2025/0108330 | A1 | 4/2025 | Cai |
| 2025/0128204 | A1 | 4/2025 | Kawatra et al. |
| 2025/0144563 | A1 | 5/2025 | Sahay |
| 2025/0161866 | A1 | 5/2025 | Behr |
| 2025/0170518 | A1 | 5/2025 | Jakobsen et al. |
| 2025/0188626 | A1 | 6/2025 | Kawatra et al. |
| 2025/0283231 | A1 | 9/2025 | Zhang et al. |
| 2025/0325939 | A1 | 10/2025 | Cohen-Cole et al. |
| 2025/0332539 | A1 | 10/2025 | Robinson et al. |

FOREIGN PATENT DOCUMENTS

| | | |
|---|---|---|
| JP | 2012096975 | 5/2012 |
| WO | WO 2006/036396 | 4/2006 |
| WO | WO 2012/050530 A1 | 4/2012 |
| WO | WO 2017205044 | 11/2017 |
| WO | WO 2019204938 | 10/2019 |
| WO | WO 2022040784 | 3/2022 |
| WO | WO 2022192501 | 9/2022 |
| WO | WO 2022195299 | 9/2022 |
| WO | WO 2023/245195 A2 | 12/2023 |
| WO | WO 2024/017932 A1 | 1/2024 |
| WO | WO 2024/110882 A1 | 5/2024 |
| WO | WO 2024/118103 A1 | 6/2024 |
| WO | WO 2024/133948 A1 | 6/2024 |
| WO | WO 2024/165228 A1 | 8/2024 |
| WO | WO 2024/175854 A1 | 8/2024 |
| WO | WO 2024/234105 A1 | 11/2024 |
| WO | WO 2025/016957 A1 | 1/2025 |
| WO | WO 2025/120568 A1 | 6/2025 |
| WO | WO 2025/155846 A1 | 7/2025 |
| WO | WO 2025/202474 A1 | 10/2025 |

OTHER PUBLICATIONS

International Preliminary Report on Patentability in International Application No. PCT/US2022/027523, mailed on Nov. 16, 2023, 18 pages.
Bandi et al., "$CO_2$ Recycling for Hydrogen Storage and Transportation—Electrochemical $CO_2$ Removal and Fixation," Energy Conversion and Management, Jun. 1995, 36(6-9):899-902.
International Search Report and Written Opinion in International Application No. PCT/US2022/027523, mailed on Sep. 28, 2022, 27 pages.
Choi et al., "Membrane distillation crystallization for brine mining and zero liquid discharge: opportunities, challenges, and recent progress," Environ. Sci. Water Res. Technol., 2019, 5(7):1202-1221.
Eisaman et al., "CO2 desorption using high-pressure bipolar membrane electrodialysis," Energy Environ. Sci., 2011, 4(10):4031-4037.
Eisaman et al., "CO2 extraction from seawater using bipolar membrane electrodialysis," Energy Environ. Sci., 2012, 5(6):7346-7352.
Eisaman et al., "CO2 separation using bipolar membrane electrodialysis," Energy Environ. Sci., Apr. 2011, 4(4):1319-1328.
Fink et al., "Electrolytic conversion of carbon capture solutions containing carbonic anhydrase," J. Inorg. Biochem., 2022, 231(111782), 7 pages.
Genders, "Electrochemical salt splitting," Watts New Quarterly Newsletter, Sep. 1995, 1(1), 8 pages.
Giner, Inc., "Direct Air Capture Utilizing Hydrogen-Assisted Carbonate Electrolysis." U.S. Department of Energy—Categorical Exclusion Determination Form, May 2021, 1 page.
Iizuka et al., "Carbon dioxide recovery from carbonate solutions using bipolar membrane electrodialysis," Sep. Purif. Technol., 2012, 101:49-59.
Jaroszek et al., "Ion-exchange membranes in chemical synthesis—a review," Open Chemistry, Dec. 2015, 14(1):1-19.
Li et al., "CO2 electroreduction from carbonate electrolyte," ACS Energy Lett., May 2019, 4:1427-1431.
Li et al., "Electrolytic conversion of bicarbonate into CO in a flow cell," Joule, Jun. 2019, 3:1487-1497.
Nagasawa et al., "A new recovery process of carbon dioxide from alkaline carbonate solution via electrodialysis," AIChE J., Dec. 2009, 55(12):3286-3293.
Prajapati et al., "Migration-assisted, moisture gradient process for ultrafast, continuous CO2 capture from dilute sources at ambient conditions," Energy Environ. Sci, Jan. 2022, 15(2): 680-692, 3 pages (Abstract only).
Shen et al., High performance electrospun bipolar membrane with a 3D junction, Energy Environ. Sci, 2017, 1435-1442, 27 pages.
Shuangchen et al., "Experimental study on desorption of simulated solution after ammonia carbon capture using bipolar membrane electrodialysis," Int. J. Greenh. Gas Control, 2015, 42:690-698.

(56)        References Cited

OTHER PUBLICATIONS

Shuto et al., "CO2 Fixation Process with Waste Cement Powder via Regeneration of Alkali and Acid by Electrodialysis: Effect of Operation Conditions," Ind. Eng. Chem. Res., 2015, 54(25):6569-6577.

Škrtić et al., "Continuous crystallization of potassium carbonate," Chem. Eng. Technol., 1989, 12(1):345-350.

Wei et al., "Comparative study on regenerating sodium hydroxide from the spent caustic by bipolar membrane electrodialysis (BMED) and electro-electrodialysis (EED)," Sep. Purif. Technol., 2013, 118:1-5.

Wei et al., "Regenerating sodium hydroxide from the spent caustic by bipolar membrane electrodialysis (BMED)," Sep. Purif. Technol., 2012, 86: 49-54.

Wilhelm, "Bipolar Membrane Electrodialysis: Membrane Development and Transport Characteristics," Ph.D. thesis, University of Twente, 2001, 242 pages.

Wu et al., "Precipitating Characteristics of Potassium Bicarbonate Using Concentrated Potassium Carbonate Solvent for Carbon Dioxide Capture. Part 1. Nucleation," Ind. Eng. Chem. Res., 2017, 56(23):6764-6774.

Ye et al., "Environmental evaluation of bipolar membrane electrodialysis for NaOH production from wastewater: Conditioning NaOH as a CO2 absorbent," Sep. Purif. Technol., 2015, 144, 206-214.

Ye et al., "Kinetic behavior of potassium bicarbonate crystallization in a carbonate-based CO2 absorption process," Chem. Eng. Res. Des., 2015, 93:136-147.

Ye et al., "Membrane Crystallization of Sodium Carbonate for Carbon Dioxide Recovery: Effect of Impurities on the Crystal Morphology," Cryst. Growth Des., 2013, 13(6):2362-2372.

Office Action in Australian Appln. No. 202270091, mailed on Sep. 22, 2025, 5 pages.

Office Action in European Appln. No. 22725055.9, mailed on Oct. 17, 2025, 10 pages.

AU Office Action in Australian Appln. No. 2022270091, mailed on Mar. 4, 2026, 7 pages.

* cited by examiner

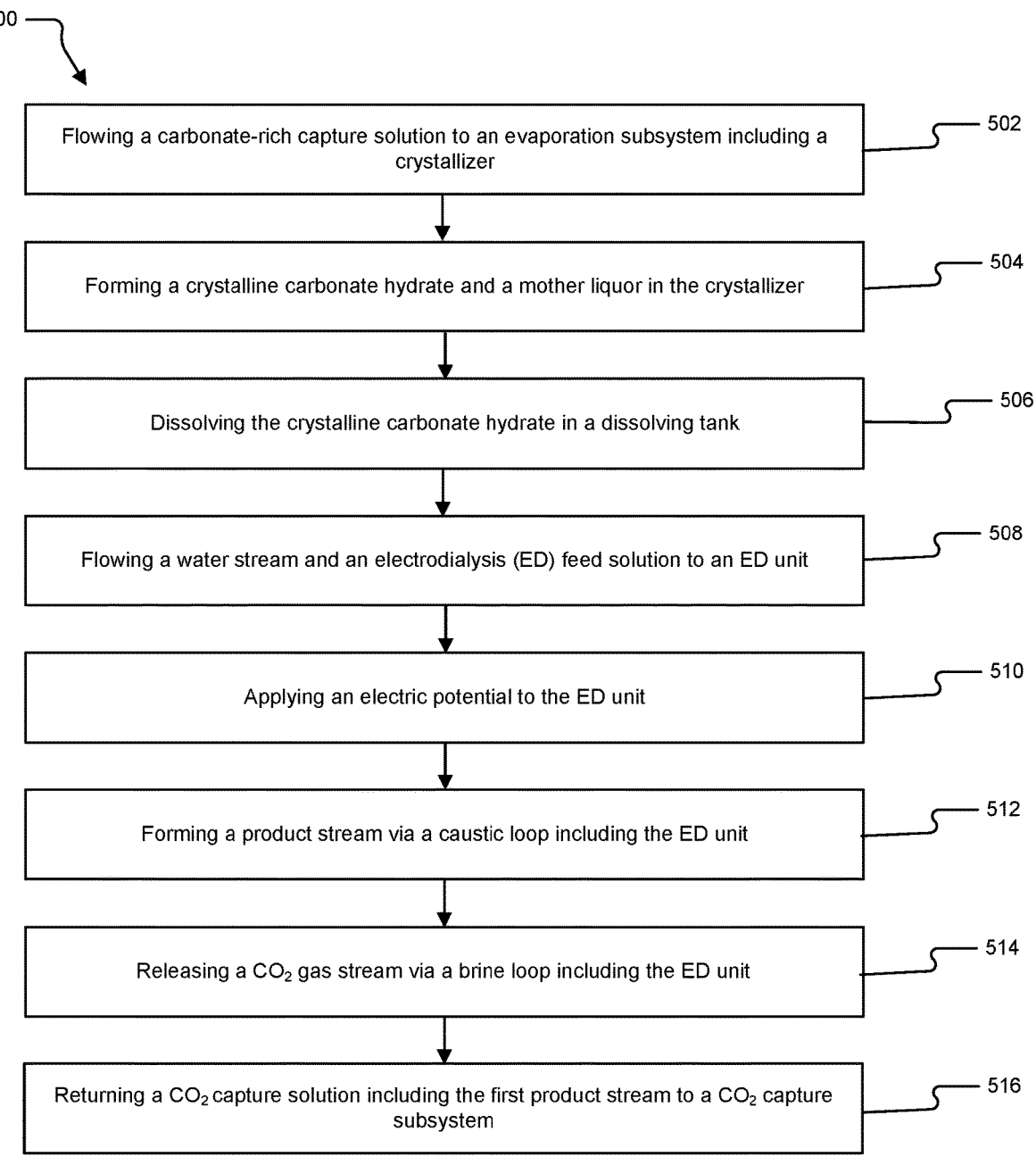

500

Flowing a carbonate-rich capture solution to an evaporation subsystem including a crystallizer — 502

Forming a crystalline carbonate hydrate and a mother liquor in the crystallizer — 504

Dissolving the crystalline carbonate hydrate in a dissolving tank — 506

Flowing a water stream and an electrodialysis (ED) feed solution to an ED unit — 508

Applying an electric potential to the ED unit — 510

Forming a product stream via a caustic loop including the ED unit — 512

Releasing a $CO_2$ gas stream via a brine loop including the ED unit — 514

Returning a $CO_2$ capture solution including the first product stream to a $CO_2$ capture subsystem — 516

FIG. 5

SYSTEMS AND METHODS FOR CAPTURING CARBON DIOXIDE AND REGENERATING A CAPTURE SOLUTION

CROSS-REFERENCE TO RELATED APPLICATIONS

This application claims priority under 35 U.S.C. § 119 to U.S. Provisional Patent Application Ser. No. 63/183,533, filed on May 3, 2021, the entire contents of which are incorporated by reference herein.

TECHNICAL FIELD

This disclosure relates to systems and methods for capturing carbon dioxide ($CO_2$) and regenerating a $CO_2$ capture solution.

BACKGROUND

Capturing carbon dioxide ($CO_2$) from the atmosphere is one approach to mitigating greenhouse gas emissions and slowing climate change. However, many technologies designed for $CO_2$ capture from point sources, such as flue gas of industrial facilities, are generally ineffective in capturing $CO_2$ from the atmosphere due to the significantly lower $CO_2$ concentrations and large volumes of air required to process. In recent years, progress has been made in finding technologies better suited to capture $CO_2$ directly from the atmosphere.

Some direct air capture (DAC) systems use a liquid sorbent (sometimes referred to as a solvent or capture solution) to capture $CO_2$ from the atmosphere. An example of such a gas-liquid contact system would be one that is based on cooling tower designs where a fan is used to draw air across a high surface area packing fill that is wetted with a capture solution comprising the liquid sorbent. In some cases, the capture solution can be an aqueous alkaline solution that forms a carbonate-rich solution when reacted with $CO_2$ in the air. The carbonate-rich capture solution is further processed downstream to regenerate a carbonate-lean solution and to release a concentrated carbon stream, for example, CO, $CO_2$ or other carbon products.

A known thermochemical process for regenerating a capture solution and releasing $CO_2$ is the pelletized calcium technology. This process includes precipitating carbonate to form calcium carbonate ($CaCO_3$) solids, calcining the $CaCO_3$ solids to recover the capture $CO_2$, thereby producing calcium oxide (CaO) which is hydrated to produce calcium hydroxide ($Ca(OH)_2$). The $Ca(OH)_2$ is then reacted with an alkali carbonate (e.g., potassium carbonate $K_2CO_3$ or sodium carbonate $Na_2CO_3$) to regenerate the capture solution (e.g., potassium hydroxide KOH or sodium hydroxide NaOH). Integrating the thermochemical regeneration process with a DAC system has enabled $CO_2$ capture and recovery at a commercial scale.

SUMMARY

In an example implementation, a method includes capturing carbon dioxide from a dilute gas source with a $CO_2$ capture solution to form a carbonate-rich capture solution; separating at least a portion of carbonate from the carbonate-rich capture solution; forming an electrodialysis (ED) feed solution; flowing a water stream and the ED feed solution to a bipolar membrane electrodialysis (BPMED) unit; applying an electric potential to the BPMED unit to form at least two ED product streams including a first ED product stream that includes a hydroxide; and flowing the first ED product stream to use in the capturing the carbon dioxide from the dilute gas source with the $CO_2$ capture solution.

In an aspect combinable with the example implementation, applying the electric potential to the BPMED unit includes applying at least a portion of the electric potential to the BPMED unit to form the first ED product stream and a second ED product stream.

In another aspect combinable with any of the previous aspects, the second ED product stream includes carbonic acid.

Another aspect combinable with any of the previous aspects further includes recovering at least a portion of a carbon dioxide gas stream from the second ED product stream.

In another aspect combinable with any of the previous aspects, recovering at least the portion of the carbon dioxide gas stream from the second ED product stream includes recovering at least the portion of the carbon dioxide gas stream from the second ED product stream to form a brine stream, and separating at least a portion of carbonate from the carbonate-rich capture solution includes crystallizing the portion of carbonate to form a crystalline carbonate hydrate.

Another aspect combinable with any of the previous aspects further includes dissolving the crystalline carbonate hydrate and mixing the dissolved crystalline carbonate hydrate with the brine stream to form the ED feed solution before the flowing the water and the ED feed solution to the BPMED unit.

In another aspect combinable with any of the previous aspects, recovering the portion of the carbon dioxide gas stream from the second ED product stream to form the brine stream includes recovering the portion of the carbon dioxide gas stream in a flash tank.

Another aspect combinable with any of the previous aspects further includes flowing the brine stream from the flash tank to use in the dissolving the crystalline carbonate hydrate and mixing the dissolved crystalline carbonate hydrate with the brine stream to form the ED feed solution.

Another aspect combinable with any of the previous aspects further includes flowing the carbon dioxide gas stream to a downstream process including at least one of: a compression unit, a fuel synthesis system, a syngas generation reactor, or an electrolyzer cell; and yielding one or more downstream products including at least one of: syngas, CO, $H_2$, or water.

In another aspect combinable with any of the previous aspects, the second ED product stream includes a proton-shuttling species.

Another aspect combinable with any of the previous aspects further includes reacting the second ED product stream with the portion of carbonate to recover the carbon dioxide gas and to form the ED feed solution.

In another aspect combinable with any of the previous aspects, reacting the second ED product stream with the portion of carbonate to recover the carbon dioxide gas includes reacting the proton-shuttling species of the second ED product stream with the portion of carbonate to form carbonic acid and the ED feed solution.

Another aspect combinable with any of the previous aspects further includes flowing the carbon dioxide gas to a downstream process including at least one of: a compression unit, a fuel synthesis system, a syngas generation reactor, or an electrolyzer cell; and yielding one or more downstream products including at least one of: syngas, CO, $H_2$, or water.

In another aspect combinable with any of the previous aspects, reacting the second ED product stream with the portion of carbonate includes reacting the proton-shuttling species including bisulfate with the portion of carbonate.

Another aspect combinable with any of the previous aspects further includes flowing the ED feed solution through an ion exchanger before flowing the water and the ED feed solution to the BPMED unit.

Another aspect combinable with any of the previous aspects further includes separating a BPMED recycle stream from the first ED product stream, and returning the BPMED recycle stream to the BPMED unit.

In another aspect combinable with any of the previous aspects, separating the portion of carbonate from the carbonate-rich capture solution includes flowing the carbonate-rich capture solution through a nanofiltration unit to form a nanofiltration (NF) retentate stream including a carbonate-rich mixture, and to form a NF permeate stream including a hydroxide-rich mixture, and flowing the water and the ED feed solution to the BPMED unit includes flowing the ED feed solution including at least a portion of the NF retentate stream to the BPMED unit.

Another aspect combinable with any of the previous aspects further includes recovering a carbon dioxide gas from the second ED product stream to form a brine stream; flowing the brine stream to a reverse osmosis (RO) unit to form an RO retentate stream including a bicarbonate-rich solution and to form an RO permeate stream including water; and combining the RO retentate stream with the NF retentate stream to form the ED feed solution.

Another aspect combinable with any of the previous aspects further includes flowing at least a portion of the NF permeate stream to use in the capturing the carbon dioxide from the dilute gas source with the CO$_2$ capture solution.

Another aspect combinable with any of the previous aspects further includes flowing the NF retentate stream to an ion exchanger downstream of the nanofiltration unit to form an ion exchange regenerate waste stream and at least a portion of the ED feed solution.

Another aspect combinable with any of the previous aspects further includes separating a BPMED recycle stream including hydroxide from the first ED product stream, and flowing the BPMED recycle stream to the BPMED unit.

Another aspect combinable with any of the previous aspects further includes combining at least a portion of the RO permeate stream including water with the first ED product stream to form the BPMED recycle stream.

Another aspect combinable with any of the previous aspects further includes operating the BPMED unit at a pH between 7 and 12.

Another aspect combinable with any of the previous aspects further includes operating the BPMED unit with hydrogen ion concentrations ranging between 0.001 M and 2.5 M.

Another aspect combinable with any of the previous aspects further includes increasing a concentration of hydroxide in the first ED product stream to form the CO$_2$ capture solution before capturing the carbon dioxide from the dilute gas source with the CO$_2$ capture solution.

In another aspect combinable with any of the previous aspects, increasing the concentration of hydroxide in the first ED product stream includes evaporating water from the first ED product stream.

In another aspect combinable with any of the previous aspects, separating the portion of carbonate from the carbonate-rich capture solution includes increasing the concentration of carbonate in the carbonate-rich capture solution by crystallizing the carbonate-rich capture solution to form a mother liquor and a crystalline carbonate hydrate.

Another aspect combinable with any of the previous aspects further includes dissolving at least a portion of the crystalline carbonate hydrate to form the portion of carbonate; and mixing the portion of carbonate with the brine stream to form the ED feed solution.

Another aspect combinable with any of the previous aspects further includes dissolving at least a portion of the crystalline carbonate hydrate to form the portion of carbonate; and reacting the portion of carbonate with a proton-shuttling species in the second ED product stream to form the ED feed solution.

Another aspect combinable with any of the previous aspects further includes evaporating water from the carbonate-rich capture solution to increase a concentration of carbonate before crystallizing the carbonate-rich capture solution.

Another aspect combinable with any of the previous aspects further includes combining at least a portion of the mother liquor with at least a portion of the CO$_2$ capture solution for use in the capturing the carbon dioxide from the dilute gas source with the CO$_2$ capture solution.

In another aspect combinable with any of the previous aspects, the crystalline carbonate hydrate includes at least one of: a potassium carbonate sesquihydrate (K$_2$CO$_3$·1.5 H$_2$O), a sodium carbonate decahydrate (Na$_2$CO$_3$·10 H$_2$O), a potassium sodium carbonate hexahydrate (KNaCO$_3$·6 H$_2$O), or an anhydrous carbonate.

In another aspect combinable with any of the previous aspects, separating at least a portion of carbonate from the carbonate-rich capture solution includes crystallizing the carbonate-rich capture solution to form a low solids stream and a high solids stream including a crystalline carbonate hydrate, the low solids stream having a higher liquid-to-solid ratio than the high solids stream.

Another aspect combinable with any of the previous aspects further includes dissolving the crystalline carbonate hydrate of the high solids stream in an aqueous solution and mixing with a brine stream to form the ED feed solution; and returning the low solids stream to use in the crystallizing of the carbonate-rich capture solution.

In another aspect combinable with any of the previous aspects, separating the portion of carbonate in the carbonate-rich capture solution includes flowing the carbonate-rich capture solution through a nanofiltration unit.

In another aspect combinable with any of the previous aspects, flowing the carbonate-rich capture solution through a nanofiltration unit includes flowing the carbonate-rich capture solution through the nanofiltration unit to form a NF retentate stream including a carbonate-rich mixture, and to form a NF permeate stream including a hydroxide-rich mixture.

Another aspect combinable with any of the previous aspects further includes returning at least a portion of the NF permeate stream to use in the capturing the carbon dioxide with the CO$_2$ capture solution; and crystallizing at least a portion of the NF retentate stream to form a mother liquor and a crystalline carbonate hydrate.

In another aspect combinable with any of the previous aspects, flowing the carbonate-rich capture solution through a nanofiltration unit includes rejecting at least 85% of carbonate ions.

Another aspect combinable with any of the previous aspects further includes flowing a cell feed solution including a bicarbonate-rich solution to a CO$_2$ electroreduction unit; applying the electric potential to the CO$_2$ electroreduction unit to perform one or more reduction reactions on the cell feed solution; and performing a reduction reaction on the cell feed solution to yield one or more reduced products.

In another aspect combinable with any of the previous aspects, yielding one or more reduced products includes yielding at least one of: syngas, CO, $H_2$, formate, methane, ethylene, or ethanol.

In another aspect combinable with any of the previous aspects, capturing carbon dioxide from a dilute gas source with the $CO_2$ capture solution to form the carbonate-rich capture solution includes capturing carbon dioxide with the $CO_2$ capture solution in at least one of: a gas-liquid contactor, an air contactor, a spray tower, a liquid-gas scrubber, a venturi scrubber, a packed tower, a single cell air contactor, a dual cell air contactor, or a multi cell air contactor.

In another example implementation, an electrochemical system for regenerating a $CO_2$ capture solution for capturing carbon dioxide from a dilute gas source, the electrochemical system includes a carbonate separation subsystem configured to receive a carbonate-rich capture solution from a $CO_2$ capture subsystem and separate at least a portion of carbonate from the carbonate-rich capture solution; and a regeneration subsystem fluidly coupled to the carbonate separation subsystem, the regeneration subsystem including a bipolar membrane electrodialysis (BPMED) unit fluidly coupled to the carbonate separation subsystem. The BPMED unit includes at least one cation exchange membrane alternating with at least one bipolar membrane. The BPMED unit is configured to: receive an electrodialysis (ED) feed solution and a water stream; and yield at least two ED product streams including a first ED product stream that includes a hydroxide.

In an aspect combinable with the example implementation, the at least one cation exchange membrane is configured to transport alkali metal ions, and the at least one bipolar membrane is operable to provide hydroxyl ions.

In another aspect combinable with any of the previous aspects, the carbonate-rich capture solution includes at least one of: $K_2CO_3$, $Na_2CO_3$, or a combination thereof.

Another aspect combinable with any of the previous aspects further includes a $CO_2$ capture subsystem fluidly coupled to the carbonate separation subsystem and fluidly coupled to the regeneration subsystem, the $CO_2$ capture subsystem configured to receive the $CO_2$ capture solution including at least one of: KOH, NaOH, additives, or a combination thereof.

In another aspect combinable with any of the previous aspects, the carbonate separation subsystem includes a primary caustic evaporator fluidly coupled to the $CO_2$ capture subsystem and operable to concentrate the carbonate-rich capture solution.

In another aspect combinable with any of the previous aspects, the carbonate separation subsystem includes a crystallizer fluidly coupled to the primary caustic evaporator, the crystallizer operable to concentrate the carbonate-rich capture solution received from the primary caustic evaporator.

In another aspect combinable with any of the previous aspects, the primary caustic evaporator includes at least one of: a mechanical vapor recompression (MVR) evaporator or a multi-effect evaporator.

In another aspect combinable with any of the previous aspects, the carbonate separation subsystem includes a nanofiltration unit operable to concentrate the carbonate-rich capture solution; and a crystallizer fluidly coupled to the nanofiltration unit and operable to crystallize the carbonate-rich capture solution received from the nanofiltration unit to form a crystalline carbonate hydrate.

In another aspect combinable with any of the previous aspects, the nanofiltration unit is operable to reject at least 85% of carbonate ions.

In another aspect combinable with any of the previous aspects, the nanofiltration unit is operable at a pH range of 2 to 14.

In another aspect combinable with any of the previous aspects, the crystallizer includes at least one of: a chiller crystallizer, an evaporative crystallizer, a eutectic freeze crystallizer, a cooling crystallizer, or a membrane distillation crystallizer.

In another aspect combinable with any of the previous aspects, the regeneration subsystem includes an auxiliary caustic evaporator fluidly coupled to the $CO_2$ capture subsystem and to the BPMED unit, the auxiliary caustic evaporator operable to concentrate the first ED product stream having the hydroxide.

In another aspect combinable with any of the previous aspects, the auxiliary caustic evaporator includes at least one of: a mechanical vapor recompression (MVR) evaporator or a multi-effect evaporator.

In another aspect combinable with any of the previous aspects, the regeneration subsystem includes a crystallizer operable to crystallize the carbonate-rich capture solution to form a crystalline carbonate hydrate; and a dissolving tank fluidly coupled to the crystallizer, the dissolving tank configured to dissolve the crystalline carbonate hydrate.

In another aspect combinable with any of the previous aspects, the regeneration subsystem includes a flash tank fluidly coupled to the BPMED unit and operable to recover a carbon dioxide gas stream from a second product stream of the at least two product streams yielded by the BPMED unit.

In another aspect combinable with any of the previous aspects, the BPMED unit of the regeneration subsystem is electrically coupled to a low carbon intensity electricity source including an intermittent electricity source.

Another aspect combinable with any of the previous aspects further includes at least one of: a compression unit, a fuel synthesis system, a syngas generation reactor, or an electrolyzer cell.

In another aspect combinable with any of the previous aspects, the carbonate separation subsystem includes a crystallizer operable to concentrate the carbonate-rich capture solution into a crystalline carbonate hydrate; a solids separator fluidly coupled to the crystallizer, the solids separator configured to form a low solids stream and to form a high solids stream including a crystalline carbonate hydrate; and a dissolving tank fluidly coupled to the solids separator, the dissolving tank configured to receive the high solids stream from the solids separator and to dissolve the crystalline carbonate hydrate of the high solids stream.

In another aspect combinable with any of the previous aspects, the regeneration subsystem includes an ion exchanger fluidly coupled to the dissolving tank and the BPMED unit, the ion exchanger configured to remove a portion of divalent cations and multivalent cations flowing to the BPMED unit.

In another aspect combinable with any of the previous aspects, the carbonate separation subsystem is configured to receive the $CO_2$ capture solution including potassium hydroxide KOH, sodium hydroxide NaOH, additives, or a combination thereof.

In another aspect combinable with any of the previous aspects, the carbonate-rich capture solution includes potassium carbonate $K_2CO_3$, sodium carbonate $Na_2CO_3$, or a combination thereof.

In another aspect combinable with any of the previous aspects, the $CO_2$ capture subsystem includes at least one of: a gas-liquid contactor, air contactor, spray tower, liquid-gas scrubber, venturi scrubber, packed tower, single cell air contactor, dual cell air contactor, or multi cell air contactor.

In another example implementation, an electrochemical system for generating reduced products from carbon dioxide from a dilute gas source includes a $CO_2$ capture subsystem configured to generate a carbonate-rich capture solution; a carbonate separation subsystem fluidly coupled to the $CO_2$ capture subsystem and operable to receive the carbonate-rich capture solution, the carbonate separation subsystem including a crystallizer configured to form a crystalline carbonate hydrate at least in part from the carbonate-rich capture solution; and a products generation subsystem that is fluidly coupled to the $CO_2$ capture subsystem, and is fluidly coupled to the carbonate separation subsystem via the crystallizer. The products generation subsystem includes a dissolving tank fluidly coupled to the crystallizer, the dissolving tank configured to dissolve the crystalline carbonate hydrate; and a $CO_2$ electroreduction unit fluidly coupled to the dissolving tank, the $CO_2$ electroreduction unit including one or more bipolar membranes and a catalyst configured to yield one or more reduced products.

In an aspect combinable with the example implementation, the $CO_2$ electroreduction unit yields one or more reduced products from a cell feed solution including a bicarbonate-rich solution.

In another aspect combinable with any of the previous aspects, the one or more reduced products includes at least one of: syngas, CO, $H_2$, formate, methane, ethylene, or ethanol.

In another example implementation, an electrochemical system for regenerating a capture solution from a dilute gas source includes a carbonate separation subsystem configured to receive the $CO_2$ capture solution, and to form a carbonate-rich capture solution having a concentration of carbonate greater than the concentration of carbonate in the $CO_2$ capture solution; and a regeneration subsystem that is fluidly coupled to the carbonate separation subsystem, the regeneration subsystem including an electrodialysis (ED) unit including a gas diffusion electrode (GDE) and a cation exchange membrane.

In another example implementation, a method for regenerating a capture solution for capturing carbon dioxide from a dilute gas source includes separating at least a portion of carbonate from a carbonate-rich capture solution; flowing an electrodialysis (ED) feed solution including a carbonate-bicarbonate mixture to an ED unit including a gas diffusion electrode (GDE); flowing a water stream and a hydrogen feed stream to the ED unit including the GDE; applying an electric potential to the ED unit to form a plurality of ED product streams, the plurality of GDE product streams including a first ED product stream including hydroxide and hydrogen, a second ED product stream including bicarbonate and water, and a gaseous carbon dioxide stream; separating the first ED product stream into a $CO_2$ capture solution and a hydrogen-rich stream; and diffusing the gaseous carbon dioxide stream through the GDE of the ED unit.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flowchart illustrating an example method for regenerating a $CO_2$ capture solution and recovering $CO_2$ via an electrochemical system.

DETAILED DESCRIPTION

Figure 1:
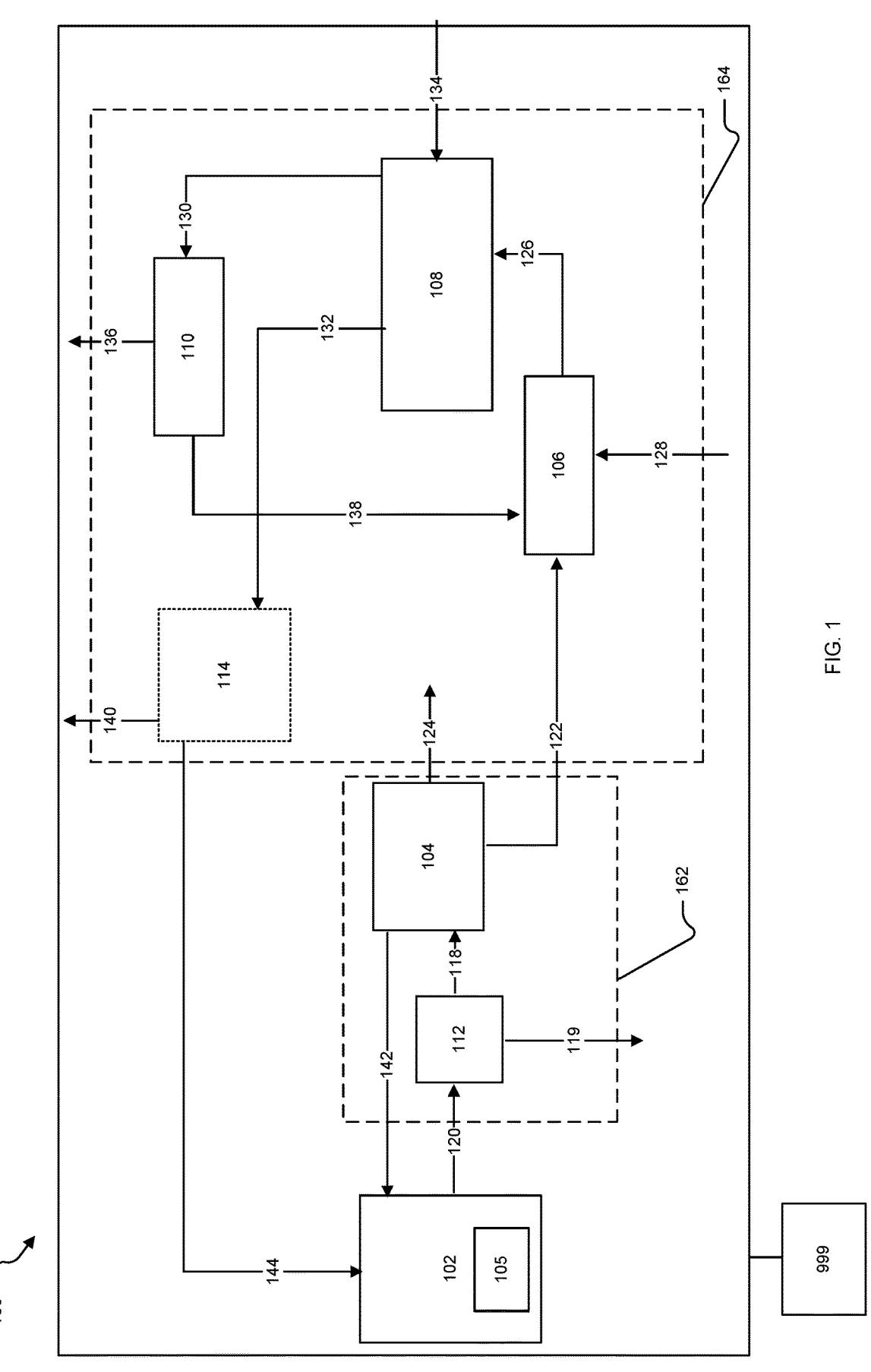
FIG. 1 is a block flow diagram illustrating an example electrochemical system for regenerating capture solution and recovering $CO_2$ by employing direct protonation.

The present disclosure describes systems and methods for capturing $CO_2$ from a dilute source (such as the atmosphere or ambient air) with a capture solution, regenerating the capture solution, and recovering the $CO_2$ using electrochemical processes. $CO_2$ concentrations in dilute sources (around 400-420 ppm) such as atmospheric air are much lower than $CO_2$ concentrations in point sources (around 5-15% v/v) such as flue gas. Mass transfer kinetics are favourable for $CO_2$ capture from point sources. Thus, design considerations for a $CO_2$ capture subsystem and capture solution regeneration subsystem are different for dilute sources when compared to point sources. The electrochemical systems and methods described herein include a $CO_2$ capture subsystem coupled to a capture solution regeneration subsystem via a carbonate separation subsystem. The carbonate separation subsystem bridging the $CO_2$ capture subsystem to the capture solution regeneration system allows for the subsystems to be operationally decoupled from one another, which yields several advantages.

The $CO_2$ capture subsystem can operate in a wider range of ambient conditions because it is decoupled from downstream processes by the carbonate separation subsystem. The carbonate separation subsystem forms a crystalline carbonate hydrate, and the duty required to form this product is determined by the capture solution composition and its position relative to the saturation curve of the DIC species (e.g., the carbon saturation curve). For instance, in conditions where a high-ionic strength capture solution is used (e.g., high-hydroxide for faster capture kinetics or high-carbonate for higher crystallizer recovery), the carbonate separation subsystem can require a low duty to reach saturation and form crystalline carbonate hydrate since the capture solution is close to the saturation curve. In contrast, in conditions where a dilute capture solution is needed (e.g., arid climates with high evaporative losses), the carbonate separation subsystem can require a high duty to reach saturation and form crystalline carbonate hydrate. Thus, the $CO_2$ capture subsystem can equilibrate to environmental temperature and relative humidity without significantly affecting the capture solution regeneration subsystem downstream. The evaporative load resulting from equilibrating is accommodated by units in the carbonate separation subsystem that bridges the other two subsystems. The solubility of carbonate salt in the capture solution dictates the duty on the carbonate separation subsystem, as the carbonate separation subsystem is the buffer that provides pure or nearly pure carbonate to the capture solution regeneration subsystem. Thus, capture solutions employed in the $CO_2$ capture subsystem can be optimized for capture (e.g., high hydroxide, low carbonate) or for improving water balance and evaporation costs, in consideration of relative humidity equilibria.

The electrochemical systems described herein allow for advantages such as adaptability to environmental conditions and cold weather operation. Since the carbonate separation subsystem can carry the load of the $CO_2$ capture subsystem, it enables a wide range of operating conditions for the $CO_2$ capture subsystem. The $CO_2$ capture subsystem can operate anywhere under the carbonate saturation curve while maintaining a pure or nearly pure carbonate stream (which can be achieved by separating and dissolving crystalline carbonate hydrates, for example) to the electrodialysis (ED) unit. This enables the $CO_2$ capture subsystem to operate at high ionic strengths and at close to the saturation line, where the freezing point of the solution is significantly decreased as a result. For example, the $CO_2$ capture subsystem can operate with a capture solution that includes high hydroxide concentrations which can enable a higher capture rate.

Another advantage of the electrochemical systems described herein is load flexibility (ramping). The main energy driver of the system is the ED unit. In some implementations, the ED unit can include a bipolar membrane electrodialysis unit (BPMED). In some implementations, the ED unit can include a gas diffusion electrode (GDE). Because the ED unit is an electrochemical cell, it can simply have power supply cut, reduced, or ramped up as necessary. This is advantageous over equipment that are sometimes used in a calcium regeneration process, such as fluidized bed reactors and high temperature calciners, which cannot easily be ramped. Further, the electrochemical systems enable elimination of insoluble precipitates. In particular, sodium carbonate and potassium carbonate are highly water soluble, and if these salts were to crystallize in unwanted places or foul equipment, a simple water wash will de-foul.

Throughout the disclosure, the terms "air contactor" and "gas-liquid contactor" are used interchangeably to describe an element of a $CO_2$ capture subsystem that employs a sorbent (for example, a liquid capture solution) to absorb carbon dioxide from a dilute gas source, such as ambient air or atmospheric air.

The electrochemical systems and methods described herein can allow the capture solution regeneration subsystem to be used in conjunction with various different styles of $CO_2$ capture subsystems, including air contactors such as cooling-tower style gas-liquid contactors, spray towers, liquid-gas scrubbers, venturi scrubbers, packed towers, and other systems designed to remove at least a portion of a particular gas component from a larger gas stream using a liquid sorbent. Since the subsystems can be easily decoupled from one another and are modular, the electrochemical systems have the benefit of scale flexibility. The subsystems can be sized to accommodate capacities ranging from lab-scale to industrial or commercial scale. The electrochemical systems are adaptable to various environmental conditions and low carbon intensity electricity generation, including intermittent sources (e.g., wind, solar). The resulting $CO_2$ product as a feedstock for downstream products manufacturing can yield other carbon products that are inherently low in carbon emissions. Intermittent electricity sources, such as wind and solar energy, tend to fluctuate and are difficult to control. Intermittent electricity sources typically generate electricity only periodically. The ensuing electrochemical system and methods have a relatively fast ramp rate to allow for coupling with low carbon intensity electricity sources including intermittent electricity sources and non-intermittent electricity sources such as hydro, nuclear, and biomass.

The electrochemical systems can include a $CO_2$ capture subsystem coupled to a capture solution regeneration subsystem via a carbonate separation subsystem. $CO_2$ from ambient air can be captured by bringing the air into contact with a capture solution comprising an alkali hydroxide (e.g., KOH, NaOH, or a combination thereof) in a gas-liquid contactor such as an air contactor. In some cases, the air contactor or gas-liquid contactor can be designed based on cooling tower technology or from retrofitting an existing cooling tower system. Reacting $CO_2$ in the air with the alkaline capture solution can form a carbonate-rich capture solution (e.g., $K_2CO_3$, $Na_2CO_3$, or a combination thereof), which must be processed to recover the captured $CO_2$ for downstream use and to regenerate the alkali hydroxide in the capture solution.

Figure 9:
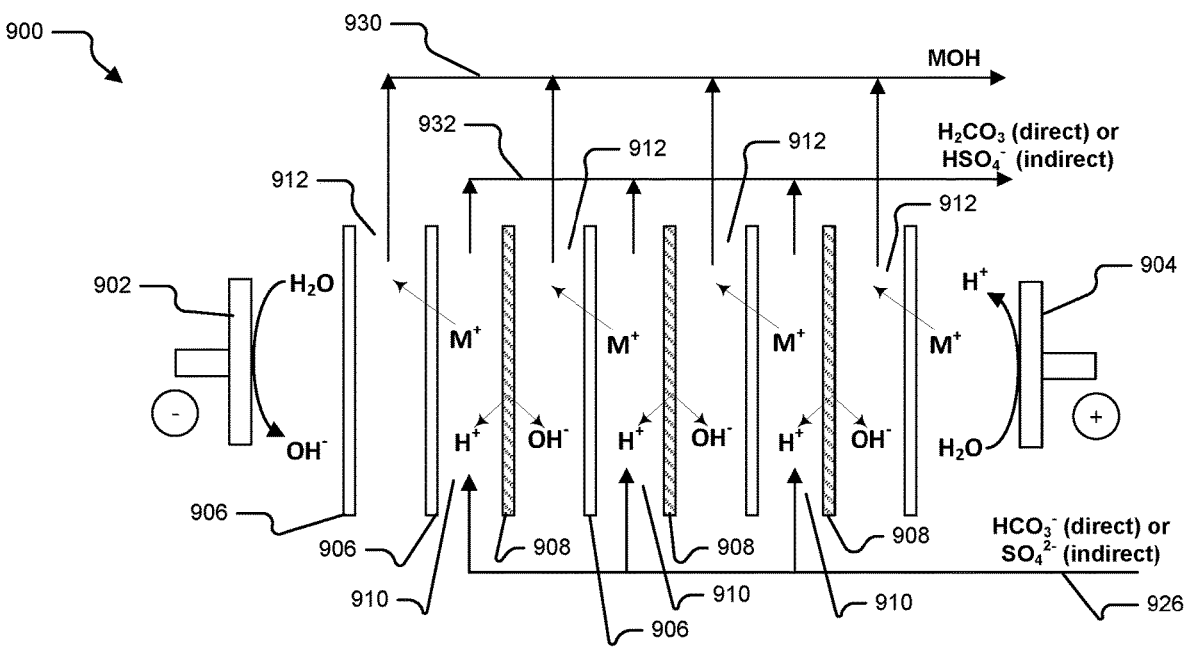
FIG. 9 is a schematic diagram of an example bipolar membrane electrodialysis (BPMED) unit with a membrane stack including cation exchange membranes alternating with bipolar membranes.
Figure 10:
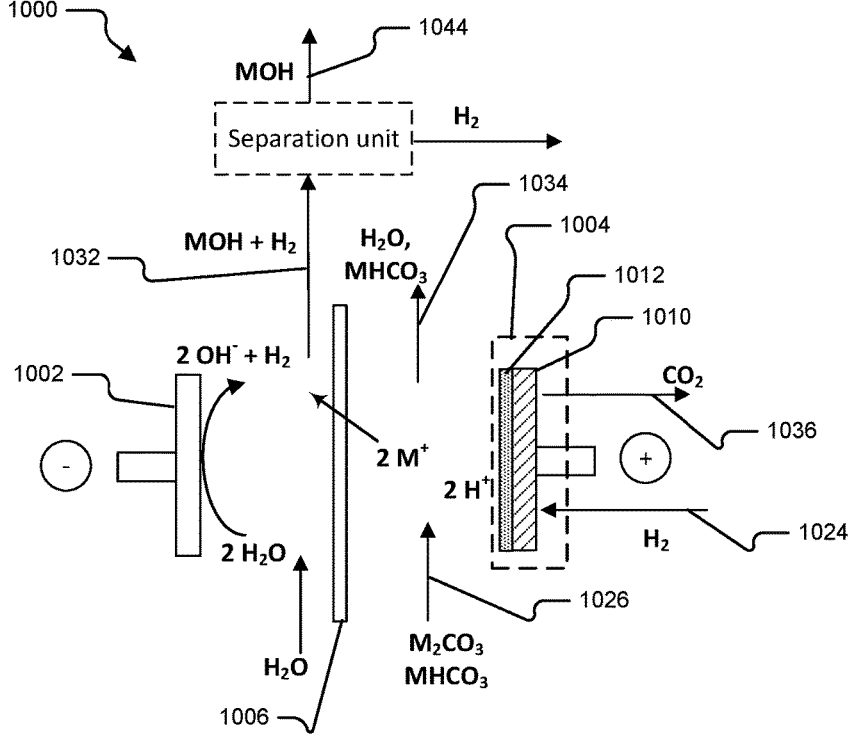
FIG. 10 is a schematic diagram of an example electrodialysis (ED) unit including a gas diffusion electrode.

Implementations of the present disclosure that process the carbonate-rich capture solution can include the use of an ED unit. In some implementations, the ED unit can include a bipolar membrane electrodialysis unit (BPMED) that consists of a membrane stack including bipolar membranes (BPMs), an example of which is shown in FIG. 9. In some implementations, the ED unit can include a gas diffusion electrode (GDE) and a single-cell-membrane stack, an example of which is shown in FIG. 10. A BPMED unit can combine BPMs with either or both of cation exchange membranes (CEMs) and anion exchange membranes (AEMs). The ED unit can produce a pH swing in the solution. One membrane stack configuration that can be used in the ED unit is alternating BPMs with CEMs. This membrane arrangement forms a BPMED unit, and the membranes define alternating feed-release (proton generating) and alkaline regeneration (hydroxide generation) compartments. In some implementations, an ED unit can have three compartments (a feed compartment, an acid compartment, and a base compartment) defined by AEMs alternating with one or more CEMs or BPMs. The ED unit can be an element of a regeneration subsystem. To regenerate the capture solution including an alkali hydroxide, BPMs provide hydroxyl ions in the alkaline regeneration compartment and protons in the feed-release compartment via water dissociation. The generated protons displace cations such as alkali metal ions which are selectively transported across the CEMs to the alkaline regeneration compartments. For example, to regenerate potassium hydroxide (KOH) in a capture solution, BPMs provide $OH^-$ ions and CEMs allow $K^+$ through to the alkaline regeneration compartments. The BPMED unit can be selected or designed to have desirable characteristics such as low voltage drop (e.g., BPM voltage drop of less than 2 V and CEM voltage drop of less than 1 V) and high current density (e.g., BPM current density above 50 mA/cm$^2$). Both the BPMs and CEMs may be stable in wide ranges of operating temperature, particularly high operating temperatures as they allow for decreased voltage. Both the BPMs and CEMs may be stable in wide ranges of pH and in high concentration alkaline solutions. This allows regenerated capture solutions that have high hydroxide concentrations, which can improve $CO_2$ capture rates, and reduce evaporator costs. In an embodiment, CEMs have low anion permeability to mitigate ion leakage, which can reduce stack efficiency. An example BPMED unit is illustrated and described with respect to FIG. 9 below. In some implementations, the ED unit can include a gas diffusion electrode (GDE) and a single-cell membrane stack, such as a CEM, an example of which is shown in FIG. 10 below. The ED unit is thus an electrochemical component of a regeneration subsystem in that the ED unit combines an input of electrical energy to facilitate a chemical reaction (e.g., to enable salt-splitting and acid-base recovery). Thus, in the configuration of FIG. 1 through FIG. 10, the regeneration subsystem may be described as an "electrochemical" regeneration subsystem of an electrochemical system.

To realize desired process conditions for operation of the ED unit, it can be advantageous to separate the carbonate from other species in the carbonate-rich capture solution in order to provide a pure carbonate stream to a regeneration subsystem comprising the ED unit. One approach for this is to integrate a carbonate separation subsystem that bridges the gas-liquid contactor of the $CO_2$ capture subsystem and the regeneration subsystem. The carbonate separation subsystem can include one or more units that selectively separate carbonate species from hydroxide-containing process solutions. For example, a caustic evaporator or a nanofiltration unit can be used to concentrate the carbonate-rich capture solution from the gas-liquid contactor. Caustic evaporators can increase the ionic concentrations of the capture solution, thereby moving the composition of the solution in relation to the carbonate saturation curve to lower the solubility of carbonate in the solution and producing a concentrated carbonate-rich solution. Some examples of caustic evaporators include mechanical vapor recompression (MVR) evaporators and multi-effect evaporators. The concentrated carbonate-rich stream can then be sent to a crystallizer to form crystalline carbonate hydrates. This solid phase intermediate product enables the carbonate to be easily separated from other components of the stream to form a pure or relatively pure carbonate stream for use in the ED unit. The crystalline carbonate hydrates are dissolved in an aqueous solution that is used to feed the ED unit in the regeneration subsystem. The aqueous solution is primarily water but can include some non-aqueous components. In some cases, the nanofiltration retentate, including concentrated carbonate solution, from a nanofiltration system can be polished in an ion exchange system to remove at least a portion of undesired ion species ($Ca^{+2}$, $Mg^{+2}$, $Ba^{+2}$, $Sr^{+2}$, silicates, borates) and then flow to the ED unit. In some cases, a nanofiltration unit can be employed downstream of the $CO_2$ capture subsystem to produce a carbonate-rich or bicarbonate-rich mixture that is fed to the regeneration subsystem. The nanofiltration unit can include polyethersulfone as a membrane material and can have a molecular cut-off of 100-1000 daltons. In some cases where the upstream $CO_2$ capture subsystem is ramping up or down (e.g., operating at a capacity that is different from a previous capacity), the resulting load can be accommodated by the caustic evaporator, nanofiltration unit, crystallizer, or a combination thereof in the carbonate separation subsystem. This is particularly useful if the $CO_2$ capture system is operating with high ionic strength solutions or if the system is coupled to an intermittent electricity source (or both). For instance, in cases where the ED unit is operating at a limited capacity or is nonoperational (e.g., due to maintenance), the carbonate separation subsystem can include one or more buffer tanks that store the crystalline carbonate hydrates. In some cases, a buffer capacity dissolving tank or an overflow tank can be useful for absorbing the load of operational changes since the crystalline carbonate hydrates are highly soluble salts. For example, during non-peak periods, when electricity from intermittent sources (e.g., wind, solar) is scarce, the electrodialysis system, the most energy intensive subsystem in the process, can be ramped down but the air contractor and crystallizer can continue to operate, capturing $CO_2$ and producing crystalline carbonate hydrate. The crystalline carbonate hydrate solids can be stored and fed to the electrodialysis system for regeneration when electricity is more readily available.

The ED unit constitutes a brine loop which carries the absorbed $CO_2$, in the form of Dissolved Inorganic Carbon (DIC), and a caustic loop which regenerates the capture solution. When a significant current density is applied to the ED unit, water can decompose into protons and hydroxyl ions. With enough protons generated, the ED unit can shift the local pH and the local equilibrium of a DIC species in the feed solution. The DIC species can include carbonate $CO_3^{2-}$, bicarbonate $HCO_3^-$, carbonic acid $H_2CO_3$, dissolved $CO_2$, or a combination thereof. The ED unit directly protonates one or more of the DICs to yield the following reactions:

Reaction 1: $CO_3^{2-}+H^+\rightarrow HCO_3^-$ (carbonate to bicarbonate)

Reaction 2: $HCO_3^-+H^+\rightarrow H_2CO_3$ (bicarbonate to carbonic acid)

Reaction 3: dissociation: $H_2CO_3\rightarrow H_2O+CO_2$

At high $H_2CO_3$ concentrations, the equilibrium $CO_2$ concentration will be sufficient to off-gas $CO_2$ from the capture solution. In some cases, $CO_2$ may partially degas within the ED unit cell. It can be beneficial to fully degas $CO_2$ externally as $CO_2$ bubble formation due to $CO_2$ degassing within the ED unit cell can increase electrical resistance and reduce cell active area. Full $CO_2$ degassing can occur in an external flash tank and $HCO_3^-$ is returned to the ED unit as the brine stream. In other configurations, both forming $H_2CO_3$ and degassing $CO_2$ can be carried out in a separate tank by employing a proton-shuttle loop that allows the ED unit to indirectly protonate the DIC species.

In some aspects, an ED unit can indirectly protonate the DIC species via an intermediate dissolved ionic species to avoid $CO_2$ degassing inside the cell of the ED unit. This can be achieved by employing a proton-shuttling species (e.g., $SO_4^{2-}$, $HPO_4^{2-}$) which is first protonated in the ED unit and then donates these protons to DIC species in an external unit. In one example configuration, the proton-shuttling species is a sulfate $SO_4^{2-}$, bisulfate $HSO_4^-$, or a combination thereof. The ED unit protonates the sulfate via the following reaction:

Reaction 4: $SO_4^{2-}+H^+ \rightarrow HSO_4^-$ (sulfate to bisulfate)

An external tank receives a sulfate-bisulfate mixture from the ED unit and a carbonate stream. The bisulfate reacts with the carbonate to yield $H_2CO_3$ via the following reaction:

Reaction 5: $2\ KHSO_4+K_2CO_3 \rightarrow 2\ K_2SO_4+H_2CO_3$

Thus, bisulfate can then affect the same DIC pH swing in the external tank via reactions 1 to 3.

In some aspects, it can be advantageous to employ process solutions that include a mixture of potassium-based and sodium-based species. In some cases, potassium-based capture solutions can achieve better capture kinetics than sodium-based capture solutions, but sodium-based capture solutions can have a lower solubility which can reduce the duty of crystallizers. Thus, $CO_2$ capture solutions can include a mixture of KOH, NaOH, $K_2CO_3$, and $Na_2CO_3$. These mixed sodium-potassium systems enable tuning of mass transfer kinetics, water balance, and operating temperature. Effective ratios of the potassium-based components to sodium-based components can depend on the operating environment and are described herein.

FIG. 1 is a block flow diagram illustrating an example electrochemical system 100 for regenerating capture solution and recovering $CO_2$ by employing direct protonation. Electrochemical system 100 includes a $CO_2$ capture subsystem 102 fluidly coupled to a carbonate separation subsystem 162 and a regeneration subsystem 164. Carbonate separation subsystem 162 includes a primary caustic evaporator 112 fluidly coupled to a crystallizer 104. In some implementations, crystallizer 104 can by fluidly coupled to a solids separator such as a centrifuge, pressure or vacuum filters, scrapers, cyclones, and the like. Carbonate separation subsystem 162 exploits the solubility differences between carbonate and hydroxide salts in the capture solution to enable efficient separation of carbonate. Primary caustic evaporator 112 receives a carbonate-rich capture solution 120 from $CO_2$ capture subsystem 102. In some implementations, $CO_2$ capture subsystem 102 can include one or more air contactors 105. The air contactors 105 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 105 can include single or multi cell air contactors, dual cell air contactors, dual flow air contactors, or a combination thereof. The air contactors can operate in crossflow, countercurrent flow, co-current flow, or a combination thereof.

Carbonate-rich capture solution 120 can be an aqueous mixture comprising primarily carbonate ions, alkaline metal carbonate (e.g., $K_2CO_3$, $Na_2CO_3$), or a combination thereof. Carbonate-rich capture solution 120 can also include other components in smaller amounts, such as hydroxide ions, alkali metal hydroxide (e.g., KOH, NaOH), water, and impurities. For example, carbonate-rich capture solution 120 can comprise between 0.4 M to 6 M $K_2CO_3$ and between 1

M to 10 M KOH. In another implementation, carbonate-rich capture solution 120 can comprise an aqueous $Na_2CO_3$—NaOH mixture. In some implementations, carbonate-rich capture solution can comprise a mixture of $K_2CO_3$ and $Na_2CO_3$.

In some implementations, primary caustic evaporator 112 can include a mechanical vapour recompression (MVR) evaporator, a multi-effect evaporator, or a combination thereof. Primary caustic evaporator 112 removes water from carbonate-rich capture solution 120 to form a concentrated carbonate-rich capture solution 118. Primary caustic evaporator 112 discharges a water stream 119. Concentrated carbonate-rich capture solution 118 can include a higher carbonate concentration and a higher hydroxide concentration than carbonate-rich capture solution 120. For example, concentrated carbonate-rich capture solution 118 can comprise between 0.4 M to 6 M $K_2CO_3$ and between 1 M to 14 M KOH. In another implementation, concentrated carbonate-rich capture solution 118 can comprise a concentrated aqueous $Na_2CO_3$—NaOH mixture. In some implementations, carbonate-rich capture solution can comprise a mixture of $K_2CO_3$ and $Na_2CO_3$. Thus, primary caustic evaporator 112 increases the respective concentrations of carbonate and hydroxide such that the carbonate salts in carbonate-rich capture solution 118 are less soluble, which reduces the crystallizer duty (evaporative heating or cooling refrigeration) on crystallizer 104.

In some implementations, crystallizer 104 includes an evaporative crystallizer, a eutectic freeze crystallizer, a cooling crystallizer (e.g., vacuum or surface cooled), a membrane distillation crystallizer, or a combination thereof. Crystallizer 104 can be based on forced circulation, draft tube baffle, fluidized bed design, or a combination thereof. Crystallizer 104 increases the hydroxide concentration and thereby decreases the solubility of carbonate in concentrated carbonate-rich capture solution 118. In some cases, crystallizer 104 evaporates a portion of concentrated carbonate-rich capture solution 118 to reach supersaturation. This concentration step forms a crystalline carbonate hydrate 122, a mother liquor 142, and a water stream 124. Crystallizer 104 discharges water stream 124 for downstream processing (e.g., in filtration system, water treatment system, or disposal system) or use in another application within or beyond system 100. Crystalline carbonate hydrate 122 is at least partially separated from mother liquor 142 to form a pure or nearly pure carbonate that can be used in the feed solution for the ED unit. Mother liquor 142 can include the remaining components of concentrated carbonate solution 118, such as water and hydroxide, after crystalline carbonate hydrate 122 is separated. Crystalline carbonate hydrate 122 can include carbonate sesquihydrate ($M_2CO_3 \cdot 1.5\ H_2O$) or an anhydrous carbonate. For example, crystalline carbonate hydrate 122 can include potassium carbonate sesquihydrate ($K_2CO_3 \cdot 1.5\ H_2O$). Potassium carbonate sesquihydrate crystals can be at least partially isolated from mother liquor 142 which can include a $KOH^-K_2CO_3$ mixture. In another example, crystalline carbonate hydrate 122 can include sodium carbonate decahydrate ($Na_2CO_3 \cdot 10\ H_2O$), and mother liquor 142 can include a $NaOH^-Na_2CO_3$ mixture. In another example, crystalline carbonate hydrate 122 can include potassium sodium carbonate hexahydrate ($KNaCO_3 \cdot 6\ H_2O$). In some implementations, crystalline carbonate hydrate 122 can include a different stoichiometry of water molecules per unit carbonate in the crystalline carbonate (e.g., $M_2CO_3 \cdot n\ H_2O$ where M is an alkali metal and n is an integer or fractional value). After separation from mother liquor 142, crystalline carbonate hydrate 122 is sent to regeneration subsystem 164 and mother liquor 142 is returned to $CO_2$ capture subsystem 102.

Regeneration subsystem 164 includes a dissolving tank 106 fluidly coupled to a BPMED 108 and a flash tank 110. BPMED 108 is an example of an ED unit that employs BPMs and CEMs, but in some cases, regeneration subsystem 164 can include a different ED unit (e.g., an ED unit that includes one or more CEMs, AEMs, BPMs or a combination thereof). Together, process streams flowing to and from dissolving tank 106, BPMED 108 and flash tank 110 form a brine loop in which the DIC is protonated and $CO_2$ is released. Dissolving tank 106 can receive a water stream 128 and crystalline carbonate hydrate 122 from crystallizer 104. In some cases, a polished aqueous solution can be used instead of or in addition to water stream 128. A polished aqueous solution can be a solution that has reduced or minimized particulates and dissolved contaminants. Crystalline carbonate hydrate 122 dissolves in water and combines with bicarbonate $HCO_3^-$ in a brine stream 138 received from the flash tank 110 to form an ED feed solution 126. ED feed solution 126 can include a bicarbonate $HCO_3^-$-rich solution with a mixture of other components such as carbonate and water.

BPMED 108 can include a stack of cells positioned between two electrodes. Each cell can be arranged in a configuration that includes alternating BPMs and CEMs. The electrodes are operable to apply an electric potential to enable salt-splitting and acid-base recovery. In some cases, the electrodes of BPMED 108 can be coupled to an intermittent low carbon intensity electricity source (e.g., solar, wind, geothermal) or a low carbon intensity electricity source that is non-intermittent (e.g., hydro, nuclear, biomass, renewable natural gas). BPMED 108 can include multiple feed-release compartments and alkaline regeneration compartments defined by BPMs and CEMs.

BPMED 108 is configured to receive ED feed solution 126 and a water stream 134 in one or more feed-release compartments. The BPMs of BPMED 108 enable a water-splitting reaction that splits water into hydroxyl ions and protons. BPMED 108 enables a salt-splitting reaction that splits salt into its cation and anion. The CEMs are operable to transfer the cation into the alkaline regeneration compartments. In the alkaline regeneration compartments, the cation combines with the hydroxyl ions to form a first ED product stream 132 having a hydroxide concentration between 0.5 M and 12 M. For example, ED feed solution 126 can include a potassium bicarbonate $KHCO_3$-rich solution. The CEMs of BPMED 108 select for potassium ions $K^+$ and transport them into the alkaline regeneration compartments where $K^+$ combines with $OH^-$ to form KOH in the first ED product stream 132. In the feed-release compartments, the bicarbonate $HCO_3^-$ ions are protonated directly in BPMED 108 to form a second ED product stream 130 comprising carbonic acid $H_2CO_3$. In some cases, carbonic acid dissociates into $CO_2$ and water, and $CO_2$ may partially degas in BPMED 108.

In some implementations, reduction in pH can cause carbonic acid to dissociate and release $CO_2$ within the cells of BPMED 108. In some implementations, BPMED 108 can include an inter-membrane distance of less than 1 mm between each BPM and CEM. For example, the BPM can be positioned 0.7 mm from the CEM. In some implementations, current densities between 50 $mA/cm^2$ and 2000 $mA/cm^2$ can be applied to BPMED 108.

A second ED product stream 130 can include an aqueous mixture with carbonic acid $H_2CO_3$ and bicarbonate $HCO_3^-$.

For example, the second ED product stream 130 can include an aqueous mixture of carbonic acid $H_2CO_3$, and potassium bicarbonate $KHCO_3$. Carbonic acid $H_2CO_3$ dissociates into $CO_2$ and water. The second ED product stream 130 can be sent to flash tank 110 where a $CO_2$ stream 136 is partially or fully released from flash tank 110 and sent to one or more downstream processing units described in ensuing implementations (e.g., compression unit, purification unit, electroreduction subsystem, carbon products manufacturing system, syngas generation reactor). A brine stream 138 including an aqueous mixture of bicarbonate $HCO_3^-$ can be sent to dissolving tank 106, completing the brine loop of regeneration subsystem 164.

The first ED product stream 132 can include an aqueous mixture with hydroxide as a predominant species. For example, the first ED product stream 132 can include an aqueous solution of potassium hydroxide KOH. The first ED product stream 132 can be returned to $CO_2$ capture subsystem 102 from BPMED 108 as a $CO_2$ capture solution 144. In some implementations, $CO_2$ capture solution 144 can include a hydroxide concentration between 0.5 M and 10 M. In some implementations, regeneration subsystem 164 can optionally include an auxiliary caustic evaporator 114. Auxiliary caustic evaporator 114 can include a mechanical vapour recompression (MVR) evaporator, a multi-effect evaporator, or a combination thereof. Auxiliary caustic evaporator 114 concentrates first ED product stream 132 by removing water to form $CO_2$ capture solution 144 and discharging a water stream 140. In such implementations, $CO_2$ capture solution 144 includes a carbonate-lean mixture and has a higher hydroxide concentration than first ED product stream 132. Together, process streams flowing to and from auxiliary caustic evaporator 114, $CO_2$ capture subsystem 102, carbonate separation subsystem 162, dissolving tank 106, and BPMED 108 form a caustic loop in which a capture solution is regenerated.

The example electrochemical system 100, as well as other example implementations according to the present disclosure, include process streams (also called "streams") within an electrochemical system used to capture $CO_2$ and to employ a pH swing to regenerate a capture solution and release $CO_2$. Recovering $CO_2$ is also referred to herein as off gassing $CO_2$. The process streams can be flowed using one or more flow control systems 999 implemented throughout the electrochemical system. A flow control system 999 can include one or more flow pumps to pump the process streams, one or more flow pipes through which the process streams are flowed and one or more valves to regulate the flow of streams through the pipes. Control system 999 can include one or more pH monitoring devices and one or more conductivity monitoring devices. In some implementations, control system 999 can include one or more chemical analysis devices (e.g., Fourier transform near-infrared spectroscopy device) to measure DIC species. In some implementations, control system 999 can include one or more temperature sensors (e.g., thermocouples, thermistors, thermometers) and temperature controllers to monitor and control one or more aspects of flow control system 999 in response to heat generated from the one or more elements of the electrochemical system.

In some implementations, control system 999 can be operated manually. For example, an operator can set a flow rate for each pump and set valve open or close positions to regulate the flow of the process streams through the pipes in control system 999. Once the operator has set the flow rates and the valve open or close positions for all control systems 999 distributed across the electrochemical system for capturing $CO_2$ and regenerating a capture solution, control system 999 can flow the streams under constant flow conditions, for example, constant volumetric rate or other flow conditions. To change the flow conditions, the operator can manually operate control system 999, for example, by changing the pump flow rate or the valve open or close position.

In some implementations, flow control system 999 can be operated automatically. For example, the flow control system 999 can be connected to a computer or a computer-readable medium storing instructions (such as flow control instructions and other instructions) executable by one or more processors to perform operations (such as flow control operations). An operator can set the flow rates and the valve open or close positions for all flow control systems 999 distributed across the electrochemical system for capturing $CO_2$ and regenerating a capture solution using the flow control system 999. In such implementations, the operator can manually change the flow conditions by providing inputs through the flow control system 999. Also, in such implementations, the flow control system 999 can automatically (that is, without manual intervention) control one or more of the flow control systems, for example, using feedback systems connected to flow control system 999. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to flow control system 999. In response to the flow condition exceeding a threshold (such as a threshold pressure value, a threshold temperature value, or other threshold value), control system 999 can automatically perform operations. For example, if the pressure or temperature in the pipe exceeds the threshold pressure value or the threshold temperature value, respectively, flow control system 999 can provide a signal to the pump to decrease a flow rate, a signal to open a valve to relieve the pressure, a signal to shut down process stream flow, or other signals.

Figure 2:
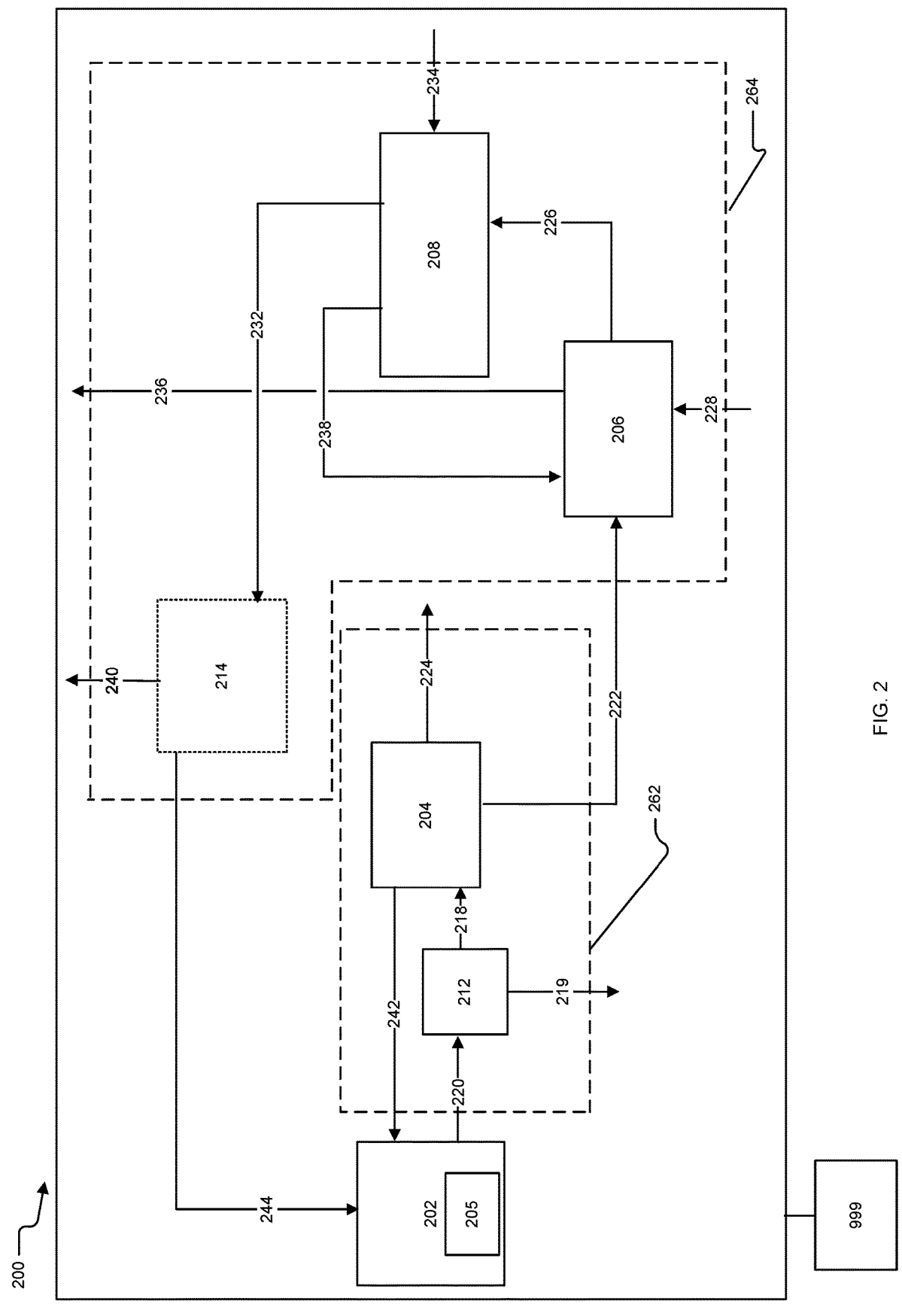
FIG. 2 is a block flow diagram illustrating an example electrochemical system for regenerating capture solution and recovering $CO_2$ by employing indirect protonation.

FIG. 2 is a block flow diagram illustrating an example electrochemical system 200 for regenerating capture solution and recovering $CO_2$ by employing indirect protonation and a proton-shuttling species. In some cases, electrochemical system 200 can be advantageous over electrochemical system 100 of FIG. 1 because the DIC species is protonated outside of the ED unit, which avoids $CO_2$ degassing inside the cells of the ED unit. $CO_2$ degassing within the ED unit can be undesirable as it can increase electrical resistance and reduce cell active area. Thus, a brine loop including an indirect protonation system can be more efficient than a brine loop including a direct protonation system.

Electrochemical system 200 includes a $CO_2$ capture subsystem 202 fluidly coupled to a carbonate separation subsystem 262 and a regeneration subsystem 264. Carbonate separation subsystem 262 includes a primary caustic evaporator 212 fluidly coupled to a crystallizer 204. In some implementations, crystallizer 204 can by fluidly coupled to a solids separator such as a centrifuge, pressure or vacuum filters, scrapers, cyclones, and the like. Carbonate separation subsystem 262 exploits the solubility differences between carbonate and hydroxide salts in the capture solution to enable efficient separation of carbonate. Primary caustic evaporator 212 receives a carbonate-rich capture solution 220 from $CO_2$ capture subsystem 202. In some implementations, $CO_2$ capture subsystem 202 can include one or more air contactors 205. The air contactors 205 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 205 can include single or multi cell air contactors, dual cell air contactors, dual flow air contactors, or a combination thereof. The air contactors can operate in crossflow, countercurrent flow, co-current flow, or a combination thereof.

Carbonate-rich capture solution 220 can be an aqueous mixture comprising primarily of carbonate ions, alkaline metal carbonate (e.g., $K_2CO_3$, $Na_2CO_3$), or a combination thereof. Carbonate-rich capture solution 220 can also include other components in smaller amounts, such as hydroxide ions, alkali metal hydroxide (e.g., KOH, NaOH), water, and other dissolved species including process additives (e.g., chlorides, sulfates, acetates, phosphates, surfactants) and non-process elements (e.g., silicates, borates, calcium, magnesium, strontium, barium, iron, nickel). For example, carbonate-rich capture solution 220 can comprise between 0.5 M to 6 M $K_2CO_3$ and between 1 M to 10 M KOH. In another implementation, carbonate-rich capture solution 220 can comprise an aqueous $Na_2CO_3$—NaOH mixture. In some implementations, carbonate-rich capture solution can comprise a mixture of $K_2CO_3$ and $Na_2CO_3$.

In some implementations, primary caustic evaporator 212 can include a mechanical vapour recompression (MVR) evaporator, a multi-effect evaporator, or a combination thereof. Primary caustic evaporator 212 removes water from carbonate-rich capture solution 220 to form a concentrated carbonate-rich capture solution 218. Primary caustic evaporator 212 discharges a water stream 219. Concentrated carbonate-rich capture solution 218 can include a higher carbonate concentration and a higher hydroxide concentration than carbonate-rich capture solution 220. For example, concentrated carbonate-rich capture solution 218 can comprise between 0.5 M to 6 M $K_2CO_3$ and between 1 M to 14 M KOH. In another implementation, concentrated carbonate-rich capture solution 218 can comprise a concentrated aqueous $Na_2CO_3$—NaOH mixture. In some implementations, concentrated carbonate-rich capture solution can comprise a mixture of $K_2CO_3$ and $Na_2CO_3$. Thus, primary caustic evaporator 212 increases the respective concentrations of carbonate and hydroxide such that the carbonate salts in carbonate-rich capture solution 218 are less soluble, which reduces the crystallizer duty (evaporative heating or cooling refrigeration) on crystallizer 204.

In some implementations, crystallizer 204 includes an evaporative crystallizer, a eutectic freeze crystallizer, a cooling crystallizer (e.g., vacuum or surface cooled), a membrane distillation crystallizer, or a combination thereof. Crystallizer 204 can be based on forced circulation, draft tube baffle, fluidized bed design, or a combination thereof. Crystallizer 204 increases the hydroxide concentration and thereby decreases the solubility of carbonate in concentrated carbonate-rich capture solution 218. In some cases, crystallizer 204 evaporates a portion of concentrated carbonate-rich capture solution 218 to reach supersaturation. This forms a crystalline carbonate hydrate 222, a mother liquor 242, and a water stream 224. Crystallizer 204 discharges water stream 224 for downstream processing (e.g., in a filtration system, water treatment system, or disposal system) or use in another application within or beyond system 200. Crystalline carbonate hydrate 222 is at least partially separated from mother liquor 242 to form a pure or nearly pure carbonate that can be used in the feed solution for the ED unit. Mother liquor 242 can include the remaining components of concentrated carbonate solution 218, such as water and hydroxide, after crystalline carbonate hydrate 222 is separated. Crystalline carbonate hydrate 222 can include carbonate sesquihydrate ($M_2CO_3 \cdot 1.5 \ H_2O$) or an anhydrous carbonate. For example, crystalline carbonate hydrate 222 can include potassium carbonate sesquihydrate ($K_2CO_3 \cdot 1.5 \ H_2O$). Potassium carbonate sesquihydrate crystals can be at least partially isolated from mother liquor 242 which can include a $KOH^-K_2CO_3$ mixture. In another example, crystalline carbonate hydrate 222 can include sodium carbonate decahydrate ($Na_2CO_3 \cdot 10 \ H_2O$), and mother liquor 242 can include a $NaOH^-Na_2CO_3$ mixture. In another example, crystalline carbonate hydrate 222 can include potassium sodium carbonate hexahydrate ($KNaCO_3 \cdot 6 \ H_2O$). In some implementations, crystalline carbonate hydrate 222 can include a different stoichiometry of water molecules per unit carbonate in the crystalline carbonate (e.g., $M_2CO_3 \cdot n \ H_2O$ where M is an alkali metal and n is an integer or fractional value). After separation from mother liquor 242, crystalline carbonate hydrate 222 is sent to regeneration subsystem 264 and mother liquor 242 is returned to $CO_2$ capture subsystem 202.

Regeneration subsystem 264 includes a dissolving tank 206 fluidly coupled to a BPMED 208. BPMED 208 is an example of an ED unit that employs BPMs and CEMs, but in some cases, regeneration subsystem 264 can include a different ED unit (e.g., an ED unit that includes one or more CEMs, AEMs, BPMs or a combination thereof). In some cases, dissolving tank 206 can operate at a pressure of up to 40 bar. Together, process streams flowing to and from dissolving tank 206 and BPMED 208 form a brine loop in which a proton-shuttling species (e.g., sulfate $SO_4^{2-}$, bisulfate $HSO_4^-$) is protonated in the BPMED, and protons are shuttled to dissolving tank 206 via the proton-shuttling species. In some implementations, the proton-shuttling species can include $Cl^-$, $I^-$, $Br$, $HPO_4^{-2}$ and $H_2PO_4^{-1}$, acetate, and citrate. In dissolving tank 206, the proton-shuttling species protonates the DIC species to form carbonic acid $H_2CO_3$. Thus, the brine loop allows for BPMED 208 to indirectly protonate the DIC species.

Dissolving tank 206 can receive a water stream 228, crystalline carbonate hydrate 222 from crystallizer 204, and a brine stream 238 from BPMED 208. In some cases, a polished aqueous solution can be used instead of or in addition to water stream 228. A polished aqueous solution can be substantially free of particulates and dissolved contaminants. Crystalline carbonate hydrate 222 dissolves in water and reacts with the proton-shuttling species in the brine stream 238 received from BPMED 208. For example, crystalline carbonate hydrate 222 can include potassium carbonate sesquihydrate ($K_2CO_3 \cdot 1.5 \ H_2O$) which dissolves in water in dissolving tank 206 to yield potassium carbonate $K_2CO_3$. Brine stream 238 can include a bisulfate-rich solution. For example, brine stream 238 can include potassium bisulfate $KHSO_4$ as the proton-shuttling species. The bisulfate-rich solution can react with carbonate in the dissolving tank 206 to yield a bisulfate-lean solution and carbonic acid. For example, potassium bisulfate $KHSO_4$ can react with potassium carbonate $K_2CO_3$ to yield potassium sulfate $K_2SO_4$ and carbonic acid $H_2CO_3$. As a result, pH will be reduced. The carbonic acid will have sufficient equilibrium $CO_2$ partial pressures (e.g., less than 1 bar) to cause dissociation into water and gaseous $CO_2$. Dissolving tank 206 can partially or fully release a $CO_2$ stream 236. $CO_2$ stream 236 can be sent to one or more downstream processing units described in ensuing implementations (e.g., compression unit, purification unit, electroreduction subsystem, carbon products manufacturing system, syngas generation reactor).

Reactions in dissolving tank 206 also form an ED feed solution 226. ED feed solution 226 can include a bisulfate-lean solution. For example, ED feed solution 226 can include potassium sulfate with a mixture of other components such as potassium bisulfate and water. Dissolving tank 206 is configured to flow ED feed solution 226 to a BPMED 208.

BPMED 208 can include a stack of cells positioned between two electrodes. In some cases, the electrodes of BPMED 208 can be coupled to an intermittent low carbon intensity electricity source (e.g., solar, wind, geothermal) or a low carbon intensity electricity source (e.g., hydro, nuclear, renewable natural gas). Each cell can be arranged in a configuration that includes alternating BPMs and CEMs. The electrodes are operable to apply an electric potential to enable salt-splitting and acid-base recovery. BPMED 208 can include multiple feed-release compartments and alkaline regeneration compartments defined by BPMs and CEMs.

BPMED 208 is configured to receive ED feed solution 226 and a water stream 234 in one or more feed-release compartments. The BPMs of BPMED 208 enable a water-splitting reaction that splits water into hydroxyl ions and protons. BPMED 208 enables a salt-splitting reaction that splits salt into its cation and anion. The CEMs are operable to transfer the cation into the alkaline regeneration compartments. In the alkaline regeneration compartments, the cation combines with the hydroxyl ions to form an ED product stream 232 having a hydroxide concentration between 0.5 M and 10 M.

For example, in a potassium-based system, ED feed solution 226 can include a potassium sulfate-rich solution. The CEMs of BPMED 208 select for potassium ions $K^+$ and transport them into the alkaline regeneration compartments where $K^+$ combines with $OH^-$ to form KOH in ED product stream 232. In the feed-release compartments, the proton-shuttling species can be protonated and combined with the cation to form brine stream 238. For example, the sulfate ions $SO_4^{2-}$ can be protonated and combined with potassium ion $K^+$ to form potassium bisulfate $KHSO_4$ in brine stream 238.

Dissolving tank 206 is configured to receive brine stream 238 from BPMED 208, completing the brine loop of regeneration subsystem 264. In some implementations, brine stream 238 can include between about 1 M to about 2.5 M sulfate and bisulfate.

For example, in a potassium-based system, brine stream 238 can include about 1 M potassium sulfate $K_2SO_4$ concentration and potassium bisulfate $KHSO_4$. In another example, brine stream 238 can include about 2.5 M sodium sulfate $Na_2SO_4$ and sodium bisulfate $NaHSO_4$. In some cases, the brine stream 238 can include a combination of $K_2SO_4/KHSO_4$ and $NaSO_4/NaHSO_4$ with total concentrations of 2.5 M or lower. In some cases, the brine stream 238 can include a $KNaSO_4$ concentration of 1 M. In some cases, brine stream 238 and ED feed solution 226 can include other sulfate or bisulfate concentrations (or both), depending on the operating temperature of BPMED 208 and conversion of sulfate to bisulfate in BPMED 208. The respective sulfate and bisulfate concentrations of ED feed solution 226 and brine stream 238 will depend on the lowest solubility species for any given operating temperature.

In some implementations, BPMED 208 can include an inter-membrane distance of less than 1 mm between each BPM and CEM. For example, the BPM can be positioned 0.7 mm from the CEM. In some implementations, current densities between 50 mA/cm$^2$ and 2000 mA/cm$^2$ can be applied to BPMED 208.

The ED product stream 232 produced by BPMED 208 can include an aqueous mixture with hydroxide as a predominant species. For example, the ED product stream 232 can include an aqueous solution of potassium hydroxide KOH. The ED product stream 232 can be returned to $CO_2$ capture subsystem 202 from BPMED 208 as an $CO_2$ capture solution 244. In some implementations, $CO_2$ capture solution 244 can include a hydroxide concentration between 0.5 M and 10 M. In some implementations, regeneration subsystem 264 can optionally include an auxiliary caustic evaporator 214. Auxiliary caustic evaporator 214 can include a mechanical vapour recompression (MVR) evaporator, a multi-effect evaporator, or a combination thereof. Auxiliary caustic evaporator 214 concentrates ED product stream 232 by removing water to form $CO_2$ capture solution 244 and discharging a water stream 240. For example, up to 20 $m^3$ water per t-$CO_2$ delivered can be removed by auxiliary caustic evaporator 214. In such implementations, $CO_2$ capture solution 244 includes a carbonate-lean mixture and has a higher hydroxide concentration than ED product stream 232. Together, process streams flowing to and from auxiliary caustic evaporator 214, $CO_2$ capture subsystem 202, carbonate separation subsystem 262, dissolving tank 206, and BPMED 208 form a caustic loop in which a capture solution is regenerated.

Figure 3:
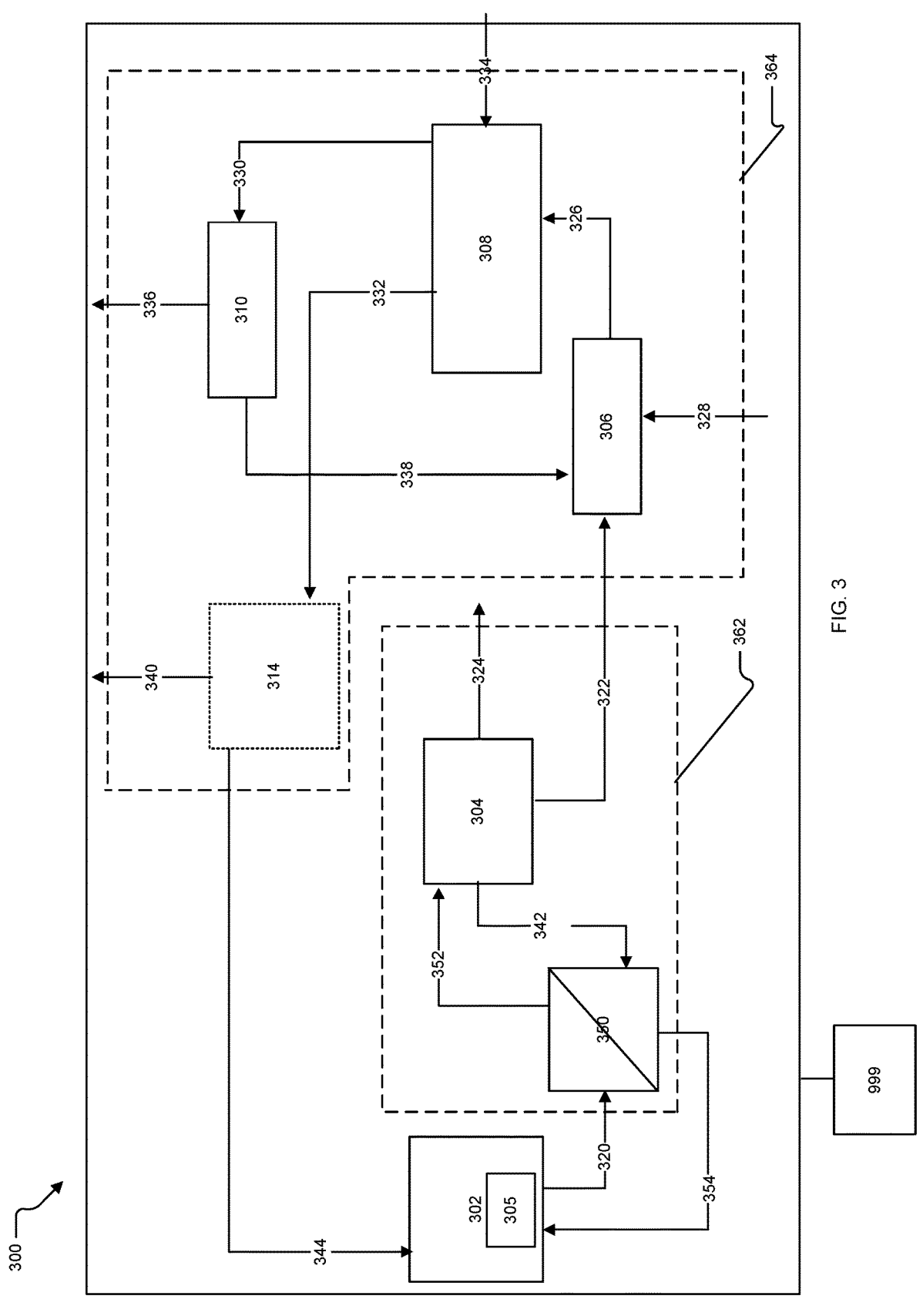
FIG. 3 is a block flow diagram illustrating an example electrochemical system for regenerating capture solution and recovering $CO_2$ by employing a nanofiltration unit and direct protonation.

FIG. 3 is a block flow diagram illustrating an example electrochemical system 300 for regenerating capture solution and recovering $CO_2$ by employing a nanofiltration unit 350 and direct protonation. In some cases, electrochemical system 300 can be advantageous over electrochemical system 100 of FIG. 1 and electrochemical system 200 of FIG. 2 because nanofiltration can selectively produce a particular concentration of carbonate without requiring water removal to achieve saturation of carbonate, unlike a caustic evaporator. Electrochemical system 300 includes a $CO_2$ capture subsystem 302 fluidly coupled to a carbonate separation subsystem 362 and a regeneration subsystem 364. Carbonate separation subsystem 362 includes a nanofiltration unit 350 fluidly coupled to a crystallizer 304. In some implementations, crystallizer 304 includes an evaporative crystallizer, a cooling crystallizer (e.g., vacuum or surface cooled), a membrane distillation crystallizer, or a combination thereof. The crystallizer could be based on forced circulation, draft tube baffle, or fluidized bed design or a combination thereof.

In some implementations, crystallizer 304 can be fluidly coupled to a solids separator such as a centrifuge, pressure or vacuum filters, scrapers, cyclones, and the like. Carbonate separation subsystem 362 exploits the solubility differences between carbonate and hydroxide salts in the capture solution to enable efficient separation of carbonate. Nanofiltration unit 350 can receive a carbonate-rich capture solution 320 from $CO_2$ capture subsystem 302. In some implementations, $CO_2$ capture subsystem 302 can include one or more air contactors 305. The air contactors 305 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 305 can include single or multi cell air contactors, dual cell air contactors, dual flow air contactors, or a combination thereof. The air contactors can operate in crossflow, countercurrent flow, co-current flow, or a combination thereof. In some implementations, primary caustic evaporator 312 can include a mechanical vapor recompression (MVR) evaporator, a multi-effect evaporator, or a combination thereof.

Carbonate-rich capture solution 320 can be an aqueous mixture comprising primarily of carbonate ions, alkaline metal carbonate (e.g., $K_2CO_3$, $Na_2CO_3$), or a combination thereof. Carbonate-rich capture solution 320 can also include other components in smaller amounts, such as hydroxide ions, alkali metal hydroxide (e.g., KOH, NaOH), water, and impurities. For example, carbonate-rich capture solution 320 can comprise between 0.4 M to 6 M $K_2CO_3$ and between 1 M to 10 M KOH. In another implementation, carbonate-rich capture solution 320 can comprise an aqueous $Na_2CO_3$—NaOH mixture. In some implementations, carbonate-rich capture solution can comprise a mixture of $K_2CO_3$ and $Na_2CO_3$.

Nanofiltration unit 350 can concentrate carbonate via selective rejection, which can reduce the evaporative load on crystallizer 304 and can reduce feed flow rates and crystallizer sizing. Nanofiltration unit 350 can include one or more filtration membranes that are impermeable to or select for large divalent ions such as carbonate ions. Nanofiltration membranes can have an inherent surface charge, making them particularly suitable for separating ion mixtures. Rejection of species can depend on size, ionic charge, and membrane affinity. Nanofiltration unit 350 can include membranes that have a wide pH tolerance and are durable enough to operate at a pH ranging from 0 to 14 or hydroxide concentrations of up to 10 M. In some implementations, nanofiltration unit 350 can include membranes that are operable with hydroxide concentration of up to 10 M. In some implementations, nanofiltration unit 350 can include membranes that are stable handling hydroxide concentrations between about up to 10 M. In some implementations, nanofiltration unit 350 can reject at 85% to 100% of divalent ions (e.g., carbonate ions) to yield a retentate 352 that is carbonate-rich, and a permeate 354 that is hydroxide rich or carbonate-lean. In some cases, nanofiltration unit 350 can reject between 50% to 100% of divalent ions. In some cases, nanofiltration unit 350 can include a forward osmosis-style filtration unit that employs a high ionic strength draw solution and a pressure gradient to yield a carbonate-rich retentate 352. A high ionic strength draw solution is an electrolyte solution that can lower the osmotic pressure difference across the membrane and can allow water to flow more easily from the feed solution to the draw solution. Nanofiltration unit 350 can include a plate and frame module that holds a number of nanofiltration membranes (e.g., flat membrane sheets) clamped together with spacers and supports.

Nanofiltration unit 350 can receive carbonate-rich capture solution 320 as a feed solution and a mother liquor 342 as a draw-in solution. Filtration membranes in nanofiltration unit 350 can select for and reject carbonate ions, thereby producing a retentate 352 comprising primarily concentrated carbonate and a permeate 354 (draw-out solution) comprising primarily hydroxide. For example, nanofiltration unit 350 can receive $K_2CO_3$-rich solution as a feed and a mother liquor 342 (which can include KOH, water, and small amounts of $K_2CO_3$) as a draw-in solution. Nanofiltration unit 350 can then produce concentrated $K_2CO_3$-rich solution as retentate 352 and KOH⁻rich solution as permeate 354. Retentate 352 can include a higher carbonate concentration than carbonate-rich capture solution 320. In some implementations, retentate 352 can comprise approximately between 0.5 M to 6 M $K_2CO_3$. In some implementations, nanofiltration unit 350 can receive a $Na_2CO_3$-rich capture solution as feed and produce concentrated $Na_2CO_3$-rich solution as retentate 352 and NaOH⁻rich solution as permeate 354. In some implementations, nanofiltration unit 350 can receive a mixed $K_2CO_3/Na_2CO_3$-rich capture solution as feed and produce concentrated mixed $K_2CO_3/Na_2CO_3$-rich solution as retentate 352 and mixed $KOH/NaOH^-$rich solution as permeate 354.

In some implementations, nanofiltration unit 350 can include a feed tank configured to receive carbonate-rich capture solution 320 and a reject collection tank configured to receive retentate 352. Thus, nanofiltration unit 350 increases the respective concentrations of carbonate such that the carbonate salts in retentate 352 are less soluble, which reduces the crystallizer duty (evaporative heating or cooling refrigeration) on crystallizer 304.

Crystallizer 304 receives retentate 352 from nanofiltration unit 350. In some implementations, crystallizer 304 includes an evaporative crystallizer, a eutectic freeze crystallizer, a cooling crystallizer (e.g., vacuum or surface cooled), a membrane distillation crystallizer, or a combination thereof. Crystallizer 304 can be based on forced circulation, draft tube baffle, fluidized bed design, or a combination thereof. Crystallizer 304 increases the hydroxide concentration and thereby decreases the solubility of carbonate in retentate 352. The solubility of carbonate in retentate 352 is determined by the composition of retentate 352 and its position relative to the saturation curve. In some cases, crystallizer 304 receives retentate 352 from nanofiltration unit 350 and evaporates a portion of retentate 352 to reach supersaturation. This forms a crystalline carbonate hydrate 322, a mother liquor 342, and a water stream 324. Crystallizer 304 discharges water stream 324 for downstream processing (e.g., in a filtration system, water treatment system, or disposal system) or use in another application within or beyond system 300. Crystalline carbonate hydrate 322 is at least partially separated from mother liquor 342 to form a pure or nearly pure carbonate that can be used in the feed solution for the ED unit. Mother liquor 342 can include water, hydroxide, and small amounts of carbonate. Crystalline carbonate hydrate 322 can include carbonate sesquihydrate ($M_2CO_3 \cdot 1.5$ $H_2O$) or an anhydrous carbonate. For example, crystalline carbonate hydrate 322 can include potassium carbonate sesquihydrate ($K_2CO_3 \cdot 1.5$ $H_2O$). Potassium carbonate sesquihydrate crystals can be at least partially isolated from mother liquor 142 which can include a $KOH^-K_2CO_3$ mixture. In another example, crystalline carbonate hydrate 322 can include sodium carbonate decahydrate ($Na_2CO_3 \cdot 10$ $H_2O$), and mother liquor 342 can include a $NaOH^-Na_2CO_3$ mixture. In another example, crystalline carbonate hydrate 322 can include potassium sodium carbonate hexahydrate ($KNaCO_3 \cdot 6$ $H_2O$). In some implementations, crystalline carbonate hydrate 322 can include a different stoichiometry of water molecules per unit carbonate in the crystalline carbonate (e.g., $M_2CO_3 \cdot n$ $H_2O$ where M is an alkali metal and n is an integer or fractional value). After separation from mother liquor 342, crystalline carbonate hydrate 322 is sent to regeneration subsystem 364 and mother liquor 342 is returned to nanofiltration unit 350 as draw-in solution.

Regeneration subsystem 364 includes a dissolving tank 306 fluidly coupled to a BPMED 308 and a flash tank 310. BPMED 308 is an example of an ED unit that employs BPMs and CEMs, but in some cases, regeneration subsystem 364 can include a different ED unit (e.g., an ED unit that includes one or more CEMs, AEMs, BPMs or a combination thereof). Together, process streams flowing to and from dissolving tank 306, BPMED 308 and flash tank 310 form a brine loop in which the DIC is protonated and $CO_2$ is released. Dissolving tank 306 can receive a water stream 328 and crystalline carbonate hydrate 322 from crystallizer 304.

In some cases, a polished aqueous solution can be used instead of or in addition to water stream 328. A polished aqueous solution can be substantially free of particulates and dissolved contaminants. Crystalline carbonate hydrate 322 dissolves in water and combines with bicarbonate $HCO_3^-$ in a brine stream 338 to form an ED feed solution 326. ED feed solution 326 can include a bicarbonate $HCO_3^-$-rich solution with a mixture of other components such as carbonate and water. BPMED 308 can include a stack of cells positioned between two electrodes. In some cases, the electrodes of BPMED 308 can be coupled to an intermittent low carbon intensity electricity source (e.g., solar, wind, geothermal) or a low carbon intensity electricity source (e.g., hydro, nuclear, renewable natural gas). Each cell can be arranged in a configuration that includes alternating BPMs and CEMs. The electrodes are operable to apply an electric potential to enable salt-splitting and acid-base recovery. BPMED 308 can include multiple feed-release compartments and alkaline regeneration compartments defined by BPMs and CEMs.

BPMED 308 is configured to receive ED feed solution 326 and a water stream 334 in one or more feed-release compartments. The BPMs of BPMED 308 enable a water-splitting reaction that splits water into hydroxyl ions and protons. BPMED 308 enables a salt-splitting reaction that splits salt into its cation and anion. The CEMs are operable to transfer the cation into the alkaline regeneration compartments. In the alkaline regeneration compartments, the cation combines with the hydroxyl ions to form a first ED product stream 332 having a hydroxide concentration between 0.5 M and 10 M.

For example, ED feed solution 326 can include a potassium bicarbonate $KHCO_3$-rich solution. The CEMs of BPMED 308 select for potassium ions $K^-$ and transport them into the alkaline regeneration compartments where $K^+$ combines with $OH^-$ to form KOH in first ED product stream 332. In the feed-release compartments, the bicarbonate $HCO_3^-$ ions are protonated directly in BPMED 308 to form a second ED product stream 330 comprising carbonic acid $H_2CO_3$. In some cases, carbonic acid dissociates into $CO_2$ and water, and $CO_2$ may partially degas in BPMED 308.

In some implementations, reduction in pH can cause carbonic acid to dissociate and release $CO_2$ within the cells of BPMED 308. In some implementations, BPMED 308 can include an inter-membrane distance of less than 1 mm between each BPM and CEM. For example, the BPM can be positioned 0.7 mm from the CEM. In some implementations, current densities between 50 $mA/cm^2$ and 2000 $mA/cm^2$ can be applied to BPMED 308.

A second ED product stream 330 generated by BPMED 308 can include an aqueous mixture with carbonic acid $H_2CO_3$ and bicarbonate $HCO_3^-$. For example, second ED product stream 330 can include an aqueous mixture of carbonic acid $H_2CO_3$, and potassium bicarbonate $KHCO_3$. Carbonic acid $H_2CO_3$ dissociates into $CO_2$ and water. Second ED product stream 330 can be sent to flash tank 310 wherein a $CO_2$ stream 336 is partially or fully released from flash tank 310 and sent to one or more downstream processing units described in ensuing implementations (e.g., compression unit, purification unit, electroreduction subsystem, carbon products manufacturing system, syngas generation reactor). A brine stream 338 including an aqueous mixture of bicarbonate $HCO_3^-$ can be sent to dissolving tank 306, completing the brine loop of regeneration subsystem 364.

The first ED product stream 332 can include an aqueous mixture with hydroxide as a predominant species. For example, first ED product stream 332 can include an aqueous solution of potassium hydroxide KOH. First ED product stream 332 can be returned to $CO_2$ capture subsystem 302 from BPMED 308 as a $CO_2$ capture solution 344. In some implementations, $CO_2$ capture solution 344 can include a hydroxide concentration between 0.5 M and 10 M. In some implementations, regeneration subsystem 364 can optionally include an auxiliary caustic evaporator 314. Auxiliary caustic evaporator 314 can include a mechanical vapour recompression (MVR) evaporator, a multi-effect evaporator, or a combination thereof. Auxiliary caustic evaporator 314 concentrates first ED product stream 332 by removing water to form $CO_2$ capture solution 344 and discharging a water stream 340. In such implementations, $CO_2$ capture solution 344 includes a carbonate-lean mixture and has a higher hydroxide concentration than first ED product stream 332. Together, process streams flowing to and from auxiliary caustic evaporator 314, $CO_2$ capture subsystem 302, carbonate separation subsystem 362, dissolving tank 306, and BPMED 308 form a caustic loop in which a capture solution is regenerated.

In each element of electrochemical system 100 in FIG. 1 or electrochemical system 300 in FIG. 3, one or more process streams can comprise a mixture of $CO_2$, $HCO_3^-$, and $CO_3^{2-}$ with concentrations that vary based on reactions partially or fully completing, and on process conditions. Ratios of dissolved $CO_2$, dissolved $H_2CO_3$, $HCO_3^-$, and $CO_3^{2-}$ concentrations in a process stream can depend on the pH. For example, as the pH decreases from 10 to 7.5, the $HCO_3^-$ concentration and $CO_2$ concentration can increase while the $CO_3^{2-}$ concentration decreases. In some cases, significant amounts of bicarbonate exist in each process stream included in the brine loop. BPMED 108 of electrochemical system 100 in FIG. 1 or BPMED 308 of electrochemical system 300 in FIG. 3 can operate at a pH range of approximately 1 to 14. For example, BPMED 108 and BPMED 308 can operate at a pH range of approximately 7 to 12.

Figure 4:
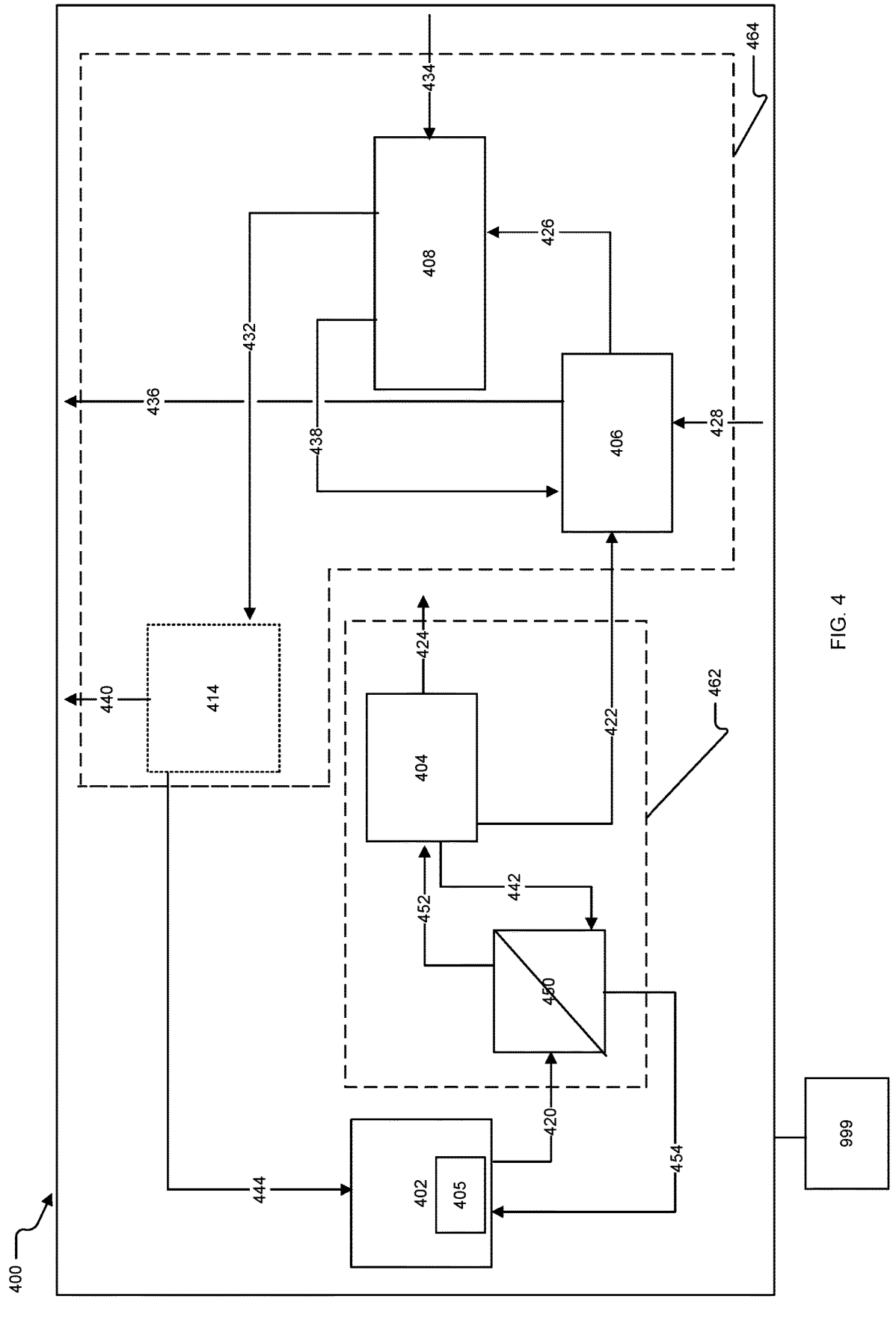
FIG. 4 is a block flow diagram illustrating an example electrochemical system for regenerating capture solution and recovering $CO_2$ by employing a nanofiltration unit and indirect protonation.

FIG. 4 is a block flow diagram illustrating an example electrochemical system 400 for regenerating capture solution and recovering $CO_2$ by employing a nanofiltration unit 450 and indirect protonation with a proton-shuttling species. In some cases, electrochemical system 400 can be advantageous over electrochemical system 100 of FIG. 1 and electrochemical system 300 of FIG. 3 because the DIC species is protonated outside of the ED unit, which avoids $CO_2$ degassing inside the cells of the ED unit. $CO_2$ degassing within the ED unit can be undesirable as it can increase electrical resistance and reduce cell active area. Thus, a brine loop including an indirect protonation system can be more efficient than a brine loop including a direct protonation system. Nanofiltration unit 450 can selectively produce a particular concentration of carbonate without requiring water removal to achieve saturation of carbonate, unlike a caustic evaporator.

Electrochemical system 400 includes a $CO_2$ capture subsystem 402 fluidly coupled to a carbonate separation subsystem 462 and a regeneration subsystem 464. Carbonate separation subsystem 462 includes nanofiltration unit 450 fluidly coupled to a crystallizer 404. In some implementations, crystallizer 404 can by fluidly coupled to a solids separator such as a centrifuge, pressure or vacuum filters, scrapers, cyclones, and the like. Carbonate separation subsystem 462 exploits the solubility differences between carbonate and hydroxide salts in the capture solution to enable efficient separation of carbonate. Nanofiltration unit 450 can receive a carbonate-rich capture solution 420 from $CO_2$ capture subsystem 402. In some implementations, $CO_2$ capture subsystem 402 can include one or more air contactors 405. The air contactors 405 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 405 can include single cell air contactors, dual cell air contactors, multi cell air contactors, dual flow air contactors, or a combination thereof. The air contactors can operate in crossflow, countercurrent flow, co-current flow, or a combination thereof.

Carbonate-rich capture solution 420 can be an aqueous mixture comprising primarily of carbonate ions, alkaline metal carbonate (e.g., $K_2CO_3$, $Na_2CO_3$), or a combination thereof. Carbonate-rich capture solution 420 can also include other components in smaller amounts, such as hydroxide ions, alkali metal hydroxide (e.g., KOH, NaOH), water, and impurities. For example, carbonate-rich capture solution 420 can comprise between 0.4 M to 6 M $K_2CO_3$ and between 1 M to 10 M KOH. In another implementation, carbonate-rich capture solution 420 can comprise an aqueous $Na_2CO_3$—NaOH mixture. In some implementations, carbonate-rich capture solution can comprise a mixture of $K_2CO_3$ and $Na_2CO_3$.

Nanofiltration unit 450 can concentrate carbonate via selective rejection, which can reduce the crystallizer load (evaporative heating or cooling refrigeration) on crystallizer 404 and can reduce feed flow rates and crystallizer sizing. Nanofiltration unit 450 can include one or more filtration membranes that are impermeable to or select for large divalent ions such as carbonate ions. Nanofiltration unit 450 can receive carbonate-rich capture solution 420 as a feed solution and a mother liquor 442 as a draw-in solution. Filtration membranes in nanofiltration unit 450 can select for and reject carbonate ions, thereby producing a retentate 452 comprising primarily concentrated carbonate and a permeate 454 (draw-out solution) comprising primarily of hydroxide. For example, nanofiltration unit 450 can receive $K_2CO_3$-rich solution as a feed and can receive a mother liquor 442 (which can include KOH, water, and small amounts of $K_2CO_3$) as a draw-in solution. Nanofiltration unit 450 can then produce concentrated $K_2CO_3$-rich solution as retentate 452 and $KOH^-$rich solution as permeate 454. Retentate 452 can include a higher carbonate concentration than carbonate-rich capture solution 420. In some implementations, retentate 452 can comprise approximately between 0.5 M to 6 M $K_2CO_3$. In some implementations, nanofiltration unit 450 can receive a $Na_2CO_3$-rich capture solution as feed and produce concentrated $Na_2CO_3$-rich solution as retentate 452 and $NaOH^-$rich solution as permeate 454. In some implementations, nanofiltration unit 450 can receive a mixed $K_2CO_3/Na_2CO_3$-rich capture solution as feed and produce concentrated mixed $K_2CO_3/Na_2CO_3$-rich solution as retentate 452 and mixed $KOH/NaOH^-$rich solution as permeate 454.

Nanofiltration unit 450 can include membranes that have a wide pH tolerance and are durable enough to operate at a pH ranging from 0 to 14. In some implementations, nanofiltration unit 450 can include membranes that are operable at a pH range of 3 to 14. In some implementations, nanofiltration unit 450 can include membranes that are stable handling hydroxide concentrations of up to 10 M. In some implementations, nanofiltration unit 450 can reject 85% to 100% of divalent ions (e.g., carbonate ions) to yield a retentate 452 that is carbonate-rich, and a permeate 454 that is hydroxide rich or carbonate-lean. In some cases, nanofiltration unit 450 can reject between 50% to 100% of divalent ions. In some cases, nanofiltration unit 450 can include a forward osmosis-style filtration unit that employs a draw solution and a pressure gradient to yield a carbonate-rich retentate. Nanofiltration unit 450 can include a plate and frame module that holds a number of nanofiltration membranes (e.g., flat membrane sheets) clamped together with spacers and supports.

In some implementations, nanofiltration unit 450 can include a feed tank configured to receive carbonate-rich capture solution 420 and a reject collection tank configured to receive retentate 452. Thus, nanofiltration unit 450 increases the respective concentrations of carbonate such that the carbonate salts in retentate 452 are less soluble, which reduces the crystallizer duty (evaporative heating or cooling refrigeration) on crystallizer 404.

Crystallizer 404 receives retentate 452 from nanofiltration unit 450. In some implementations, crystallizer 404 includes an evaporative crystallizer, a eutectic freeze crystallizer, a cooling crystallizer (e.g., vacuum or surface cooled), a membrane distillation crystallizer, or a combination thereof. Crystallizer 404 can be based on forced circulation, draft tube baffle, fluidized bed design, or a combination thereof. Crystallizer 404 increases the hydroxide concentration and thereby decreases the solubility of carbonate in retentate 452. The solubility of carbonate in retentate 452 is determined by the composition of retentate 452 and its position relative to the saturation curve. In some cases, crystallizer 404 evaporates a portion of retentate 452 to reach supersaturation. This forms a crystalline carbonate hydrate 422, a mother liquor 442, and a water stream 424. Crystallizer 404 discharges water stream 424 for downstream processing (e.g., in a filtration system, water treatment system, or disposal system) or use in another application within or beyond system 400. Crystalline carbonate hydrate 422 is at least partially separated from mother liquor 442 to form a pure or nearly pure carbonate that can be used in the feed solution for the ED unit. Mother liquor 442 can include the remaining components of concentrated carbonate solution 418, such as water and hydroxide, after crystalline carbonate hydrate 422 is separated. Crystalline carbonate hydrate 422 can include carbonate sesquihydrate ($M_2CO_3 \cdot 1.5\ H_2O$) or an anhydrous carbonate. For example, crystalline carbonate hydrate 422 can include potassium carbonate sesquihydrate ($K_2CO_3 \cdot 1.5\ H_2O$). Potassium carbonate sesquihydrate crystals can be at least partially isolated from mother liquor 442 which can include a $KOH^-K_2CO_3$ mixture. In another example, crystalline carbonate hydrate 422 can include sodium carbonate decahydrate ($Na_2CO_3 \cdot 10\ H_2O$), and mother liquor 442 can include a $NaOH^-Na_2CO_3$ mixture. In another example, crystalline carbonate hydrate 422 can include potassium sodium carbonate hexahydrate ($KNaCO_3 \cdot 6\ H_2O$). In some implementations, crystalline carbonate hydrate 422 can include a different stoichiometry of water molecules per unit carbonate in the crystalline carbonate (e.g., $M_2CO_3 \cdot n\ H_2O$ where M is an alkali metal and n is an integer or fractional value). After separation from mother liquor 442, crystalline carbonate hydrate 422 is sent to regeneration subsystem 464 and mother liquor 442 is returned to nanofiltration unit 450 as draw-in solution.

Regeneration subsystem 464 includes a dissolving tank 406 fluidly coupled to a BPMED 408. BPMED 408 is an example of an ED unit that employs BPMs and CEMs, but in some cases, regeneration subsystem 464 can include a different ED unit (e.g., an ED unit that includes one or more CEMs, AEMs, BPMs or a combination thereof). In some cases, dissolving tank 406 can operate at a pressure of up to 40 bar. Together, process streams flowing to and from dissolving tank 406 and BPMED 408 form a brine loop in which a proton-shuttling species (e.g., sulfate $SO_4^{2-}$, bisulfate $HSO_4^-$) is protonated in the BPMED, and protons are shuttled to dissolving tank 406 via the proton-shuttling species. In some implementations, the proton-shuttling species can include $Cl^-$, $I^-$, $Br$, $HPO_4^{-2}$ and $H_2PO_4^{-1}$, acetate, and citrate. In dissolving tank 406, the proton-shuttling species protonates the DIC species to form carbonic acid $H_2CO_3$. Thus, the brine loop allows for BPMED 408 to indirectly protonate the DIC species.

Dissolving tank 406 can receive a water stream 428, crystalline carbonate hydrate 422 from crystallizer 404, and a brine stream 438 from BPMED 408. In some cases, a polished aqueous solution can be used instead of or in addition to water stream 428. A polished aqueous solution can be substantially free of particulates and dissolved contaminants. Crystalline carbonate hydrate 422 dissolves in water and reacts with the proton-shuttling species in brine stream 438. For example, crystalline carbonate hydrate 422 can include potassium carbonate sesquihydrate ($K_2CO_3 \cdot 1.5\ H_2O$) which dissolves in water in dissolving tank 406 to yield potassium carbonate $K_2CO_3$. Brine stream 438 can include a bisulfate-rich solution. For example, brine stream 438 can include potassium bisulfate $KHSO_4$ as the proton-shuttling species. In some implementations, brine stream 438 can include between about 1 M to about 2.5 M sulfate. For example, brine stream 438 can include about 1 M potassium sulfate $K_2SO_4$ concentration. In another example, brine stream 438 can include about 2.5 M sodium sulfate $Na_2SO_4$. In some cases, brine stream 438 and ED feed solution 426 can include other sulfate or bisulfate concentrations (or both), depending on the operating temperature of BPMED 408. In dissolving tank 406, the bisulfate-rich solution can react with carbonate to yield a bisulfate-lean solution and carbonic acid. For example, potassium bisulfate $KHSO_4$ can react with potassium carbonate $K_2CO_3$ to yield potassium sulfate $K_2SO_4$ and carbonic acid $H_2CO_3$. As a result, pH will be reduced. The carbonic acid will have sufficient equilibrium $CO_2$ partial pressures (e.g., less than 1 bar) to cause dissociation into water and gaseous $CO_2$. Dissolving tank 406 can partially or fully release a gaseous $CO_2$ stream 436. Gaseous $CO_2$ stream 436 can be sent to one or more downstream processing units described in ensuing implementations (e.g., compression unit, purification unit, electroreduction subsystem, carbon products manufacturing system, syngas generation reactor).

Reactions in dissolving tank 406 form an ED feed solution 426. ED feed solution 426 can include a bisulfate-lean solution. For example, ED feed solution 426 can include potassium sulfate with a mixture of other components such as potassium bisulfate and water. Dissolving tank 406 is configured to flow ED feed solution 426 to a BPMED 408.

BPMED 408 can include a stack of cells positioned between two electrodes. In some cases, the electrodes of BPMED 408 can be coupled to an intermittent low carbon intensity electricity source (e.g., solar, wind, geothermal) or a low carbon intensity electricity source (e.g., hydro, nuclear, renewable natural gas). Each cell can be arranged in a configuration that includes alternating BPMs and CEMs. The electrodes are operable to apply an electric potential to enable salt-splitting and acid-base recovery. BPMED 408 can include multiple feed-release compartments and alkaline regeneration compartments defined by BPMs and CEMs.

BPMED 408 is configured to receive ED feed solution 426 and a water stream 434 in one or more feed-release compartments. The BPMs of BPMED 408 enable a water-splitting reaction that splits water into hydroxyl ions and protons. BPMED 408 enables a salt-splitting reaction that splits salt into its cation and anion. The CEMs are operable to transfer the cation into the alkaline regeneration compartments. In the alkaline regeneration compartments, the cation combines with the hydroxyl ions to form an ED product stream 432 having a hydroxide concentration between 0.5 M and 10 M.

For example, in a potassium-based system, ED feed solution 426 can include a potassium sulfate-rich solution. The CEMs of BPMED 408 select for potassium ions $K^+$ and transport them into the alkaline regeneration compartments where $K^+$ combines with $OH^-$ to form KOH in ED product stream 432. In the feed-release compartments, the proton-shuttling species can be protonated and combined with the cation to form brine stream 438. For example, the sulfate ions $SO_4^{2-}$ can be protonated and combined with potassium ion $K^+$ to form potassium bisulfate $KHSO_4$ in brine stream 438.

Dissolving tank 406 is configured to receive brine stream 438 from BPMED 408, completing the brine loop of regeneration subsystem 464. In some implementations, brine stream 438 can include between about 1 M to about 2.5 M sulfate and bisulfate.

For example, in a potassium-based system, brine stream 438 can include about 1 M potassium sulfate $K_2SO_4$ concentration and potassium bisulfate. In another example, brine stream 438 can include about 2.5 M sodium sulfate $Na_2SO_4$ and sodium bisulfate. In some cases, the brine stream 438 can include a combination of $K_2SO_4/KHSO_4$ and $NaSO_4/NaHSO_4$ with total concentrations of 2.5 M or lower. In some cases, the brine stream 438 can include a $KNaSO_4$ concentration of 1 M.

In some cases, brine stream 438 and ED feed solution 426 can include other sulfate or bisulfate concentrations (or both), depending on the operating temperature of BPMED 408 and conversion of sulfate to bisulfate in BPMED 408. The respective sulfate and bisulfate concentrations of ED feed solution 426 and brine stream 438 will depend on the lowest solubility species for any given operating temperature.

In some implementations, BPMED 408 can include an inter-membrane distance of less than 1 mm between each BPM and CEM. For example, the BPM can be positioned 0.7 mm from the CEM. In some implementations, current densities between 100 mA/cm² and 2000 mA/cm² can be applied to BPMED 408.

The ED product stream 432 can include an aqueous mixture with hydroxide as a predominant species. For example, ED product stream 432 can include an aqueous solution of potassium hydroxide KOH. ED product stream 432 can be returned to $CO_2$ capture subsystem 402 from BPMED 408 as a $CO_2$ capture solution 444. In some implementations, $CO_2$ capture solution 444 can include a hydroxide concentration between 0.5 M and 10 M. In some implementations, regeneration subsystem 464 can optionally include an auxiliary caustic evaporator 414. Auxiliary caustic evaporator 414 can include a mechanical vapour recompression (MVR) evaporator, a multi-effect evaporator, or a combination thereof. Auxiliary caustic evaporator 414 concentrates ED product stream 432 by removing water to form $CO_2$ capture solution 444 and discharging a water stream 440. For example, up to 20 m³ water per t-$CO_2$ delivered can be removed by auxiliary caustic evaporator 414. In such implementations, $CO_2$ capture solution 444 includes a carbonate-lean mixture and has a higher hydroxide concentration than ED product stream 432. Together, process streams flowing to and from auxiliary caustic evaporator 414, $CO_2$ capture subsystem 402, carbonate separation subsystem 462, dissolving tank 406, and BPMED 408 form a caustic loop in which a capture solution is regenerated.

In each element of electrochemical system 200 in FIG. 2 or electrochemical system 400 in FIG. 4, one or more process streams can comprise a mixture of DIC species or proton-shuttling species with concentrations that vary based on reactions partially or fully completing and on process conditions. Ratios of $CO_2$, $HCO_3^-$, and $CO_3^{2-}$, concentrations of $HSO_4^-$ and $SO_4^{2-}$, and total ionic strengths in a process stream can depend on the pH. For example, as the pH decreases from 10 to 7.5, the $HCO_3^-$ concentration and $CO_2$ concentration can increase while the $CO_3^{2-}$ concentration decreases. BPMED 208 of electrochemical system 200 in FIG. 2 or BPMED 408 of electrochemical system 400 in FIG. 4 can operate at a pH range of approximately 1 to 14. For example, BPMED 208 and BPMED 408 can operate with hydrogen ion concentrations ranging between 0.001 M and 2.5 M. For example, as cations in $K_2CO_3$ are displaced by protons to form $KHCO_3$, the total ionic strength will decrease because there are three ions in a $K_2CO_3$ molecule (two $K^+$ and one $CO_3^2$) and two ions in a $KHCO_3$ molecule (one $K^+$ and one $HCO_3^-$).

In some implementations, electrochemical system 200 in FIG. 2 or electrochemical system 400 in FIG. 4 can include an optional flash tank. The optional flash tank can be fluidly coupled to dissolving tank 206, 406 and to BPMED 208, 408. The optional flash tank can receive an outlet stream from dissolving tank 206, 406. $CO_2$ stream 236, 436 can degas from the optional flash tank in addition to or instead of dissolving tank 206, 406. ED feed solution 226, 426 can flow from the optional flash tank to BPMED 208, 408.

Nanofiltration unit 350 in FIG. 3 and nanofiltration unit 450 in FIG. 4 can each be preceded by a primary filtration system (e.g., ultrafiltration system) configured to remove solids such as silicates, water hardness, surfactant additives, or salts that cause salinity concerns. This configuration can enable nanofiltration units 350 and 450 to use non-potable water sources such as brackish water. This configuration can protect nanofiltration units 350 and 450 from potentially harmful contaminants and can prevent carry-over of species to downstream processes and units.

FIG. 5 is a flowchart illustrating an example method 500 for regenerating a $CO_2$ capture solution and recovering $CO_2$ via an electrochemical system, according to at least one illustrated embodiment of the present disclosure. Method 500 includes steps 502 to 516, though in other implementations, certain steps can be omitted and additional steps can be added. Steps 502 to 516 can be performed sequentially as illustrated or can be performed in a different order than the illustrated method.

At 502, a carbonate-rich capture solution is flowed to a carbonate separation subsystem including a crystallizer. A carbonate-rich capture solution comprising $K_2CO_3$, KOH, $H_2O$, NaOH, $Na_2CO_3$, or a combination thereof can be flowed to the carbonate separation subsystem. In some implementations, the carbonate-rich capture solution can be flowed to an evaporative crystallizer, a eutectic freeze crystallizer, a cooling crystallizer (e.g., vacuum or surface cooled), a membrane distillation crystallizer, or a combination thereof. In some implementations, the carbonate-rich capture solutions can be flowed to a primary caustic evaporator (e.g., a mechanical vapour recompression (MVR) evaporator, a multi-effect evaporator, or a combination thereof) before the crystallizer.

At 504, a crystalline carbonate hydrate and a mother liquor are formed in the crystallizer. In some implementations, the crystalline carbonate hydrate can include potassium carbonate sesquihydrate ($K_2CO_3 \cdot 1.5 \ H_2O$) or anhydrous potassium carbonate, which is formed by increase the hydroxide concentration of the carbonate-rich capture solution to decrease solubility of carbonate. In some implementations, the mother liquor can include potassium hydroxide KOH, water, and small amounts of potassium carbonate $K_2CO_3$. In some implementations, the crystalline carbonate hydrate can include a sodium carbonate hydrate or anhydrous sodium carbonate. In some implementations, the mother liquor can include sodium hydroxide NaOH.

At 506, the crystalline carbonate hydrate is dissolved in a dissolving tank. The dissolved carbonate combines with bicarbonate $HCO_3^-$ in a brine stream to form an ED feed solution. In some implementations, the dissolved carbonate combines with a brine stream to form an ED feed solution that is a bicarbonate-rich a solution.

At 508, a water stream and the ED feed solution are flowed to an ED unit. In some implementations, the water stream is flowed to one or more alkaline regeneration compartments of the ED unit. In some implementations, the ED feed solution is flowed to one or more feed-release compartments of the ED unit.

At 510, an electric potential is applied to the ED unit. In some implementations, the electric potential is applied by an intermittent low carbon intensity electricity source (e.g., solar, wind, geothermal) or a low carbon intensity electricity source (e.g., hydro, nuclear, renewable natural gas). In some implementations, a current density of up to 2000 $mA/cm^2$ can be applied to the ED unit. BPMs of the ED unit can split water into hydroxyl ions and protons and provide hydroxyl ions to one or more alkaline regeneration compartments. CEMs of the ED unit can transfer cations (e.g., alkali metal ions) of the ED feed solution into the one or more alkaline regeneration compartments.

At 512, an ED product stream is formed via a caustic loop including the ED unit. Cations combine with hydroxyl ions in the alkaline regeneration compartments to form an ED product stream. In some implementations, the ED product stream may have a hydroxide concentration between 1 M and 10 M.

At 514, a $CO_2$ gas stream is released via a brine loop including the ED unit. Protonation of bicarbonate forms carbonic acid that can dissociate to release the $CO_2$ gas stream. In some implementations, the brine loop includes a direct protonation system. In direct protonation, a DIC species is protonated in the feed-release compartment of the ED unit. In some implementations, the brine loop includes an indirect protonation system. In indirect protonation, the ED unit protonates a proton-shuttling species (e.g., sulfate, bisulfate) that is transferred to an external flash tank where the DIC species is protonated to release a $CO_2$ gas stream. It can be beneficial to avoid $CO_2$ degassing within the ED unit by pressurizing the ED unit to reduce bubble formation and electrical resistance. Operating the ED unit at pressure can also reduce costs of $CO_2$ compression downstream. In some implementations, the ED unit can operate at a pressure that is approximately equal to a $CO_2$ off gassing pressure (e.g., about 40 bar). In some implementations, the ED unit can operate at a pressure that is approximately equal to the first stage of compression in a downstream compressor (e.g., pressure of 1 bar or higher).

At 516, a $CO_2$ capture solution including the ED product stream is returned to a $CO_2$ capture subsystem. In some implementations, the ED product stream can be concentrated in an auxiliary caustic evaporator to form the $CO_2$ capture solution that is returned to the $CO_2$ capture subsystem. In some implementations, the $CO_2$ capture solution can include a hydroxide concentration between 0.5 M and 10 M.

Each of the above steps can be modified to accommodate $CO_2$ capture and capture solution regeneration via a different chemistry. For example, $NaOH^-$based reactions can substitute the $KOH^-$based reactions described in method 500.

In each of the electrochemical systems 100, 200, 300, and 400 in FIG. 1 through FIG. 4 and method 500 of FIG. 5, it can be beneficial to off gas $CO_2$ stream 136, 236, 336, 436 at a high pressure to reduce costs of downstream compression. For example, $CO_2$ can be released at a pressure that is equal to or higher than the first stage of compression in a downstream compressor (e.g., pressure of 1 bar or higher). In some instances, $CO_2$ can be released at about 40 bar. In some cases, BPMED 108, 208, 308, 408 can each be pressurized to decrease bubble formation and electrical resistance, thereby increasing the stack efficiency. For example, BPMED 108, 208, 308, 408 can be operated at pressure that is approximately equal to a $CO_2$ off gassing pressure (e.g., about 40 bar). In some implementations, BPMED 108, 208, 308, 408 can operate at operating temperatures ranging from 25° C. to 90° C. For example, BPMED 108, 208, 308, 408 can operate at operating temperatures ranging from 40° C. to 60° C.

The implementations described herein relates to an ED unit including an alternating CEM-BPM arrangement. In other possible configurations of the ED unit, each of BPMED 108, 208, 308, 408 in FIG. 1 through FIG. 4 and the ED unit described in method 500 in FIG. 5 can comprise an anion exchange membrane (AEM). For example, the BPMED 108, 208, 308, 408 can include repeating BPM-CEM-AEM arrangement interposed between electrodes. The BPMED 108, 208, 308, 408 can include separate alkaline regeneration, feed, and release compartments. In another example, the BPMED 108, 208, 308, 408 can include an alternating BPM-AEM arrangement interposed between electrodes. The BPMED can include separate feed and release compartments. In such cases, electrochemical system 100, 200, 300, 400 can include one or more additional process streams or exclude one or more of the illustrated process streams.

In each of the electrochemical systems 100, 200, 300, 400, 700, 800 in FIG. 1 through FIG. 4, FIG. 7, FIG. 8, FIG. 10 and method 500 of FIG. 5, $CO_2$ stream 136, 236, 336, 436, 736, 836, 1036, 1136, 1236, 1336 in FIG. 1 through FIG. 4, FIG. 7, FIG. 8, FIG. 10 through FIG. 13 can be sent to a downstream processing system. In some implementations, $CO_2$ can be pressurized in a downstream compression unit which can include a single stage or multi-stage gas compressor (e.g., piston compressor, reciprocating compressor). In some cases, $CO_2$ can be sent to a clean-up unit (e.g., purification unit) that removes at least a portion of residual water and/or other impurities. In some cases, the downstream compression unit can include a refrigeration system that liquefies the $CO_2$ at low pressures, making it pumpable with a liquid pump. In some cases, the downstream compression unit can compress $CO_2$ stream 136, 236, 336, 436, 736, 836, 1036 up to about 40 bar. Compressed $CO_2$ can be delivered downhole and sequestered in a geological formation, subsurface reservoir, carbon sink, and the like. In certain downhole conditions, $CO_2$ can mineralize into a solid product, such as calcium carbonate. In some instances, compressed $CO_2$ may be used for enhanced oil recovery by injection into one or more wellbores to enhance production of hydrocarbons from a reservoir. In some implementations, $CO_2$ stream 136, 236, 336, 436, 736, 836, 1036 can be fed to a downstream fuel synthesis system, which can include a syngas generation reactor. The syngas generation reactor can produce a syngas product stream by a reverse water gas shift reaction, a steam methane reforming reaction, a direct methane reforming reaction, or a combination thereof. The downstream fuel synthesis system can also include a Fischer-Tropsch reactor that can react syngas and hydrogen to produce hydrocarbon products such as fuel. In some implementations, the downstream fuel synthesis system can include electrochemical alternatives to Fischer-Tropsch reactors, such as electroreduction units or gas diffusion electrodes.

In some implementations, $CO_2$ stream 136, 236, 336, 436, 736, 836, 1036 in FIG. 1 through FIG. 4, FIG. 7, FIG. 8, FIG. 10 can be sent to an electrolyzer cell that carries out one or more of the following reactions:

Reaction 6: $CO_2 + 2e^- \rightarrow CO + O^{2-}$

Reaction 7: $H_2O + 2e^- \rightarrow H_2 + O^{2-}$

Reaction 8: $O^{2-} \rightarrow \frac{1}{2}O_2 + 2e^-$

The electrolyzer cell can form downstream products such as syngas, pure carbon monoxide, or pure hydrogen from feedstocks, such as $CO_2$ stream 136, 236, 336, 436, 736, 836, 1036, 1136, 1236, 1336 in FIG. 1 through FIG. 4, FIG. 7, FIG. 8, FIG. 10 through FIG. 13, or water (or both). The electrolyzer cell can include a nickel-based catalyst, a silver-based catalyst, or a noble metal-based catalyst. In some implementations, the electrolyzer cell is a solid oxide electrolyzer cell. In some implementations, the electrolyzer cell can yield a syngas ratio suitable for downstream Fischer-Tropsch reactions that form value-added carbon products (e.g., short chain hydrocarbons, FT liquids, waxes, etc.). For example, the electrolyzer cell can yield a syngas ratio of 2.5 or higher.

Figure 6:
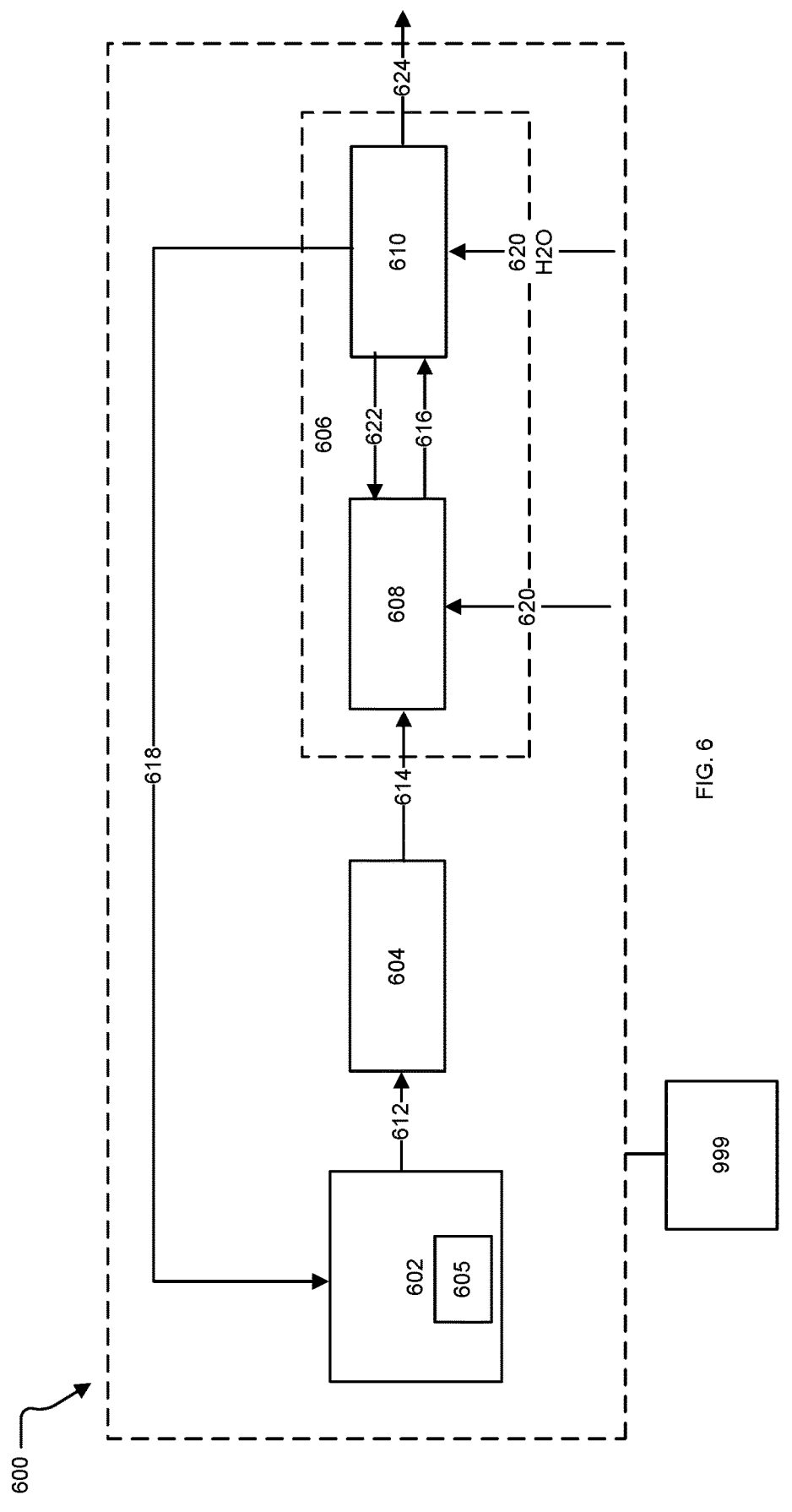
FIG. 6 is a block flow diagram illustrating an example electrochemical system for generating reduced products by employing a $CO_2$ electroreduction unit.

Carbon products derived from direct air capture technology are desirable as these products generally have low or zero net emissions on a lifecycle basis. Each of electrochemical systems 100 to 400 in FIG. 1 through FIG. 4 can be modified or integrated with approaches for generating value-added carbon products, such as syngas or short chain hydrocarbons, in-situ without necessitating a gaseous $CO_2$ feedstock for an electrochemical cell. This is desirable because gaseous $CO_2$ can lower the pH of the cell, leading to conditions that favor hydrogen formation. FIG. 6 depicts an example electrochemical system 600 that yields reduced products, including carbon products, from a bicarbonate solution and includes one or more elements of electrochemical systems 100, 200, 300, 400 according to implementations described in FIG. 1 through FIG. 4.

FIG. 6 is a block flow diagram illustrating an example electrochemical system 600 for generating reduced products by employing a $CO_2$ electroreduction unit 610. Electroreduction can also be referred to as electrochemical reduction. Electrochemical system 600 includes a $CO_2$ capture subsystem 602 fluidly coupled to a products generation subsystem 606 via a carbonate separation subsystem 604.

$CO_2$ capture subsystem 602 can be substantially similar to one or more of $CO_2$ capture subsystem 102, 202, 302, 402 and can include one or more process streams or reactions as described in FIG. 1 through FIG. 4. In some implementations, $CO_2$ capture subsystem 602 can include one or more air contactors 605 similar to air contactors 105, 205, 305, 405. The air contactors 605 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 605 can include single or multi cell air contactors, dual cell air contactors, dual flow air contactors, or a combination thereof. The air contactors can operate in crossflow, countercurrent flow, co-current flow, or a combination thereof. $CO_2$ capture subsystem 602 provides a carbonate-rich solution 612 to carbonate separation subsystem 604.

Carbonate-rich solution 612 can be an aqueous mixture comprising primarily carbonate ions, alkaline metal carbonate (e.g., $K_2CO_3$, $Na_2CO_3$), or a combination thereof. Carbonate-rich capture solution 612 can also include other components in smaller amounts, such as hydroxide ions, alkali metal hydroxide (e.g., KOH, NaOH), water, and impurities. For example, carbonate-rich capture solution 612 can comprise between 0.4 M to 6 M $K_2CO_3$ and between 1 M to 10 M KOH. In another implementation, carbonate-rich capture solution 612 can comprise an aqueous $Na_2CO_3$—NaOH mixture. In some implementations, carbonate-rich capture solution can comprise a mixture of $K_2CO_3$ and $Na_2CO_3$.

Carbonate separation subsystem 604 receives carbonate-rich capture solution 612. Carbonate separation subsystem 604 can include one or more elements, process streams, and reactions from carbonate separation subsystems 162, 262, 362, 462 according to implementations described in FIG. 1 through FIG. 4. In some implementations, carbonate separation subsystem 604 can include a caustic evaporator or a crystallizer (or both), and one or more of the process streams flowed to or from these units according to implementations described in FIG. 1 and FIG. 2. In some implementations, carbonate separation subsystem 604 can include a nanofiltration unit or a crystallizer (or both), and one or more of the process streams flowed to or from these units according to implementations described in FIG. 3 and FIG. 4. Carbonate separation subsystem 604 yields a crystalline carbonate hydrate 614.

Crystalline carbonate hydrate 614 can include carbonate sesquihydrate ($M_2CO_3 \cdot 1.5\ H_2O$) or an anhydrous carbonate. For example, crystalline carbonate hydrate 122 can include potassium carbonate sesquihydrate ($K_2CO_3 \cdot 1.5\ H_2O$). In another example, crystalline carbonate hydrate 614 can include sodium carbonate decahydrate ($Na_2CO_3 \cdot 10\ H_2O$). In another example, crystalline carbonate hydrate 614 can include potassium sodium carbonate hexahydrate ($KNaCO_3 \cdot 6\ H_2O$). In some implementations, crystalline carbonate hydrate 614 can include a different stoichiometry of water molecules per unit carbonate in the crystalline carbonate (e.g., $M_2CO_3 \cdot n\ H_2O$ where M is an alkali metal and n is an integer or fractional value).

Products generation subsystem 606 receives crystalline carbonate hydrate 614. Products generation subsystem 606 includes a dissolving tank 608 fluidly coupled to $CO_2$ electroreduction unit 610. Products generation subsystem 606 can include one or more elements, process streams, or reactions of regeneration subsystem 164 and 364 according to implementations described in FIG. 1 and FIG. 3. In some implementations, products generation subsystem 606 can include a caustic evaporator and one or more of the process streams flowed to or from this unit according to implementations described in FIG. 1 and FIG. 3.

Dissolving tank 608 can receive crystalline carbonate hydrate 614 from carbonate separation subsystem 604, a water stream 620, and a brine stream 622. In some cases, a polished aqueous solution can be used instead of or in addition to water stream 620. A polished aqueous solution can be substantially free of particulates and dissolved contaminants. Crystalline carbonate hydrate 614 dissolves in water and combines with bicarbonate $HCO_3^-$ in brine stream 622 to form a cell feed solution 616. Cell feed solution 616 can include a bicarbonate $HCO_3^-$-rich solution with a mixture of other components such as carbonate and water.

$CO_2$ electroreduction unit 610 receives cell feed solution 616 and water stream 620. $CO_2$ electroreduction unit 610 includes one or more BPMs and one or more catalyst layers interposed between two electrodes. The electrodes can include nickel, silver, or a non-precious metal. In some implementations, $CO_2$ electroreduction unit 610 can also include CEMs, AEMs, or a combination thereof. In some implementations, $CO_2$ electroreduction unit 610 employs a catalyst including silver, mercury, tin, copper, or a combination thereof to carry out any of the ensuing reduction reactions. In some implementations, $CO_2$ electroreduction unit can yield a reduced products stream 624 from gaseous $CO_2$, dissolved $CO_2$, or a combination thereof. In some implementations, current densities between 50 $mA/cm^2$ and 2000 $mA/cm^2$ can be applied to $CO_2$ electroreduction unit 610.

In some implementations, cell feed solution 616 can flow to a BPMED, such as BPMED 108, 208, 308, 408, 708, 808, 900 in FIG. 1 through FIG. 4 and FIG. 7 through FIG. 9, or ED unit 1000 in FIG. 10, prior to flowing to $CO_2$ electroreduction unit 610. In such implementations, the BPMED can treat or prepare cell feed solution 616 by shifting the pH to a preferred range that improves operation of $CO_2$ electroreduction unit 610 while avoiding fully degassing $CO_2$ in the BPMED. For example, the BPMED can shift the pH of cell feed solution 616 to between 8 and 10 by carrying one or more of reactions 1 through 3 before flowing cell feed solution 616 to $CO_2$ electroreduction unit 610.

BPMs in $CO_2$ electroreduction unit 610 enable a water-splitting reaction to provide protons to the cathode. With sufficient flux, protons can react with bicarbonate in cell feed solution 616 (e.g., via reactions 1 through 3) to yield dissolved $CO_2$ or gaseous $CO_2$ locally (or both). Further, $CO_2$ electroreduction unit 610 can electrochemically reduce the locally yielded $CO_2$ (formed by protonation of DIC species) by one or more of the following reduction reactions:

Reaction 9: $CO_2 + 2\ H^+ + 2\ e^- \rightarrow CO + H_2O$

Reaction 10: $CO_2 + 8\ H^+ + 8\ e^- \rightarrow CH_4 + 2\ H_2O$

Reaction 11: $2\ CO_2 + 12\ H^+ + 12\ e^- \rightarrow C_2H_4 + 4\ H_2O$

Electrochemical reduction typically occurs at the catalyst surface. In some cases, $CO_2$ electroreduction unit 610 can yield other short chain hydrocarbons or alcohols. $CO_2$ electroreduction unit 610 can be advantageous over an electrolyzer because it uses bicarbonate in cell feed solution 616 as the carbon source for the electroreduction reactions, therefore eliminating the need for a gaseous $CO_2$ feed. This enables the cell to operate at a pH that favours production of reduced carbon products over production of hydrogen. Reduced products stream 624 can include CO, $H_2$, syngas, formate, methane, ethylene, ethanol, water, or a combination thereof.

$CO_2$ electroreduction unit 610 is configured to combine hydroxyl ions provided by the BPMs with cations in cell feed solution 616 to form a carbonate-lean solution 618. For example, cell feed solution 616 can include a potassium bicarbonate $KHCO_3$-rich solution. $CO_2$ electroreduction unit 610 can combine potassium ions with hydroxyl ions provided by the BPMs to form KOH in carbonate-lean solution 618. Carbonate-lean solution 618 can be sent to $CO_2$ capture subsystem 602 as regenerated capture solution.

Figure 7:
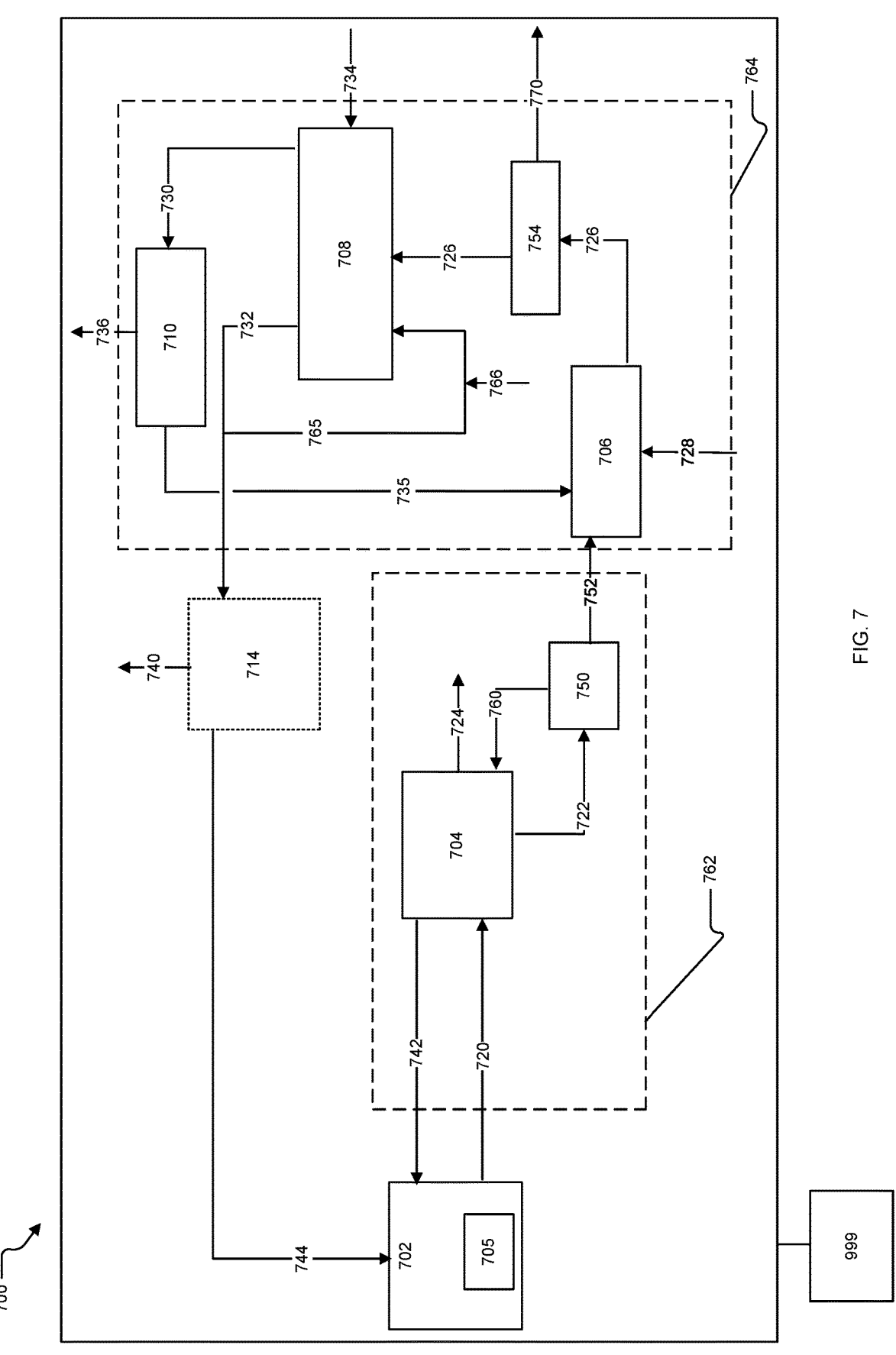
FIG. 7 is a block flow diagram illustrating an example electrochemical system for regenerating capture solution and recovering $CO_2$ by employing a chiller crystallizer and direct protonation.

FIG. 7 is a block flow diagram illustrating an example electrochemical system 700 for regenerating capture solution and recovering $CO_2$ by employing a chiller crystallizer 704 and direct protonation. In some cases, electrochemical system 700 can be advantageous over electrochemical system 100, 200, 300, 400 of FIG. 1 to FIG. 4 because chiller crystallizers can be relatively economical and can eliminate the need for an upstream evaporator. Electrochemical system 700 includes a $CO_2$ capture subsystem 702 fluidly coupled to a carbonate separation subsystem 762 and a regeneration subsystem 764. Carbonate separation subsystem 762 includes a chiller crystallizer 704 fluidly coupled to a solids separator 750. Examples of solids separator 750 can include centrifuges, pressure or vacuum filters, clarifiers, scrapers, cyclones, salt baskets, and the like. Chiller crystallizer 704 receives a carbonate-rich capture solution 720 from $CO_2$ capture subsystem 702. In some implementations, $CO_2$ capture subsystem 702 can include one or more air contactors 705. The air contactors 705 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 705 can include single or multi cell air contactors, dual cell air contactors, dual flow air contactors, or a combination thereof. The air contactors can operate in crossflow, countercurrent flow, co-current flow, or a combination thereof.

Carbonate-rich capture solution 720 can be an aqueous mixture comprising primarily carbonate ions, alkaline metal ions, alkaline metal carbonate (e.g., $K_2CO_3$, $Na_2CO_3$), or a combination thereof. Carbonate-rich capture solution 720 can also include other components in smaller amounts, such as hydroxide ions, alkali metal hydroxide (e.g., KOH, NaOH), water, and impurities. For example, carbonate-rich capture solution 720 can comprise between 0.1 M to 6 M $K_2CO_3$ and between 1 M to 10 M KOH. In another implementation, carbonate-rich capture solution 720 can comprise an aqueous $Na_2CO_3$—NaOH mixture. In some implementations, carbonate-rich capture solution can comprise a mixture of $K_2CO_3$ and $Na_2CO_3$.

Chiller crystallizer 704 increases the hydroxide concentration and thereby decreases the solubility of carbonate in carbonate-rich capture solution 720. In some cases, crystallizer 704 concentrates a portion of carbonate-rich capture solution 720 to reach supersaturation. This forms a crystalline carbonate hydrate 722, a mother liquor 742, and a water stream 724. Chiller crystallizer 704 discharges water stream 724 for downstream processing (e.g., in filtration system, water treatment system, or disposal system) or use in another application within or beyond system 700. Crystalline carbonate hydrate 722 is at least partially separated from mother liquor 742 to form a pure or nearly pure carbonate that can be used in the feed solution for the ED unit. Mother liquor 742 can include the remaining components of carbonate-rich capture solution 720, such as water and hydroxide, after crystalline carbonate hydrate 722 is separated. Crystalline carbonate hydrate 722 can include carbonate sesquihydrate ($M_2CO_3 \cdot 1.5\ H_2O$) or an anhydrous carbonate. For example, crystalline carbonate hydrate 722 can include potassium carbonate sesquihydrate ($K_2CO_3 \cdot 1.5\ H_2O$). Potassium carbonate sesquihydrate crystals can be at least partially isolated from mother liquor 742 which can include a $KOH^-K_2CO_3$ mixture. In another example, crystalline carbonate hydrate 722 can include sodium carbonate decahydrate ($Na_2CO_3 \cdot 10$ $H_2O$), and mother liquor 742 can include a $NaOH^- Na_2CO_3$ mixture. In another example, crystalline carbonate hydrate 722 can include potassium sodium carbonate hexahydrate ($KNaCO_3 \cdot 6$ $H_2O$). In some implementations, crystalline carbonate hydrate 722 can include a different stoichiometry of water molecules per unit carbonate in the crystalline carbonate (e.g., $M_2CO_3 \cdot n$ $H_2O$ where M is an alkali metal and n is an integer or fractional value). After separation from mother liquor 742, crystalline carbonate hydrate 722 can be sent to solids separator 750 or to regeneration subsystem 764, and mother liquor 742 is returned to $CO_2$ capture subsystem 702. Solids separator 750 can further isolate crystalline carbonate hydrate 722 from remaining liquid, forming a high solids stream 752 that can flow to dissolving tank 706 and a low solids stream 760 that can return to chiller crystallizer 704. High solids stream 752 comprises primarily crystalline carbonate hydrate 722. The low solids stream 760 has a higher liquid-to-solid ratio than high solids stream 752. High solids stream 752 has a lower liquid-to-solid ratio than both of low solids stream 760 and the inlet stream of solids separator 750.

In an embodiment, the chiller crystallizer 704 of the electrochemical system 700 includes mechanical refrigeration equipment. Such mechanical refrigeration equipment may include one or more pump(s), one or more heat exchanger(s) circulating a refrigerant, piping, and/or other componentry. In an alternate embodiment, the chiller crystallizer 704 increases the hydroxide concentration and thereby decreases the solubility of carbonate in the carbonate-rich capture solution 720 using other cooling means. For example, the chiller crystallizer 704 concentrates a portion of carbonate-rich capture solution 720 to reach supersaturation using ambient or environmental cooling methods to form the crystalline carbonate hydrate 722. In such a configuration, the chiller crystallizer 704 may saturate the carbonate-rich capture solution 720 to form the crystalline carbonate hydrate 722 using no mechanical refrigeration means, or by relying less on mechanical refrigeration means, and as such reduce the associated refrigeration energy requirements.

Regeneration subsystem 764 includes a dissolving tank 706 fluidly coupled to a BPMED 708 and a flash tank 710. BPMED 708 is an example of an ED unit that employs BPMs and CEMs, but in some cases, regeneration subsystem 764 can include a different ED unit (e.g., an ED unit that includes one or more CEMs, AEMs, BPMs or a combination thereof). Together, process streams flowing to and from dissolving tank 706, BPMED 708 and flash tank 710 form a brine loop in which the DIC is protonated and $CO_2$ is released. In some implementations, dissolving tank 706 can receive a water stream 728 and crystalline carbonate hydrate 722 from crystallizer 104. In some cases, a polished aqueous solution can be used instead of or in addition to water stream 728. A polished aqueous solution can be substantially free of particulates and dissolved contaminants. In some implementations, dissolving tank 706 can receive a high solids stream 752 comprising crystalline carbonate hydrate 722 from solids separator 750. Crystalline carbonate hydrate 722 in high solids stream 752 dissolves in water and combines with bicarbonate $HCO_3^-$ in a brine stream 735 received from the flash tank 710 to form an ED feed solution 726. ED feed solution 726 can include a bicarbonate $HCO_3^-$-rich solution with a mixture of other components such as carbonate and water. In some cases, ED feed solution 726 can flow through an ion exchanger 754 for reducing or removing at least a portion of undesirable divalent and multivalent cations (e.g., $Ca^{2+}$, $Mg^{2+}$, iron, zinc, etc.). Trapped ions can be removed from ion exchanger 754 by using a new column and regenerating the used column by displacing trapped ions with an acid or a base. These columns can be configured to operate in trains such that some columns remain in operation while others are being regenerated. Regenerating the used column can produce ion exchange regenerate waste stream 770 that includes waste salts.

BPMED 708 can include a stack of cells positioned between two electrodes. In some cases, the electrodes of BPMED 708 can be coupled to an intermittent electricity source (e.g., solar, wind, geothermal) or a low carbon intensity electricity source (e.g., hydro, nuclear). Each cell can be arranged in a configuration that includes alternating BPMs and CEMs. The electrodes are operable to apply an electric potential to enable salt-splitting and acid-base recovery. BPMED 708 can include multiple feed-release compartments and alkaline regeneration compartments defined by BPMs and CEMs.

BPMED 708 is configured to receive ED feed solution 726 and a water stream 734 in one or more feed-release compartments. The BPMs of BPMED 708 enable a water-splitting reaction that splits water into hydroxyl ions and protons. BPMED 708 enables a salt-splitting reaction that splits salt into its cation and anion. The CEMs are operable to transfer the cation into the alkaline regeneration compartments. In the alkaline regeneration compartments, the cation combines with the hydroxyl ions to form a first ED product stream 732 having a hydroxide concentration between 0.5 M and 12 M. For example, ED feed solution 726 can include a potassium bicarbonate $KHCO_3$-rich solution. The CEMs of BPMED 708 select for potassium ions $K^+$ and transport them into the alkaline regeneration compartments where $K^+$ combines with $OH^-$ to form KOH in the first ED product stream 732. In the feed-release compartments, the bicarbonate $HCO_3^-$ ions are protonated directly in BPMED 708 to form a second ED product stream 730 comprising carbonic acid $H_2CO_3$. In some cases, CEMs are operable to transfer potassium ions $K^+$, sodium ions $Na^+$, or a combination thereof.

In some implementations, reduction in pH can cause carbonic acid to dissociate and release $CO_2$ within the cells of BPMED 708. In some implementations, BPMED 708 can include an inter-membrane distance of less than 1 mm between each BPM and CEM. For example, the BPM can be positioned 0.7 mm from the CEM. In some implementations, current densities between 50 $mA/cm^2$ and 2000 $mA/cm^2$ can be applied to BPMED 708.

A second ED product stream 730 can include an aqueous mixture with carbonic acid $H_2CO_3$ and bicarbonate $HCO_3^-$. For example, the second ED product stream 730 can include an aqueous mixture of carbonic acid $H_2CO_3$, and potassium bicarbonate $KHCO_3$. For example, the second ED product stream 730 can include an aqueous mixture of carbonic acid $H_2CO_3$, potassium bicarbonate $KHCO_3$, and sodium bicarbonate $NaHCO_3$. Carbonic acid $H_2CO_3$ dissociates into $CO_2$ and water. The second ED product stream 730 can be sent to flash tank 710 where a $CO_2$ stream 736 is partially or fully released from flash tank 710 and sent to one or more downstream processing units described in ensuing implementations (e.g., compression unit, electroreduction subsystem, carbon products manufacturing system, syngas generation reactor). A brine stream 735 including an aqueous mixture of bicarbonate $HCO_3^-$ can be sent to dissolving tank 706, completing the brine loop of regeneration subsystem 764.

The first ED product stream 732 can include an aqueous mixture with hydroxide as a predominant species. For example, the first ED product stream 732 can include an aqueous solution of potassium hydroxide KOH. The first ED product stream 732 can be returned to $CO_2$ capture subsystem 702 from BPMED 108 as a $CO_2$ capture solution 744. In some implementations, $CO_2$ capture solution 744 can include a hydroxide concentration between 0.5 M and 10 M. In implementations, a portion of first ED product stream 732 can be returned to BPMED 708 as an ED recycle stream 765, and processed water 766 can be added to ED recycle stream 765. For example, processed water 766 can include demineralized, distilled, filtered, purified, or treated water. The ED recycle stream 765 and processed water 766 can maintain compositions of solutions in the feed-release compartments and alkaline regeneration compartments of the BPMED 708.

In some implementations, regeneration subsystem 764 can optionally include an auxiliary caustic evaporator 714. Auxiliary caustic evaporator 714 can include a mechanical vapour recompression (MVR) evaporator, a multi-effect evaporator, or a combination thereof. Auxiliary caustic evaporator 714 concentrates first ED product stream 732 by removing water to form $CO_2$ capture solution 744 and discharging a water stream 740. In such implementations, $CO_2$ capture solution 744 includes a carbonate-lean mixture and has a higher hydroxide concentration than first ED product stream 732. Together, process streams flowing to and from auxiliary caustic evaporator 714, $CO_2$ capture subsystem 702, carbonate separation subsystem 762, dissolving tank 706, and BPMED 708 form a caustic loop in which a capture solution is regenerated.

While electrochemical system 700 employs a chiller crystallizer 704 and direct protonation, in some implementations, it can be advantageous to employs a chiller crystallizer 704 and indirect protonation as described in electrochemical system 200, 400 in FIG. 2 and FIG. 4, wherein flash tank 710 is excluded from electrochemical system 700. In some cases, indirect protonation can be advantageous because the DIC species is protonated outside of the ED unit, which avoids $CO_2$ degassing inside the cells of the ED unit. For example, high solids stream 752 comprising crystalline carbonate hydrate 722 can flow to dissolving tank 706. Together, process streams flowing to and from dissolving tank 706 and BPMED 708 form a brine loop in which a proton-shuttling species (e.g., sulfate $SO_4^{2-}$, bisulfate $HSO_4^-$) is protonated in the ED unit, and protons are shuttled to dissolving tank 706 via the proton-shuttling species. In some implementations, the proton-shuttling species can include $Cl^-$, $F$, $Br$, $HPO_4^{-2}$ and $H_2PO_4^{-1}$, acetate, and citrate. In dissolving tank 706, the proton-shuttling species protonates the DIC species to form carbonic acid $H_2CO_3$. Thus, the brine loop allows for BPMED 708 to indirectly protonate the DIC species.

In the indirect protonation configuration where the flash tank 710 is excluded, dissolving tank 706 can receive a water stream 728, high solids stream 752 comprising crystalline carbonate hydrate 722 from chiller crystallizer 704, and a brine stream 735 from BPMED 708. In some cases, a polished aqueous solution can be used instead of or in addition to water stream 728. A polished aqueous solution can be substantially free of particulates and dissolved contaminants. Crystalline carbonate hydrate 722 dissolves in water and reacts with the proton-shuttling species in the brine stream 735 received from BPMED 708. Brine stream 735 can include a bisulfate-rich solution. For example, brine stream 735 can include potassium bisulfate $KHSO_4$ as the proton-shuttling species. For example, the sulfate ions $SO_4^{2-}$ can be protonated and combined with potassium ion $K^+$ to form potassium bisulfate $KHSO_4$ in brine stream 735.

The bisulfate-rich solution can react with carbonate in the dissolving tank 706 to yield a bisulfate-lean solution and carbonic acid. For example, potassium bisulfate $KHSO_4$ can react with potassium carbonate $K_2CO_3$ to yield potassium sulfate $K_2SO_4$ and carbonic acid $H_2CO_3$. As a result, pH will be reduced. The carbonic acid will have sufficient equilibrium $CO_2$ partial pressures (e.g., less than 1 bar) to cause dissociation into water and gaseous $CO_2$. Dissolving tank 706 can partially or fully release a gaseous $CO_2$ stream 736. Reactions in dissolving tank 706 also form an ED feed solution 726. ED feed solution 726 can include a bisulfate-lean solution. For example, ED feed solution 726 can include potassium sulfate with a mixture of other components such as potassium bisulfate and water. Dissolving tank 706 is configured to flow ED feed solution 726 to a BPMED 708.

In some implementations, brine stream 735 can include between about 1 M to about 2.5 M sulfate and bisulfate. For example, brine stream 735 can include about 1 M potassium sulfate $K_2SO_4$ concentration and potassium bisulfate. In another example, brine stream 735 can include about 2.5 M sodium sulfate $Na_2SO_4$ and sodium bisulfate. In some cases, brine stream 735 and ED feed solution 726 can include other sulfate or bisulfate concentrations (or both), depending on the operating temperature of BPMED 708 and conversion of sulfate to bisulfate in BPMED 708. In some cases, the brine stream 735 can include a $KNaSO_4$ concentration of 1 M.

Figure 8:
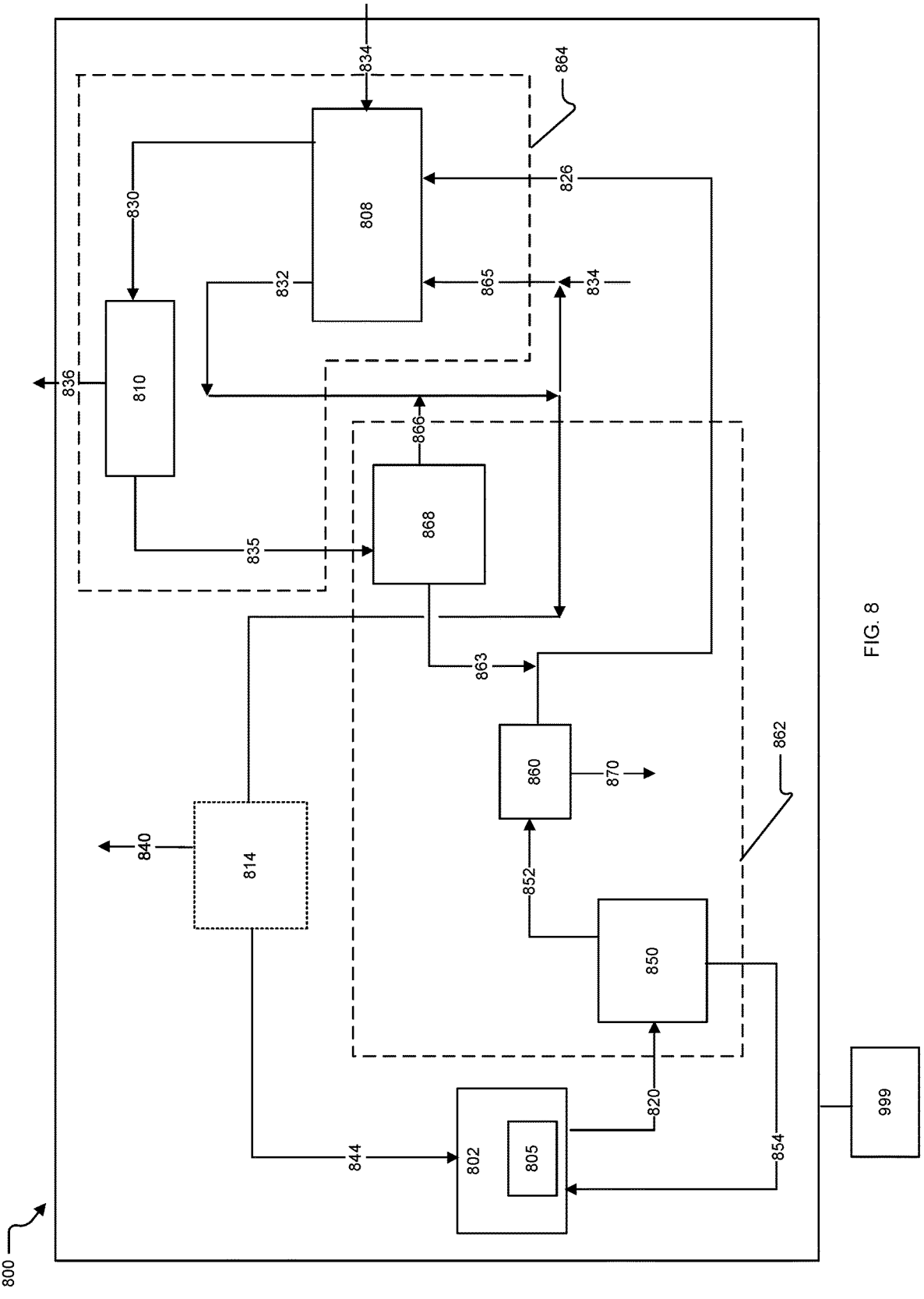
FIG. 8 is a block flow diagram illustrating an example electrochemical system for regenerating capture solution and recovering $CO_2$ by employing a nanofiltration unit and a reverse osmosis unit.

FIG. 8 is a block flow diagram illustrating an example electrochemical system 800 for regenerating capture solution and recovering $CO_2$ by employing a nanofiltration unit 850 and a reverse osmosis unit 868. In some cases, electrochemical system 800 can be advantageous because the nanofiltration unit 850 and reverse osmosis unit 868 eliminates the need for solids in the process and can reduce the amount of water needed to form hydroxide in BPMED 808. BPMED 808 is an example of an ED unit that employs BPMs and CEMs, but in some cases, regeneration subsystem 864 can include a different ED unit (e.g., an ED unit that includes one or more CEMs, AEMs, BPMs or a combination thereof). Nanofiltration unit 850 can produce carbonate concentrations of up to approximately 2 M. Reverse osmosis unit 868 can endure operating at a high pH (e.g., pH greater than 10) and can allow for excess water to be easily removed or integrated to maintain water balance. Electrochemical system 800 includes a $CO_2$ capture subsystem 802 fluidly coupled to a carbonate separation subsystem 862 and a regeneration subsystem 864. Carbonate separation subsystem 862 includes a nanofiltration unit 850 fluidly coupled to a reverse osmosis unit 868 and a BPMED 808. Nanofiltration unit 850 can receive a carbonate-rich capture solution 820 from $CO_2$ capture subsystem 802. In some implementations, $CO_2$ capture subsystem 802 can include one or more air contactors 805. The air contactors 305 can include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 805 can include single or multi cell air contactors, dual cell air contactors, dual flow air contactors, or a combination thereof. The air contactors can operate in crossflow, countercurrent flow, co-current flow, or a combination thereof.

Carbonate-rich capture solution 820 can be an aqueous mixture comprising primarily carbonate ions, alkaline metal ions, alkaline metal carbonate (e.g., $K_2CO_3$, $Na_2CO_3$), or a combination thereof. Carbonate-rich capture solution 820 can also include other components in smaller amounts, such as hydroxide ions, alkali metal hydroxide (e.g., KOH, NaOH), water, and impurities. For example, carbonate-rich capture solution 820 can comprise between 0.1 M to 6 M $K_2CO_3$ and between 1 M to 10 M KOH. In another implementation, carbonate-rich capture solution 820 can comprise an aqueous $Na_2CO_3$—NaOH mixture. In some implementations, carbonate-rich capture solution can comprise a mixture of $K_2CO_3$ and $Na_2CO_3$.

Nanofiltration unit 850 can concentrate carbonate via selective rejection. Nanofiltration unit 850 can include one or more filtration membranes that are impermeable to or select for large divalent ions such as carbonate ions. Nanofiltration membranes can have an inherent surface charge, making them particularly suitable for separating ion mixtures. Rejection of species can depend on size, ionic charge, and membrane affinity. Nanofiltration unit 850 can include membranes that have a wide pH tolerance and are durable enough to operate at a pH ranging from 0 to 14. In some implementations, nanofiltration unit 850 can include membranes that are operable at a pH range of 3 to 14. In some implementations, nanofiltration unit 850 can include membranes that are stable handling hydroxide concentrations between about 4% to about 20%. In some implementations, nanofiltration unit 850 can reject 85% to 100% of divalent ions (e.g., carbonate ions) to yield a nanofiltration (NF) retentate 852. In some cases, nanofiltration unit 850 can reject between 50% to 100% of divalent ions. In some cases, nanofiltration unit 850 can include a forward osmosis-style filtration unit that employs a draw solution and a pressure gradient to yield nanofiltration retentate 852 that is carbonate-rich. Nanofiltration unit 850 can include a plate and frame module that holds a number of nanofiltration membranes (e.g., flat membrane sheets) clamped together with spacers and supports.

Nanofiltration unit 850 can receive carbonate-rich capture solution 820 as a feed. Filtration membranes in nanofiltration unit 850 can select for and reject carbonate ions, thereby producing a nanofiltration retentate 852 comprising primarily a carbonate-rich mixture and a nanofiltration permeate 854 comprising primarily a hydroxide-rich mixture. For example, nanofiltration unit 850 can receive $K_2CO_3$-rich solution as a feed and can then produce concentrated $K_2CO_3$ as nanofiltration retentate 852 and KOH as nanofiltration permeate 854. Nanofiltration retentate 852 can include a higher carbonate concentration than carbonate-rich capture solution 820. In some implementations, nanofiltration retentate 852 can comprise approximately between 0.5 M to 6 M $K_2CO_3$. In some implementations, nanofiltration unit 850 can receive a $Na_2CO_3$-rich capture solution as feed and produce concentrated $Na_2CO_3$ as nanofiltration retentate 852 and NaOH as nanofiltration permeate 854. In some implementations, nanofiltration unit 850 can produce a nanofiltration retentate 852 that includes mixture of $K_2CO_3$ and $Na_2CO_3$.

In some implementations, nanofiltration retentate 852 is sent to BPMED 808 as ED feed solution 826. In some implementations, nanofiltration retentate 852 can be flowed to an ion exchanger 860 to reduce or remove at least a portion of undesirable divalent and multivalent cations (e.g., $Ca^{2+}$, $Mg^{2+}$, $Sr^{2+}$, $Ba^{2+}$, iron, zinc, etc.) in ED feed solution 826. Trapped ions can be removed from ion exchanger 860 by using a new column and regenerating the used column by displacing trapped ions with an acid or a base. Regenerating the used column can produce ion exchange regenerate waste stream 870 that includes waste salts.

Regeneration subsystem 864 includes an BPMED 308 fluidly coupled to a flash tank 810 and reverse osmosis (RO)

unit 868. Together, process streams flowing to and from BPMED 808, flash tank 810, and reverse osmosis unit 868 form a brine loop in which the DIC is protonated and $CO_2$ is released. ED feed solution 826 can include a bicarbonate $HCO_3^-$-rich solution with a mixture of other components such as carbonate and water. Each cell of BPMED 808 can be arranged in a configuration that includes alternating BPMs and CEMs. The electrodes are operable to apply an electric potential to enable salt-splitting and acid-base recovery. BPMED 808 can include multiple feed-release compartments and alkaline regeneration compartments defined by BPMs and CEMs.

BPMED 808 is configured to receive ED feed solution 826 and a water stream 834 in one or more feed-release compartments. The BPMs of BPMED 808 enable a water-splitting reaction that splits water into hydroxyl ions and protons. BPMED 808 enables a salt-splitting reaction that splits salt into its cation and anion. The CEMs are operable to transfer the cation into the alkaline regeneration compartments. In the alkaline regeneration compartments, the cation combines with the hydroxyl ions to form a first ED product stream 832 having a hydroxide concentration between 0.5 M and 10 M. For example, ED feed solution 826 can include a potassium bicarbonate $KHCO_3$-rich solution. The CEMs of BPMED 308 select for potassium ions $K^+$ and transport them into the alkaline regeneration compartments where $K^+$ combines with $OH^-$ to form KOH in first ED product stream 832. In the feed-release compartments, the bicarbonate $HCO_3^-$ ions are protonated directly in BPMED 808 to form a second ED product stream 830 comprising carbonic acid $H_2CO_3$. In some cases, CEMs are operable to transfer potassium ions $K^+$, sodium ions $Na^+$, or a combination thereof.

In some implementations, reduction in pH can cause carbonic acid to dissociate and release $CO_2$ within the cells of BPMED 808. In some implementations, BPMED 808 can include an inter-membrane distance of less than 1 mm between each BPM and CEM. For example, the BPM can be positioned 0.7 mm from the CEM. In some implementations, current densities between 50 $mA/cm^2$ and 2000 $mA/cm^2$ can be applied to BPMED 808.

Second ED product stream 830 generated by BPMED 808 can include an aqueous mixture with carbonic acid $H_2CO_3$ and bicarbonate $HCO_3^-$. For example, second ED product stream 830 can include an aqueous mixture of carbonic acid $H_2CO_3$, and potassium bicarbonate $KHCO_3$. Carbonic acid $H_2CO_3$ dissociates into $CO_2$ and water. Second ED product stream 830 can be sent to flash tank 810 whereas a gaseous $CO_2$ stream 836 is partially or fully released from flash tank 810 and sent to one or more downstream processing units described in ensuing implementations (e.g., compression unit, electroreduction subsystem, carbon products manufacturing system, syngas generation reactor). A brine stream 835 including an aqueous mixture of bicarbonate $HCO_3^-$ can be sent to a reverse osmosis (RO) unit 868.

Reverse osmosis unit 868 has a primary function of removing water from the brine loop to maintain the water balance. Membranes in reverse osmosis unit 868 can select for and reject carbonate ions, thereby producing an RO retentate 863 comprising a bicarbonate-rich solution and an RO permeate 866 comprising primarily water. RO retentate 863 can include a higher bicarbonate concentration than brine stream 835. In some implementations, RO retentate 863 can comprise potassium bicarbonate $KHCO_3$ concentrations of 2.4 M or lower. In some implementations, RO retentate 863 can comprise sodium bicarbonate $NaHCO_3$ concentrations of 2.4 M or lower. In some implementations, RO retentate 863 can comprise a mixture of potassium bicarbonate $KHCO_3$ and sodium bicarbonate $NaHCO_3$ at concentrations of 2.4 M or lower. RO retentate 863 can then be combined with NF retentate 852 to form ED feed stream 826, thereby completing the brine loop of regeneration subsystem 864. Water in RO permeate 866 can be integrated with the caustic loop to produce hydroxide in BPMED 808.

The first ED product stream 832 can include an aqueous mixture with hydroxide as a predominant species. For example, first ED product stream 832 can include an aqueous solution of potassium hydroxide KOH, NaOH, or a combination thereof. First ED product stream 832 can be returned to $CO_2$ capture subsystem 802 from BPMED 808 as a $CO_2$ capture solution 844. In some implementations, $CO_2$ capture solution 844 can include a hydroxide concentration between 0.5 M and 10 M. In some implementations, regeneration subsystem 864 can optionally include an auxiliary caustic evaporator 814 to remove water 840 from $CO_2$ capture solution 844. Auxiliary caustic evaporator 314 can include a mechanical vapour recompression (MVR) evaporator, a multi-effect evaporator, or a combination thereof. In such implementations, $CO_2$ capture solution 844 includes a carbonate-lean mixture and has a higher hydroxide concentration than first ED product stream 832. Together, process streams flowing to and from auxiliary caustic evaporator 814, $CO_2$ capture subsystem 802, carbonate separation subsystem 862, and BPMED 808 form a caustic loop in which a capture solution is regenerated.

In some implementations, water in RO permeate 866 can be combined with first ED product stream 832. A portion of the combined stream can be returned to BPMED 808 as an ED recycle stream 865 and the other portion of the combined stream can be returned to the $CO_2$ capture subsystem 802 as $CO_2$ capture solution 844. In some implementations, processed water 834 can be added to ED recycle stream 865. For example, processed water 834 can include demineralized, distilled, filtered, purified, or treated water.

While electrochemical system 800 employs a reverse osmosis unit 868 and direct protonation, in some implementations, it can be advantageous to employ a reverse osmosis unit and indirect protonation as described in electrochemical system 200, 400 in FIG. 2 and FIG. 4. In some cases, indirect protonation can be advantageous because the DIC species is protonated outside of the ED unit, which avoids $CO_2$ degassing inside the cells of the ED unit. For example, carbonate hydrate can flow to an off-gassing tank. Together, process streams flowing to and from the off-gassing tank and the ED unit form a brine loop in which a proton-shuttling species (e.g., sulfate $SO_4^{2-}$, bisulfate $HSO_4^-$) is protonated in the ED unit, and protons are shuttled to the off-gassing tank via the proton-shuttling species. In some implementations, the proton-shuttling species can include $Cl^-$, F, Br, $HPO_4^{-2}$ and $H_2PO_4^{-1}$, acetate, and citrate. In the off-gassing tank, the proton-shuttling species protonates the DIC species to form carbonic acid $H_2CO_3$. Thus, the brine loop allows for the ED unit to indirectly protonate the DIC species.

In an indirect protonation configuration, a reverse osmosis unit can receive the brine stream from the ED unit and produce a RO retentate comprising primarily bisulfate and a RO permeate comprising primarily water. The off-gassing tank can receive an NF retentate that is carbonate-rich from a nanofiltration unit, and the RO retentate that is bisulfate-rich from the RO unit. In the off-gassing tank, carbonate reacts with the proton-shuttling species. The RO retentate can include a bisulfate-rich solution. For example, the RO retentate can include potassium bisulfate $KHSO_4$ as the proton-shuttling species. For example, the sulfate ions $SO_4^{2-}$ can be protonated and combined with potassium ion $K^+$ to form potassium bisulfate $KHSO_4$ in the ED unit. The potassium bisulfate $KHSO_4$ can then be selected for, thereby producing an RO retentate that includes a bisulfate-rich solution. The bisulfate-rich solution can react with carbonate in the off-gassing tank to yield a bisulfate-lean solution and carbonic acid. For example, potassium bisulfate $KHSO_4$ can react with potassium carbonate $K_2CO_3$ to yield potassium sulfate $K_2SO_4$ and carbonic acid $H_2CO_3$. As a result, pH will be reduced. The carbonic acid will have sufficient equilibrium $CO_2$ partial pressures (e.g., less than 1 bar) to cause dissociation into water and gaseous $CO_2$. The off-gassing tank can partially or fully release a gaseous $CO_2$ stream. Reactions in the off-gassing tank also form an ED feed solution. The ED feed solution can include a bisulfate-lean solution. For example, the ED feed solution can include potassium sulfate with a mixture of other components such as potassium bisulfate and water. The off-gassing tank is configured to flow ED feed solution to an ED unit.

FIG. 9 is a schematic diagram of an example BPMED 900 with a membrane stack including CEMs 906 alternating with BPMs 908. The BPMED 900 may include more or fewer CEMs 906 and BPMs 908 than shown in FIG. 9. The membrane stack is positioned between a cathode 902 and an anode 904. The membranes define alternating feed-release (proton generating) compartments 910 and alkaline regeneration (hydroxide generation) compartments 912. BPMED 900 can be included as an element of a regeneration subsystem in an electrochemical system. For example, BPMED 108, 208, 308, 408, 708, 808 in each respective regeneration subsystem can include at least some of the same elements as BPMED 900.

To regenerate a capture solution such as a first product stream 930 that includes an alkali hydroxide MOH, BPMs 908 provide hydroxyl ions $OH^-$ in the alkaline regeneration compartments 912 and protons $H^+$ in the feed-release compartments 910 via water dissociation. The generated protons displace cations $M^+$ such as alkali metal ions (e.g., $K^+$, $Na^+$, etc.) which are selectively transported across the CEMs 906 to the alkaline regeneration compartments 912. For example, to regenerate potassium hydroxide (KOH) in a capture solution as first product stream 930, BPMs 908 provide hydroxyl ions $OH^-$ and CEMs 906 allow potassium ions $K^+$ through to the alkaline regeneration compartments 912. Thus, alkali metal ions and hydroxyl ions form a first product stream 930 that includes a regenerated $CO_2$ capture solution with alkali hydroxide. First product stream 930 can flow from BPMED 900 to a $CO_2$ capture subsystem or to a caustic evaporator that is downstream.

Feed-release compartments 910 receive an ED feed solution 926 that can include a dissolved inorganic carbon species such as bicarbonate $HCO_3^-$ (for direct protonation) or a proton-shuttling species such as sulfate $SO_4^{2-}$ (for indirect protonation). BPMs 908 provide protons to feed-release compartments 910, and species in ED feed solution 926 is protonated to form a second product stream 932. Second product stream 932 can include carbonic acid $H_2CO_3$ (for direct protonation) or bisulfate $HSO_4^-$ (for indirect protonation). Second product stream 932 can flow from BPMED 900 to a flash tank or a dissolving tank that is downstream.

BPMED 900 can be selected or designed to have desirable characteristics such as low voltage drop (e.g., BPM voltage drop of less than 2 V and CEM voltage drop of less than 1 V) and high current density (e.g., BPM current density above 50 $mA/cm^2$). In some implementations, BPMED 900 can consist of a membrane stack comprising BPMs alternating with AEMs. BPMs 908 can include 3D junctions, planar junctions, or a combination thereof. BPMs 908 with 3D junctions have interlocking nanofibers to improve catalytic surface area and mechanical strength. 3D junctions can be manufactured by electrospinning. BPMs 908 with planar junctions have a catalytic layer sandwiched between a cation exchange layer and an anion exchange layer. In BPMs 908, the cation exchange layer is positioned on the side of cathode 902 and the anion exchange layer is positioned on the side of anode 904. Water dissociation occurs at the intervening catalytic layer and protons are transported through the cation exchange layer while hydroxyl ions are transported through the anion exchange layer. The membrane stack depicted in FIG. 9 is for illustrative purposes and can vary.

FIG. 10 is a schematic diagram of an example ED unit 1000 including a gas diffusion electrode (GDE) 1004. This configuration can be advantageous because it can enable high current densities and hydroxide concentrations of up to 35% w/w. This can lower capital costs, reduce water usage, and reduce water treatment costs. The membrane stack includes a CEM 1006 positioned between a cathode 1002 and GDE 1004. ED unit 1000 in FIG. 10 employs GDE 1004 as an anode but in some implementations, ED unit 1000 can employ GDE 1004 as the cathode. GDE 1004 includes a gas diffusion layer 1010 that supports a catalyst layer 1012. Gas diffusion layer 1010 is porous and allows movement of gas towards catalyst layer 1012. In some implementations, catalyst layer 1012 can include platinum or non-precious metal catalysts (e.g., nickel, nickel iron, cobalt, metal alloys). Since gas diffusion layer 1010 is hydrophobic, its pores are less likely to be blocked by the aqueous electrolyte solution and thus gas transport to the catalyst layer 1012 is maintained. In some cases, ED unit 1000 having a GDE 1004 can operate at a pH ranging between 0 to 14. Cathode 1002 and CEM 1006 define alkaline regeneration (hydroxide generation) compartment where capture solution is regenerated. CEM 1006 and GDE 1004 define a feed-release (proton generating) compartment where $CO_2$ formed. ED unit 1000 can be employed for direct protonation or indirect protonation of a DIC species. ED unit 1000 can be included as an element of a regeneration subsystem in an electrochemical system, such as any of electrochemical systems 100 to 400, 700, 800.

Direct protonation can be used to regenerate a $CO_2$ capture solution and recover gaseous $CO_2$. To regenerate a $CO_2$ capture solution such as first ED product stream 1032 that includes an alkali hydroxide MOH, ED unit 1000 receives a gaseous hydrogen feed stream 1024 and an ED feed solution 1026 that includes a carbonate-bicarbonate mixture into the feed-release compartment. ED unit 1000 receives water into the alkaline regeneration compartment. An electric potential is applied to ED unit 1000. A hydrogen $H_2$ oxidation reaction occurs at GDE 1004. The generated protons displace cations $M^+$ such as alkali metal ions (e.g., $K^+$, $Na^+$, etc.) which are selectively transported across the CEMs 1006 to the alkaline regeneration compartment.

At cathode 1002, a water dissociation reaction occurs to generate hydroxyl ions $OH^-$ and hydrogen $H_2$. In the alkaline regeneration compartment, the alkali metal ions $M^+$ and hydroxyl ions $OH^-$ form a first ED product stream 1032 that includes a regenerated capture solution with alkali hydroxide MOH and hydrogen $H_2$. For example, potassium ions $K^+$ can be transported across CEM 1006 to form a regenerated capture solution with potassium hydroxide KOH. First ED product stream 1032 can flow from ED unit 1000 to a separation unit where the hydrogen is separated from the regenerated $CO_2$ capture solution. $CO_2$ capture solution 1044 can then flow to an air contactor of $CO_2$ capture subsystem. In some implementations, the separated hydrogen can be recycled to GDE 1004 of ED unit 1000 as hydrogen feed stream 1024.

In the feed-release compartment, protons that displaced alkali metal ions acidify the carbonate-bicarbonate mixture to form gaseous carbon dioxide 1036 and a second ED product stream 1034 that includes water, bicarbonate $MHCO_3^-$, carbonic acid $H_2CO_3$, or a combination thereof. In some implementations, gaseous carbon dioxide 1036 can off gas through GDE 1004. In some cases, protonation in the feed-release compartment may not react to completion and bicarbonate $MHCO_3^-$ can leave ED unit 1000 through GDE 1004. In some cases, ED unit 1000 can be fluidly coupled to a downstream flash tank or off gassing tank for gaseous carbon dioxide to degas.

ED unit 1000 including GDE 1004 can be selected or designed to have a low voltage drop (e.g., CEM voltage drop of less than 1.6 V) and a high current density (e.g., current density between 50 mA/cm2 and 1000 mA/cm2).

Indirect protonation via a proton-shuttling species, such as sulfate, bisulfate, or a combination thereof, can be used to regenerate a $CO_2$ capture solution. In some cases, the proton-shuttling species can include F, Br, $HPO_4^{-2}$ and $H_2PO_4^-$ 1, acetate, citrate, or a combination thereof. To regenerate a $CO_2$ capture solution such as the first ED product stream that includes an alkali hydroxide MOH, the ED unit receives a gaseous hydrogen feed stream and an ED feed solution that includes a sulfate-bisulfate mixture into the feed-release compartment. The ED unit receives water into the alkaline regeneration compartment. An electric potential is applied to the ED unit. A hydrogen $H_2$ oxidation reaction occurs at the GDE. The generated protons displace cations $M^+$ such as alkali metal ions (e.g., $K^+$, $Na^+$, etc.) which are selectively transported across the CEMs to the alkaline regeneration compartment.

Reactions that occur at the cathode and in the alkaline regeneration compartment in the indirect protonation configuration are substantially the same as those that occur at the cathode and the alkaline regeneration compartment of the direct protonation configuration. The ED unit forms a first ED product stream that includes a regenerated capture solution with alkali hydroxide MOH and hydrogen $H_2$. The hydrogen is separated out in a separation unit and the regenerated capture solution is sent to the $CO_2$ capture subsystem.

In the indirect protonation configuration, in the feed-release compartment, protons that displaced alkali metal ions acidify the sulfate-bisulfate mixture to form a second ED product stream that includes water and bisulfate $MHSO_4$. In some cases, the second ED product stream can also include sulfuric acid $H_2SO_4$. The second ED product stream can then be sent to a dissolving tank where the bisulfate reacts with carbonate to yield carbonic acid $H_2CO_3$. The carbonic acid will have sufficient equilibrium $CO_2$ partial pressures to dissociate into water and gaseous $CO_2$. The dissolving tank can partially or fully release a $CO_2$ stream to recover for use in a downstream process.

Figure 11:
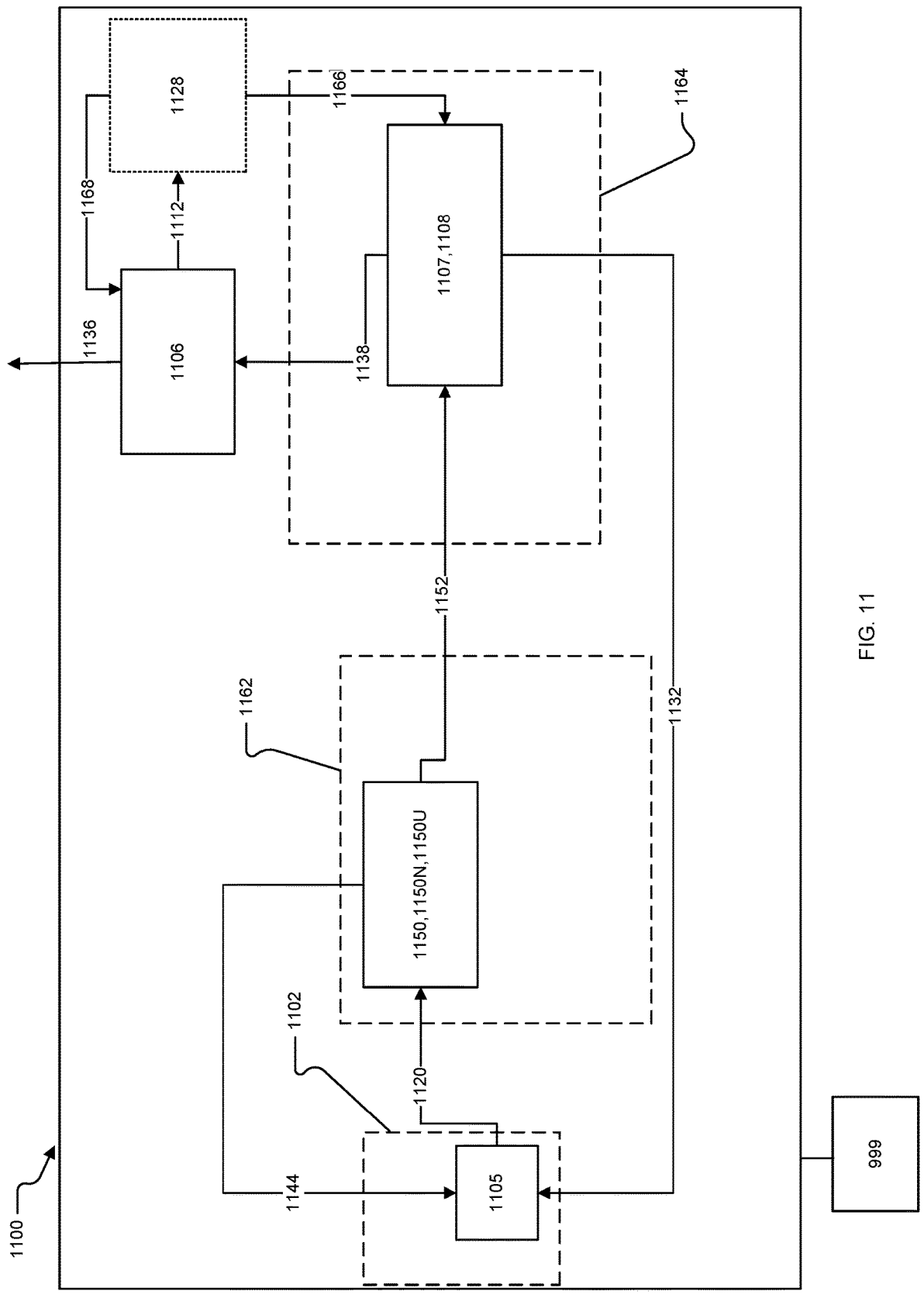
FIG. 11 is a block flow diagram illustrating an example electrochemical system for regenerating capture solution and recovering $CO_2$ by employing a filtration unit and using a swing in the pH of the feed provided to the ED unit.

FIG. 11 is a block flow diagram illustrating an example electrochemical system 1100 for regenerating capture solution and recovering $CO_2$ by employing a filtration unit 1150 and using a swing in the pH of the feed provided to the ED unit 1107. The electrochemical system 1100 includes a $CO_2$ capture subsystem 1102, a carbonate separation subsystem 1162 and an ED subsystem 1164.

The $CO_2$ capture subsystem 1102 may include one or more air contactors 1105. The air contactors 1105 may include cooling-tower style gas-liquid contactors, spray towers, liquid-gas scrubbers, venturi scrubbers, packed towers, and other systems designed to remove at least a portion of a particular gas component from a larger gas stream using a liquid sorbent. The air contactors 1105 may include single cell air contactors, dual cell air contactors, dual flow air contactors, or a combination thereof. The air contactors 1105 can operate in a configuration that is crossflow, countercurrent flow, co-current flow, or a combination thereof. A $CO_2$ capture solution 1144 is an aqueous mixture comprising one or more of an alkaline metal carbonate (e.g., $K_2CO_3$, $Na_2CO_3$), water, a promoter, and other species in smaller amounts, such as hydroxide ions, alkali metal hydroxide (e.g., KOH, NaOH), and impurities. In the air contactors 1105, the carbonate and water of the $CO_2$ capture solution 1144 can react with $CO_2$ from a dilute gas source (e.g., atmospheric or ambient air) to form bicarbonate ions ($HCO_3^-$), according to the following reaction.

Reaction 9: $CO_3^- + H_2O + CO_2 \rightarrow HCO_3^-$

The bicarbonate ions may be neutralised by the alkali metal hydroxides of the $CO_2$ capture solution 1144 to form metal carbonates/bicarbonates (e.g., $K_2CO_3/KHCO_3$, $Na_2CO_3/NaHCO_3$). In one possible configuration, carbonate reacts with $CO_2$ from the dilute gas source and water in the $CO_2$ capture solution 1144 to form bicarbonate ions. In one possible configuration, water in the $CO_2$ capture solution 1144 can react in the air contactors 1105 with $CO_2$ from the dilute gas source to form carbonic acid ($H_2CO_3$) which reacts with the alkali metal hydroxides of the $CO_2$ capture solution 1144 to form metal carbonates/bicarbonates (e.g., $K_2CO_3/KHCO_3$, $Na_2CO_3/NaHCO_3$).

The $CO_2$ capture kinetics of carbonate may be improved by the introduction of an additive such as a promoter species in the $CO_2$ capture solution 1144. Non-limiting examples of promoters for boosting $CO_2$ capture with carbonate include carbonic anhydrase, amines (primary, secondary, tertiary), zwitterionic amino acids, and boric acid. The resulting capture solution 1120 produced by the $CO_2$ capture subsystem 1102 includes carbonates and bicarbonates and includes the promoter as well. An example composition of the capture solution 1120 may include $K_2CO_3/KHCO_3$ and a promoter. The capture solution 1120 may have a pH in the range of 11-13 and may have little residual hydroxide from the $CO_2$ capture solution 1144.

Referring to FIG. 11, the carbonate separation subsystem 1162 includes a filtration unit 1150 fluidly coupled to the $CO_2$ capture subsystem 1102 to receive the capture solution 1120 from the air contactors 1105. The filtration unit 1150 is fluidly coupled to the ED subsystem 1164. The filtration unit 1150 may be any device used for separating the capture solution 1120 into a retentate 1152 and a permeate. In the configuration of FIG. 11, the permeate is shown flowing from the filtration unit 1150 to the air contactors 1105 as part of the $CO_2$ capture solution 1144, and may therefore sometimes be referred to herein as "the permeate 1144". In one possible configuration, the filtration unit 1150 is a nanofiltration unit 1150N. In another possible configuration, the filtration unit 1150 is an ultrafiltration unit 1150U. In yet another possible configuration, the filtration unit 1150 includes a combination of nanofiltration and ultrafiltration. For example, in one such configuration, the filtration unit 1150 may be a nanofiltration unit 1150N that is preceded by, or downstream of, a primary filtration system (e.g., an ultrafiltration system) configured to remove solids including, but not limited to, silicates, water hardness, promoters, surfactant additives, or salts that cause salinity concerns. This configuration of the filtration unit 1150 may enable the electrochemical system 1100 to use non-potable water sources such as brackish water, for example as a source of makeup water for the electrochemical system 1100. This configuration may protect the filtration unit 1150N from potentially harmful contaminants and may prevent carryover of species to downstream processes and units.

The filtration unit 1150 may include one or more filtration membranes that are impermeable to or selective for large ions such as carbonate and bicarbonate ions. The filtration unit 1150 may receive the capture solution 1120 as a feed solution. The filtration membranes in the filtration unit 1150 can select for and reject salt species including carbonate and bicarbonate ions to thereby produce the retentate 1152 comprising primarily concentrated metal carbonates/bicarbonates (e.g., $K_2CO_3/KHCO_3$, $Na_2CO_3/NaHCO_3$). The filtration membranes in the filtration unit 1150 can reject larger molecules like those of the promoter species to thereby produce the permeate 1144 (draw-out solution) of the filtration unit 1150. The permeate 1144 comprises the promoter used for boosting $CO_2$ capture with carbonate in the $CO_2$ capture solution 1144. The permeate 1144 including the promoter is returned to the $CO_2$ capture subsystem 1102 to be used with the $CO_2$ capture solution 1144.

In one possible configuration, and referring to FIG. 11, the filtration unit 1150 receives a $K_2CO_3/KHCO_3$/promoter feed solution. The filtration unit 1150 then produces a concentrated potassium carbonate/bicarbonate (e.g., $K_2CO_3/KHCO_3$) solution as the retentate 1152 and a promoter-rich solution as the permeate 1144. In another possible configuration, the filtration unit 1150 receives a $Na_2CO_3/NaHCO_3$/promoter feed solution. The filtration unit 1150 then produces a concentrated sodium carbonate/bicarbonate (e.g., $Na_2CO_3/NaHCO_3$) solution as the retentate 1152 and a promoter-rich solution as the permeate 1144. In another possible configuration, the filtration unit 1150 receives a mixed $Na_2CO_3/NaHCO_3/K_2CO_3/KHCO_3$/promoter feed solution. The filtration unit 1150 then produces a sodium and potassium carbonate/bicarbonate (e.g., $Na_2CO_3/NaHCO_3/K_2CO_3/KHCO_3$) solution as the retentate 1152 and a promoter-rich solution as the permeate 1144.

The filtration unit 1150 may allow for selectively producing a particular concentration of carbonate/bicarbonate in the retentate 1152 without requiring water removal by evaporation to achieve saturation of the carbonate/bicarbonate. The filtration unit 1150 may include membranes that have a wide pH tolerance and are durable enough to operate at a pH ranging from 0 to 14. In some implementations, the filtration unit 1150 can include membranes that are operable at a pH range of 10 to 14. In some implementations, the filtration unit 1150 may reject at least 85% of large ions (e.g., carbonate/bicarbonate ions) to yield a retentate 1152 that is carbonate/bicarbonate-rich, and a permeate 1144 that is carbonate/bicarbonate-lean. In some cases, the filtration unit 1150 may reject between 50% to 100% of large ions. The permeate 1144 and/or the retentate 1152 may include small amounts of hydroxide. The filtration unit 1150 can include a plate and frame module that holds a number of filtration membranes (e.g., flat membrane sheets) clamped together with spacers and supports. In some implementations, the filtration unit 1150 can include a feed tank configured to receive the capture solution 1120 and a reject collection tank configured to receive the retentate 1152. The filtration unit 1150 may operate to increase the concentrations of carbonate and bicarbonate such that the carbonate/bicarbonate salts in the retentate 1152 are less soluble. By helping to separate out at least a portion of the promoter so that it is not conveyed to the ED unit 1107, the filtration unit 1150 may serve to protect the sensitive promoter (e.g., carbonic anhydrase) so that it may be reused in the $CO_2$ capture subsystem 1102 and suffer less degradation than if it were to continue through to the ED unit 1107. By helping to separate out the promoter so that it is not conveyed to the ED unit 1107, the filtration unit 1150 may help to protect the membranes of the ED unit 1107, which may be sensitive to organic molecules and other ionic species.

In an alternate embodiment of the electrochemical system 1100, the filtration unit 1150 is absent. In such an embodiment, the species of promoter used in the $CO_2$ capture subsystem 1102 is capable of tolerating large variations or swings in pH that occur in the ED unit 1107. In such an embodiment, the electrochemical system 1100 is free of a filtration unit 1150, and the electrochemical system 1100 allows for the promoter in the capture solution 1120 to be sent through both the acid and base compartments of the ED unit 1107, to then return a promoter-rich stream to the air contactors 1105.

The concentrated carbonate/bicarbonate retentate 1152 forms an ED feed solution. The ED unit 1107 is configured to receive the ED feed solution. Referring to FIG. 11, the ED unit 1107 is or includes a BPMED 1108. The BPMED 1108 can include a stack of cells positioned between two electrodes. In some cases, the electrodes of the BPMED 1108 can be coupled to a low carbon intermittent electricity source (e.g., solar, wind, geothermal), in addition to or separate from other low carbon intensity sources of base load electricity (e.g., hydro, nuclear). Each cell can be arranged in a configuration that includes alternating membranes (BPMs and CEMs). The membranes define alternating feed-release (proton generating) compartments and alkaline generation (hydroxide generation) compartments. The electrodes are operable to apply an electric potential to enable salt-splitting and acid-base recovery. The BPMED 1108 can include multiple feed-release compartments and alkaline compartments defined by BPMs and CEMs.

The BPMED 1108 is configured to receive the retentate 1152 and a water stream in one or more of the feed-release compartments. The BPMs of the BPMED 1108 enable a water-splitting reaction that splits water into hydroxyl ions and protons. The BPMED 1108 enables a salt-splitting reaction that splits a salt into its cation and anion. The CEMs are operable to transfer the cation into the alkaline generation compartments.

To regenerate a capture solution, BPMs provide hydroxyl ions OH⁻ in the alkaline generation compartments and protons H⁺ in the feed-release compartments via water dissociation. The generated protons displace cations M⁺ such as alkali metal ions (e.g., K⁺, Na⁺, etc.) which are selectively transported across the CEMs to the alkaline generation compartments. For example, to provide potassium hydroxide (KOH) as a first product stream of the BPMED 1108, BPMs provide hydroxyl ions OH⁻ and CEMs allow potassium ions K⁺ through to the alkaline generation compartments. Thus, alkali metal ions and hydroxyl ions form a first ED product stream 1132 that includes an alkali hydroxide. The first ED product stream 1132 having hydroxide is returned to the $CO_2$ capture subsystem 1102 to be used with the $CO_2$ capture solution 1144 as part of a loop of regenerated $CO_2$ capture solution.

To generate a second ED product stream 1138, the feed-release compartments of the BPMED 1108 receive the ED feed solution that includes dissolved inorganic carbon species such as carbonate $CO_3^{2-}$ and bicarbonate $HCO_3^-$. The BPMs provide protons to the feed-release compartments, and the species in the ED feed solution are protonated to form the second ED product stream 1138. The second ED product stream 1138 includes carbonic acid $H_2CO_3$.

For example, in a potassium-based system, the CEMs of the BPMED 1108 select for potassium ions K⁺ and transport them into the alkaline generation compartments where K⁺ combines with OH⁻ to form KOH in the first ED product stream 1132. Thus, the first ED product stream 1132 may include an aqueous mixture with hydroxide as a predominant species. For example, the first ED product stream 1132 can include an aqueous solution of potassium hydroxide KOH. The first ED product stream 1132 can be returned to the $CO_2$ capture subsystem 1102 from the BPMED 1108 to be used with, or as part of, the $CO_2$ capture solution 1144. In the same example, in the feed-release compartments, the species in the ED feed solution can be protonated and combined with the cation to form the second ED product stream 1138. For example, the carbonate $CO_3^{2-}$ and bicarbonate $HCO_3^-$ ions of the ED feed solution can be protonated to form primarily carbonic acid $H_2CO_3$ in the second ED product stream 1138.

Referring to FIG. 11, the second ED product stream 1138 can flow from the ED unit 1107 to a degas scrubber 1106 that is downstream of the ED unit 1107. The degas scrubber 1106 is fluidly coupled to the BPMED 1108. The carbonic acid $H_2CO_3$ of the second ED product stream 1138 will have sufficient equilibrium $CO_2$ partial pressures (e.g., about 1 bar) to cause dissociation into water and gaseous $CO_2$ in the degas scrubber 1106. The degas scrubber 1106 can partially or fully release a gaseous $CO_2$ stream 1136. The gaseous $CO_2$ stream 1136 can be sent to one or more downstream processing units described herein (e.g., compression unit, purification unit, electroreduction subsystem, carbon products manufacturing system, syngas generation reactor).

The degas scrubber 1106 provides a residual product stream 1112 including primarily water which can be flowed directly to the BPMED 1108. In configurations where it is desired to prevent carbonate $CO_3^{2-}$ and bicarbonate $HCO_3^-$ ions in the residual product stream 1112 from flowing to the alkaline compartments of the BPMED 1108, the electrochemical system 1100 may include a reverse-osmosis (RO) unit 1128, an example of which is shown in FIG. 11. In such an embodiment, the residual product stream 1112 is supplied indirectly, via the RO unit 1128, to the BPMED 1108. The RO unit 1128 has a primary function of removing carbonate $CO_3^{2-}$ and bicarbonate $HCO_3^-$ ions from the residual product stream 1112. Membranes in the RO unit 1128 can select for and reject carbonate and bicarbonate ions, thereby producing an RO retentate 1168 comprising a carbonate-bicarbonate mixture and an RO permeate 1166 comprising primarily water. The RO retentate 1168 may include higher concentrations of carbonate and bicarbonate than in the residual product stream 1112. The RO retentate 1168 is returned to the degas scrubber 1106 to remove carbonate $CO_3^{2-}$ and bicarbonate $HCO_3^-$ ions from the water of the residual product stream 1112. The RO permeate 1166, comprising water, is flowed to the BPMED 1108 to produce hydroxide in the BPMED 1108.

The electrochemical system 1100 of FIG. 11 allows for the electrochemical recovery of $CO_2$ from a capture solution using a pH swing. The protons generated from water splitting in the ED unit 1107 lower the pH of the retentate 1152 that feeds ED unit 1107 from the filtration unit 1150, to thereby generate a more acidic output by increasing the concentration of carbonic acid in the second ED product stream 1138. The ED unit 1107 also produces the first ED product stream 1132 with a higher pH due to its aqueous mixture with hydroxide as the predominant species. For example, the retentate 1152 feed solution to the ED unit 1107 may have a pH between 11-13. The pH is lowered by protonation in the ED unit 1107 to produce the second ED product stream 1138 having a pH between 5-8. In addition, the pH is increased by the hydroxyl anions generated from water splitting in the ED unit 1107 to produce the first ED product stream 1132 having a pH of about 14.

In the electrochemical system 1100 of FIG. 11, the retentate 1152 that feeds the ED unit 1107 can contain residual hydroxide, which may be neutralized by protons generated in the ED unit 1107 to form water. Thus, any residual hydroxide introduced into the ED unit 1107 via the retentate 1152 feed solution will serve as deadload for the electrochemical system 1100. In such a configuration, the electrochemical system 1100 is a two-step (capture+regeneration process) system, wherein the regeneration step is operating on a low pH solution with little residual hydroxide. Although described with reference to FIG. 11 as including a BPMED 1108, in some implementations, the ED unit 1107 of the electrochemical system 1100 may instead be, include or use a gas diffusion electrode (GDE) as disclosed herein.

Figure 12:
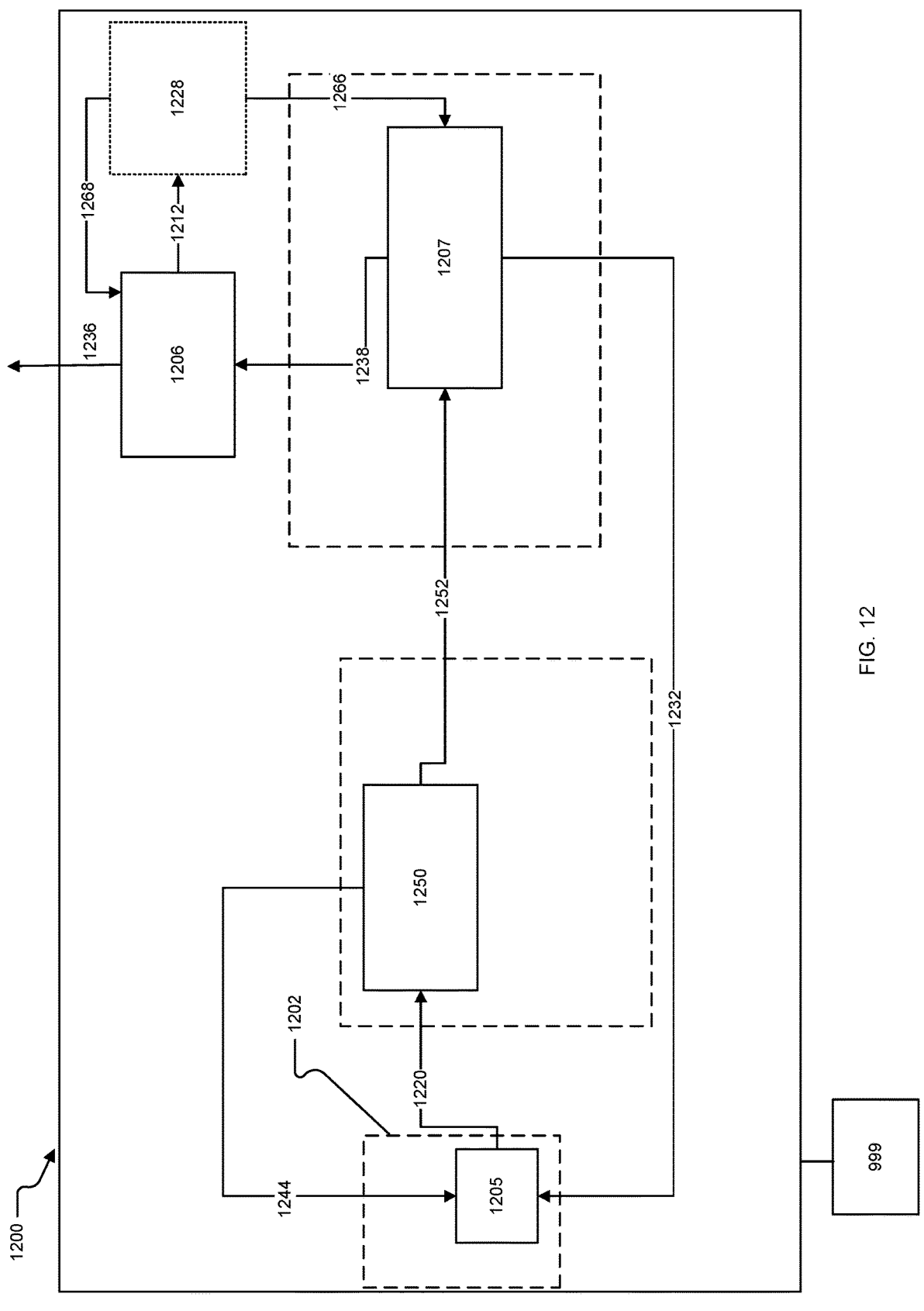
FIG. 12 is a block flow diagram illustrating an example electrochemical system for regenerating capture solution and recovering $CO_2$ by employing filtration unit and an ED unit.

FIG. 12 is a block flow diagram illustrating an example electrochemical system 1200 for regenerating capture solution and recovering $CO_2$ by employing an ED unit 1207. The electrochemical system 1200 of FIG. 12 has components, features, processes and/or functionality similar to the electrochemical system 1100 of FIG. 11. Therefore, the description above of the components, features, processes, advantages and/or functionality of the electrochemical system 1100 of FIG. 11 apply mutatis mutandis to the electrochemical system 1200 of FIG. 12. Reference numbers applied to features of FIG. 11 apply mutatis mutandis to the features of electrochemical system 1200 of FIG. 12.

Referring to FIG. 12, the $CO_2$ capture solution 1244 is an aqueous mixture comprising a capture solvent, such as an amino acid or amine. In the air contactors 1205, the water and capture solvent of the of the $CO_2$ capture solution 1244 reacts with $CO_2$ from a dilute gas source to form bicarbonate ions ($HCO_3^-$). For example, an amine (AMP) capture solvent can react with $CO_2$ and water to form bicarbonate according to the reaction below:

$$HO-\underset{H_2N}{\overset{CH_3}{\diagdown}}CH_3 + CO_2 + H_2O \rightleftharpoons HO-\underset{H_3N^+}{\overset{CH_3}{\diagdown}}CH_3 + HCO_3^-$$

In some cases, the reaction may not go to completion and the resulting bicarbonate-rich capture solution 1220 produced by the $CO_2$ capture subsystem 1202 can include unreacted capture solvent. An example composition of the bicarbonate-rich capture solution 1220 may be primarily $HCO_3^-$/capture solvent. The filtration unit 1250 may receive the bicarbonate-rich capture solution 1220 as a feed solution. The filtration membranes in the filtration unit 1250 can select for and reject salt species including bicarbonate ions to thereby produce the retentate 1252 comprising primarily concentrated bicarbonate. The filtration membranes in the filtration unit 1250 produces the permeate which can comprise the capture solvent used in the $CO_2$ capture solution 1144. The permeate including the capture solvent is fed back to the $CO_2$ capture subsystem 1202 to be used with the $CO_2$ capture solution 1244. Water may be added to the electrochemical system 1200 at a number of locations, for example it may be added to the $CO_2$ capture solution 1244 or to the basins of the air contactors 1205 to make up for losses in the air contactors 1205.

Referring to FIG. 12, the bicarbonate-rich retentate 1252 is provided as a feed solution to the ED unit 1207, where a water-splitting reaction generating protons allows for the protonation of the bicarbonate-rich feed solution to form an ED product stream 1238 comprising primarily carbonic acid. The hydroxyl ions and protons generated by water splitting in the ED unit 1207 may be provided as a water ED product stream 1232 that is returned to the $CO_2$ capture subsystem 1202 to be used with the $CO_2$ capture solution 1244 as part of a loop of regenerated $CO_2$ capture solution. The ED product stream 1238 can flow from the ED unit 1207 to a degas scrubber 1206 that is downstream of the ED unit 1207. The degas scrubber 1206 is fluidly coupled to the ED unit 1207. The carbonic acid $H_2CO_3$ of the ED product stream 1238 will have sufficient equilibrium $CO_2$ partial pressures (e.g., about 1 bar) to cause dissociation into water and gaseous $CO_2$ in the degas scrubber 1206. Gaseous $CO_2$ 1236 is discharged from the degas scrubber 1206. The electrochemical system 1200 may be provided with a reverse-osmosis (RO) unit 1228, an example of which is shown in FIG. 12. The RO unit 1228 has a primary function of removing carbonate $CO_3^{2-}$ and bicarbonate $HCO_3^-$ ions from the residual product stream 1212 of the degas scrubber 1206. Membranes in the RO unit 1228 can select for and reject carbonate and bicarbonate ions, thereby producing an RO retentate 1268 comprising a carbonate-bicarbonate mixture and an RO permeate 1266 comprising primarily water. The RO retentate 1268 may include higher concentrations of carbonate and bicarbonate than in the residual product stream 1212. The RO retentate 1268 is returned to the degas scrubber 1206 to remove carbonate $CO_3^{2-}$ and bicarbonate $HCO_3^-$ ions from the water of the residual product stream 1212. The water of the RO permeate 1266 is flowed to the ED unit 1207 to produce hydroxyl ions and protons.

Thus, in the electrochemical system 1200 of FIG. 12, using amino acids and amines as the capture solvent may eliminate the need for an initial carbonate formation to then generate bicarbonate. The capture solvent can react with $CO_2$ and water to form bicarbonate ions directly, which may then be processed by the electrochemical system 1200 as described above.

Figure 13:
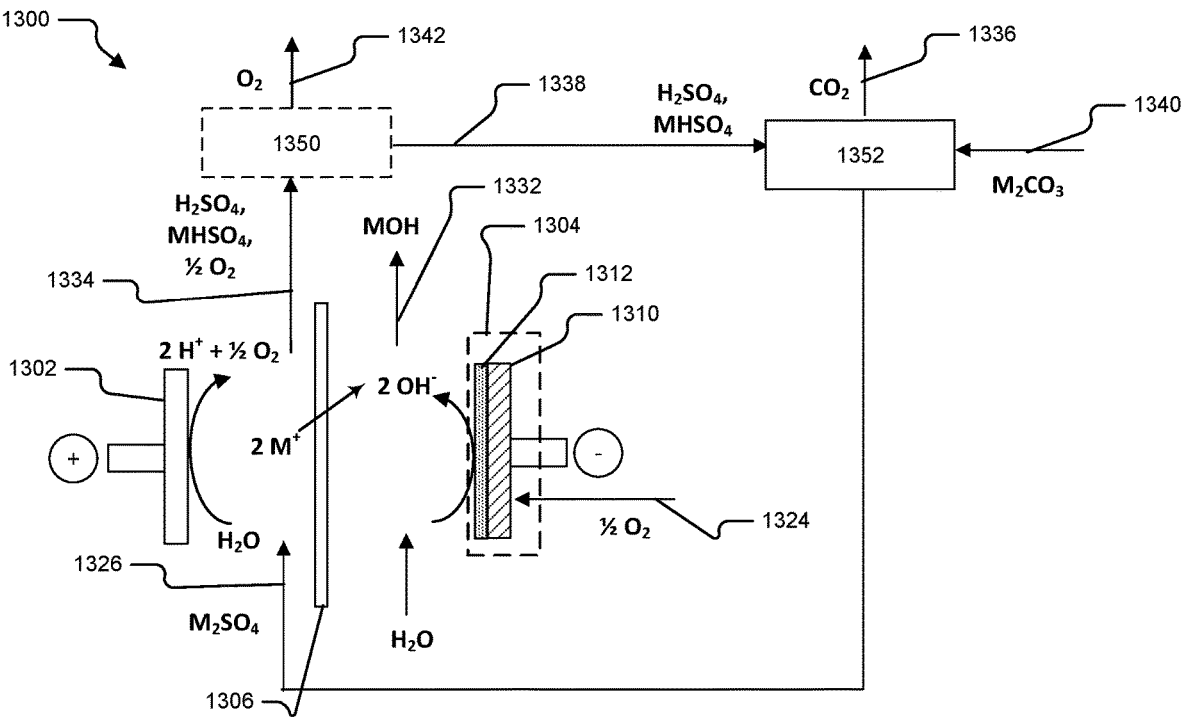
FIG. 13 is a schematic diagram of an example ED unit including a gas diffusion electrode.

FIG. 13 is a schematic diagram of an example ED unit 1300 including a GDE 1304. This configuration enables some of the similar advantages as ED unit 1000 including GDE 1004 in FIG. 10, such as high current densities and high hydroxide concentrations. The membrane stack includes a CEM 1306 positioned between an anode 1302 and GDE 1304. GDE 1304 includes a gas diffusion layer 1310 that supports a catalyst layer 1312. Gas diffusion layer 1310 is porous and allows movement of gas towards catalyst layer 1312. In some implementations, catalyst layer 1312 can include rhodium sulfide or various metals/metal alloys and their oxides including platinum, palladium, iridium, silver, rhodium or non-precious metal/metal oxide catalysts (e.g., nickel, iron, cobalt). In some cases, ED unit 1300 having a GDE 1304 can operate at a pH ranging between 0 to 14. GDE 1304 and CEM 1306 define an alkaline regeneration (hydroxide generation) compartment where capture solution is regenerated. CEM 1306 and anode 1302 define a feed-release (proton generating) compartment where products including oxygen and the proton-shuttling species are formed. ED unit 1300 can be employed for indirect protonation of a DIC species. ED unit 1300 can be included as an element of a regeneration subsystem in an electrochemical system, such as any of electrochemical systems 200, 400, 700, and 800.

Indirect protonation via a proton-shuttling species, such as sulfate, bisulfate, or a combination thereof, can be used to regenerate a $CO_2$ capture solution. In some cases, the proton-shuttling species can include $Cl^-$, F, Br, $HPO_4^{-2}$ and $H_2PO_4^{-1}$, acetate, citrate, or a combination thereof. ED unit 1300 constitutes part of a brine loop in an indirect protonation configuration. ED unit 1300 receives water and an ED feed solution 1326 that includes a sulfate-bisulfate mixture into the feed-release compartment. An electric potential is applied to ED unit 1300. An oxygen evolution reaction occurs at anode 1302. An oxygen evolution reaction is a reaction wherein molecular oxygen is generated by, for example, the electrochemical decomposition of water. In some implementations, a catalyst layer on the anode 1302 can include platinum group metals and their oxides such as iridium/iridium oxide or ruthenium/ruthenium oxide. In some implementations these catalysts may be incorporated into titanium/titanium oxide electrode to form a Dimensionally Stable Anode (DSA) or Mixed Metal Oxide (MMO) electrode. The generated protons displace cations $M^+$ such as alkali metal ions (e.g., $K^+$, $Na^+$, etc.) which are selectively transported across CEM 1306 to the alkaline regeneration compartment.

To regenerate a capture solution including an alkali hydroxide MOH, ED unit 1300 receives water and an oxygen feed 1324 into the alkaline regeneration compartment. In some implementations, air or an oxygen-containing feed stream can be used instead of or in combination with oxygen feed 1324. At GDE 1304, an oxygen reduction reaction occurs to generate hydroxyl ions $OH^-$. In the alkaline regeneration compartment, the alkali metal ions $M^+$ and hydroxyl ions $OH^-$ form a first ED product stream 1332 that includes a regenerated capture solution with alkali hydroxide MOH. For example, potassium ions $K^+$ can be transported across CEM 1306 to form a regenerated capture solution with potassium hydroxide KOH. First ED product stream 1332 can flow from ED unit 1300 to an air contactor of a $CO_2$ capture subsystem as regenerated $CO_2$ capture solution.

In the feed-release compartment, protons that displaced the alkali metal ions acidify the sulfate-bisulfate mixture to form a second ED product stream 1334 that includes evolved oxygen and bisulfate $MHSO_4$. In some cases, second ED product stream 1334 can also include sulfuric acid $H_2SO_4$. Second ED product stream 1334 can then be sent to a flash tank 1350 or a degas sparge where an oxygen stream 1342 can be degassed and removed. In some implementations, oxygen stream 1342 can be recycled to GDE 1304 and used instead of or in combination with oxygen feed 1324. After oxygen degasses from the flash tank 1350, a brine stream 1338 that includes a bisulfate-rich solution flows to a dissolving tank 1352. The dissolving tank 1352 receives a carbonate-hydrate salt from, for example, a carbonate separation subsystem that is upstream.

In the dissolving tank 1352, the bisulfate-rich solution can react with carbonate to yield a sulfate-rich (bisulfate-lean) solution and carbonic acid, according to reaction 5. For example, potassium bisulfate $KHSO_4$ can react with potassium carbonate $K_2CO_3$ to yield potassium sulfate $K_2SO_4$ and carbonic acid $H_2CO_3$. As a result, pH will be reduced. The carbonic acid will have sufficient equilibrium $CO_2$ partial pressures (e.g., 1 bara) to cause dissociation into water and a gaseous $CO_2$ stream 1336. The dissolving tank 1352 can partially or fully release a gaseous $CO_2$ stream 1336. Gaseous $CO_2$ stream 1336 can be sent to one or more downstream processing units described in ensuing implementations (e.g., compression unit, purification unit, electroreduction subsystem, carbon products manufacturing system, syngas generation reactor). Reactions in the dissolving tank 1352 also form an ED feed solution 1326. ED feed solution 1326 can include a sulfate-rich (bisulfate-lean) solution. For example, ED feed solution 1326 can include potassium sulfate with a mixture of other components such as potassium bisulfate and water.

Any one of electrochemical systems 100, 200, 300, 400, 600, 700, 800, 1100, 1200 in FIG. 1 through FIG. 4, FIG. 6 through FIG. 8, FIG. 11, FIG. 12, BPMED 900 in FIG. 9, ED unit 1000 in FIG. 10, ED unit 1300 in FIG. 13, and method 500 in FIG. 5 can include flowing a stream (e.g., carbonate-rich capture solution, crystalline carbonate hydrate, ED feed solution, product streams, etc.) to at least one auxiliary unit or auxiliary equipment, such as one or more buffer tanks, filtration systems, water treatment systems, holding tanks, mixing tanks, settlers, clarifiers, conveyors, or other units that facilitate the performance of the aforementioned electrochemical systems and methods.

In each of the electrochemical systems 100, 200, 300, 400, 600, 700, 800, 1100, 1200 in FIGS. 1-4, 6-8, 11, 12, BPMED 900 in FIG. 9, ED unit 1000 in FIG. 10, ED unit 1300 in FIG. 13, and method 500 of FIG. 5, additives such as simple salts (monovalent salts) can be included in one or more process streams. Simple salts such as sodium chloride can enhance performance by increasing conductivity and depressing the freezing point for the $CO_2$ capture sub system.

Primary caustic evaporators 112, 212, 312, 412, auxiliary caustic evaporators 114, 214, 314, 414, 714, 814 and crystallizers 104, 204, 304, 404, 704 in FIG. 1 through FIG. 4, and FIG. 7, and FIG. 8 each discharge one or more water streams. In some cases, the water streams can be partially or fully recycled in other units that require water as an influent stream, such as in BPMED units 108, 208, 308, 408, 708, 808, 900, $CO_2$ electroreduction unit 610, ED unit 1000, 1107, 1207, 1300, or dissolving tanks 106, 206, 306, 406, 608, 706, 1352. For example, in electrochemical system 100, primary caustic evaporator 112 discharges water stream 119 that can replace or combine with water stream 134 flowing to BPMED 108. For example, auxiliary caustic evaporator 114 discharges water stream 140 as a condensate, and water stream 140 can replace or combine with water stream 134 that feeds BPMED 108. In some cases, the discharged water steam may require treatment (e.g., in a filtration system or a water treatment system) before flowing to the downstream unit. Primary caustic evaporators 112, 212, 312, 412, auxiliary caustic evaporators 114, 214, 314, 414, 714, 814 can each remove up to 20 m³ of water per t-$CO_2$. In cases where additional water removal from the process is advantageous, water can be removed from the air contactor, crystallizer, nanofiltration units, reverse osmosis units, auxiliary units, or a combination thereof to maintain water balance in the process. For example, water removal from the process can be advantageous for adjusting to seasonal or diurnal weather conditions, fresh water needs to operate the ED unit, or a combination thereof. The water that is removed can be re-used elsewhere, stored for future use, or exported offsite.

In each of the electrochemical system 100, 200, 300, 400, 600, 700, 800, 1100, 1200 in FIG. 1 through FIG. 4, FIG. 6 through FIG. 8, FIG. 11, FIG. 12, BPMED unit 900 in FIG. 9, ED unit 1000 in FIG. 10, ED unit 1300 in FIG. 13, and method 500 of FIG. 5, one or more elements that flow or receive a water stream can flow or receive a water stream comprising a certain amount of suspended solids, dissolved solids, or impurities (or a combination thereof). For example, BPMED units 108, 208, 308, 408, 708, 808, 900, $CO_2$ electroreduction unit 610, and ED unit 1000, 1107, 1207, 1300 can receive respective water streams that each comprise varying amounts of suspended solids, dissolved solids, impurities, or combinations thereof. In some cases, BPMED units 108, 208, 308, 408, 708, 808, 900, $CO_2$ electroreduction unit 610, and ED unit 1000, 1107, 1207, 1300 can receive processed water streams. For example, processed water can include demineralized, distilled, filtered, purified, or treated water.

In each of the electrochemical systems 100, 200, 300, 400, 600, 700, 800, 1100, 1200 in FIG. 1 through FIG. 4, FIG. 6 through FIG. 8, FIG. 11, FIG. 12, water is fed to the BPMED to produce the first ED product stream and the second ED product stream. Water can be evaporated from one or more streams to maintain water balance. For example, water can be evaporated from one or more of the following streams: carbonate-rich capture solution 120, 220, 320, 420, 720, 820, retentate 352, 452, 852, or permeate 354, 454, 854. Water can be evaporated using an MVR evaporator, multi-effect evaporator multi-effect evaporator, or membrane filtration unit (e.g., ultrafiltration, nanofiltration, reverse osmosis, and the like). Water can also be evaporated through the air capture unit, with evaporation being dependent at least in part on the ambient environmental conditions.

In each of the electrochemical system 100, 200, 300, 400, 600, 700, 800, 1100, 1200 in FIG. 1 through FIG. 4, FIG. 6 through FIG. 8, FIG. 11, FIG. 12, BPMED 900 in FIG. 9, ED unit 1000 in FIG. 10, ED unit 1300 in FIG. 13, and method 500 of FIG. 5, while a wide range of hydroxide concentrations in the $CO_2$ capture solution can absorb some amount of $CO_2$ from dilute gas sources, the most effective compositions can be tuned for improving capture efficiency and accommodating certain operating environments. For example, $CO_2$ capture solution 144, 244, 344, 444, 618, 744, 844, 930, 1044, 1144, 1244, 1332 can include potassium hydroxide KOH concentrations ranging from 1 M to 8 M and potassium carbonate $K_2CO_3$ concentrations ranging form 0.1 M to 1.8 M. For example, $CO_2$ capture solution 144, 244, 344, 444, 618, 744, 844, 930, 1044, 1144, 1244, 1332 can include sodium hydroxide NaOH concentrations ranging from 1 M to 3 M and sodium carbonate $Na_2CO_3$ concentrations ranging from 0.1 M to 1 M.

For example, $CO_2$ capture solution 144, 244, 344, 444, 618, 744, 844, 930, 1044, 1144, 1244, 1332 can include a mixture comprising KOH concentrations ranging from 2.5 M to 5 M, NaOH concentrations ranging from 2.5 M to 1 M, potassium carbonate $K_2CO_3$ concentrations ranging form 0.1 M to 0.7 M, and sodium carbonate $Na_2CO_3$ concentrations ranging from 0.05 M to 0.2 M.

The electrochemical systems and methods described herein are modularly scalable and can therefore include a different number of elements and subsystems than the implementations illustrated in FIG. 1 through FIG. 13. For example, the electrochemical system can include multiple air contactors or ED units (or combinations of both) fluidly coupled to a carbonate separation subsystem. For example, the electrochemical system can include one or more caustic evaporators in the carbonate separation subsystem for each air contactor or ED unit. Combinations of multiple air contactors, multiple carbonate separation subsystems, and multiple regeneration subsystem and their respective elements can necessitate a distribution system that includes one or more trains that fluidly couple the systems and elements.

Figure 14:
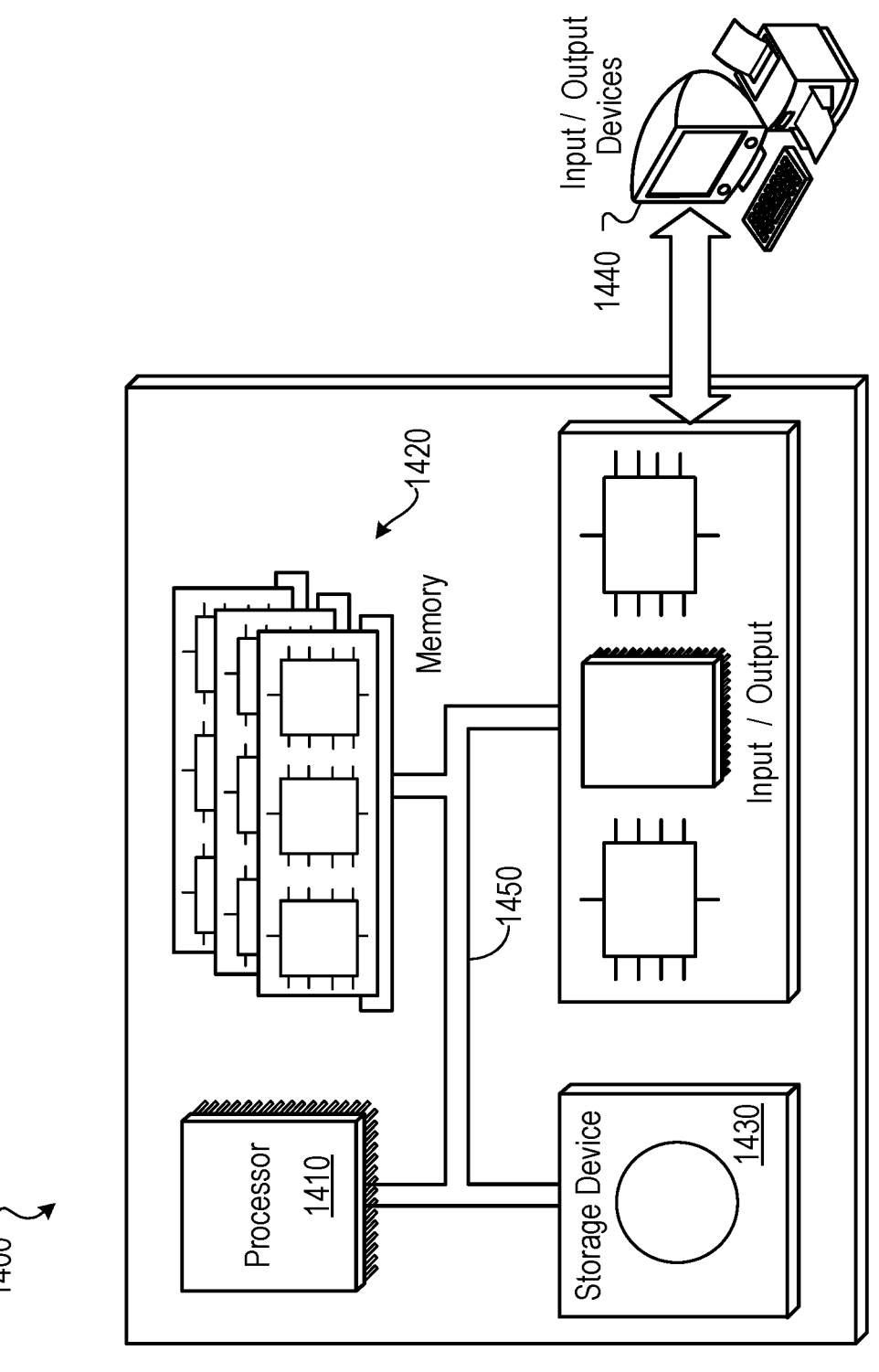
FIG. 14 is a schematic diagram of an example control system that can be used to execute computer-implemented processes according to the present disclosure.

FIG. 14 is a schematic diagram of a control system (or controller) 1400 for electrochemical systems for regenerating capture solution and recovering $CO_2$. The system 1400 can be used for the operations described in association with any of the computer-implemented methods described previously, for example as or as part of the control system 999 or other controllers described herein.

The system 1400 is intended to include various forms of digital computers, such as laptops, desktops, workstations, personal digital assistants, servers, blade servers, mainframes, and other appropriate computers. The system 1400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. The processor may be designed using any of a number of architectures. For example, the processor 1410 may be a CISC (Complex Instruction Set Computers) processor, a RISC (Reduced Instruction Set Computer) processor, or a MISC (Minimal Instruction Set Computer) processor.

In one implementation, the processor 1410 is a single-threaded processor. In some implementations, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one implementation, the memory 1420 is a computer-readable medium. In one implementation, the memory 1420 is a volatile memory unit. In some implementations, the memory 1420 is a non-volatile memory unit.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the system 1400. In one implementation, the input/output device 1440 includes a keyboard and/or pointing device. In some implementations, the input/output device 1440 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is fluidly coupled to the second device, flow may be through a direct connection or through an indirect connection via other devices and connections. In particular, a fluid coupling means that a direct or indirect pathway is provided for a fluid to flow between two fluidly coupled devices.

Terms used to describe acts or results regarding one or more of the process streams or elements of the aforementioned systems and methods (e.g., "flow", "form", "return", "receive", "produce", "release", "employ", "apply", "provide", "dissolve", and their respective gerunds) as used in this description are intended to include partial and complete acts or results. For example, flowing a solution to a subsystem can include flowing at least a portion or the entirety of the solution to the subsystem. For example, a subsystem that receives a solution can include a subsystem that receives a portion of the solution or the entirety of the solution.

A number of embodiments of the disclosure have been described. Nevertheless, it will be understood that various modifications may be made without departing from the spirit and scope of the disclosure. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A method comprising:
capturing carbon dioxide from a dilute gas source with a $CO_2$ capture solution to form a carbonate-rich capture solution;
increasing a concentration of carbonate in the carbonate-rich capture solution by crystallizing the carbonate-rich capture solution to form a mother liquor and a crystalline carbonate hydrate;
forming an electrodialysis (ED) feed solution;
flowing a water stream and the ED feed solution to a bipolar membrane electrodialysis (BPMED) unit;
applying an electric potential to the BPMED unit to form at least two ED product streams including a first ED product stream that includes a hydroxide; and
flowing the first ED product stream to use in capturing the carbon dioxide from the dilute gas source with the $CO_2$ capture solution.

2. The method of claim 1, wherein applying the electric potential to the BPMED unit includes applying at least a portion of the electric potential to the BPMED unit to form the first ED product stream and a second ED product stream.

3. The method of claim 2, wherein the second ED product stream includes carbonic acid, the method further comprising recovering at least a portion of a carbon dioxide gas stream from the second ED product stream.

4. The method of claim 3, wherein recovering the portion of the carbon dioxide gas stream from the second ED product stream includes recovering at least the portion of the carbon dioxide gas stream from the second ED product stream to form a brine stream, the method comprising:
dissolving the crystalline carbonate hydrate and mixing the dissolved crystalline carbonate hydrate with the brine stream to form the ED feed solution before flowing the water and the ED feed solution to the BPMED unit.

5. The method of claim 4, wherein recovering the portion of the carbon dioxide gas stream from the second ED product stream to form the brine stream includes recovering the portion of the carbon dioxide gas stream in a flash tank, the method further comprising:

flowing the brine stream from the flash tank to use in the dissolving the crystalline carbonate hydrate and mixing the dissolved crystalline carbonate hydrate with the brine stream to form the ED feed solution.

6. The method of claim 4, comprising:

flowing the carbon dioxide gas stream to a downstream process comprising at least one of: a compression unit, a fuel synthesis system, a syngas generation reactor, or an electrolyzer cell; and yielding one or more downstream products comprising at least one of: syngas, CO, $H_2$, or water.

7. The method of claim 2, wherein the second ED product stream includes a proton-shuttling species, the method further comprising:

reacting the second ED product stream with the portion of carbonate to recover the carbon dioxide gas and to form the ED feed solution.

8. The method of claim 7, wherein reacting the second ED product stream with the portion of carbonate to recover the carbon dioxide gas includes reacting the proton-shuttling species of the second ED product stream with the portion of carbonate to form carbonic acid and the ED feed solution.

9. The method of claim 7, comprising:

flowing the carbon dioxide gas to a downstream process comprising at least one of: a compression unit, a fuel synthesis system, a syngas generation reactor, or an electrolyzer cell; and yielding one or more downstream products comprising at least one of: syngas, CO, $H_2$, or water.

10. The method of claim 7, wherein reacting the second ED product stream with the portion of carbonate includes reacting the proton-shuttling species comprising bisulfate with the portion of carbonate.

11. The method of claim 1, comprising flowing the ED feed solution through an ion exchanger before flowing the water and the ED feed solution to the BPMED unit.

12. The method of claim 1, comprising separating a BPMED recycle stream from the first ED product stream, and returning the BPMED recycle stream to the BPMED unit.

13. The method of claim 2, comprising:

flowing the carbonate-rich capture solution through a nanofiltration unit to form a nanofiltration (NF) retentate stream comprising a carbonate-rich mixture, and to form a NF permeate stream comprising a hydroxide-rich mixture, and flowing the water and the ED feed solution to the BPMED unit includes flowing the ED feed solution comprising at least a portion of the NF retentate stream to the BPMED unit, the method further comprising:

recovering a carbon dioxide gas from the second ED product stream to form a brine stream;

flowing the brine stream to a reverse osmosis (RO) unit to form an RO retentate stream comprising a bicarbonate-rich solution and to form an RO permeate stream comprising water; and combining the RO retentate stream with the NF retentate stream to form the ED feed solution.

14. The method of claim 13, comprising flowing at least a portion of the NF permeate stream to use in the capturing the carbon dioxide from the dilute gas source with the $CO_2$ capture solution.

15. The method of claim 13, comprising flowing the NF retentate stream to an ion exchanger downstream of the nanofiltration unit to form an ion exchange regenerate waste stream and at least a portion of the ED feed solution.

16. The method of claim 13, comprising combining at least a portion of the RO permeate stream comprising water with the first ED product stream to form a BPMED recycle stream.

17. The method of claim 1, comprising increasing a concentration of hydroxide in the first ED product stream to form the $CO_2$ capture solution before capturing the carbon dioxide from the dilute gas source with the $CO_2$ capture solution.

18. The method of claim 1, comprising:

dissolving at least a portion of the crystalline carbonate hydrate to form a portion of carbonate; and mixing the portion of carbonate with a brine stream to form the ED feed solution.

19. The method of claim 2, comprising;

dissolving at least a portion of the crystalline carbonate hydrate to form a portion of carbonate; and reacting the portion of carbonate with a proton-shuttling species in the second ED product stream to form the ED feed solution.

20. The method of claim 1, comprising evaporating water from the carbonate-rich capture solution to increase a concentration of carbonate before crystallizing the carbonate-rich capture solution.

21. The method of claim 1, comprising combining at least a portion of the mother liquor with at least a portion of the $CO_2$ capture solution for use in the capturing the carbon dioxide from the dilute gas source with the $CO_2$ capture solution.

22. The method of claim 1, wherein increasing the concentration of carbonate in the carbonate-rich capture solution comprises crystallizing the carbonate-rich capture solution to form a low solids stream and a high solids stream comprising the crystalline carbonate hydrate, the low solids stream having a higher liquid-to-solid ratio than the high solids stream, the method further comprising:

dissolving the crystalline carbonate hydrate of the high solids stream in an aqueous solution and mixing with a brine stream to form the ED feed solution; and returning the low solids stream to use in the crystallizing of the carbonate-rich capture solution.

23. A method comprising:

capturing carbon dioxide from air with a $CO_2$ capture solution to form a carbonate-rich capture solution;

separating at least a portion of carbonate from the carbonate-rich capture solution;

reacting a proton-shuttling species with the portion of carbonate to recover carbon dioxide gas from the portion of carbonate and to form a feed solution;

flowing a water stream and the feed solution to an electrochemical cell;

applying an electric potential to the electrochemical cell to form a first product stream that includes a hydroxide and a second product stream comprising the proton-shuttling species;

flowing the second product stream comprising the proton-shuttling species to react the proton-shuttling species with the portion of carbonate; and flowing the first product stream to use in capturing the carbon dioxide from the air with the CO2 capture solution.

24. The method of claim 23, wherein:

reacting the proton-shuttling species with the portion of carbonate comprises reacting the proton-shuttling species with the portion of carbonate to form carbonic acid and the feed solution; and degassing the carbon dioxide gas from the carbonic acid.

25. The method of claim 24, wherein reacting the proton-shuttling species with the portion of carbonate comprises reacting the proton-shuttling species comprising at least one of sulfuric acid and bisulfate with the portion of carbonate to form the carbonic acid and the feed solution.

26. The method of claim 23, wherein separating the portion of carbonate from the carbonate-rich capture solution comprises crystallizing the portion of carbonate to form a crystalline carbonate hydrate.

27. The method of claim 26, wherein reacting the proton-shuttling species with the portion of carbonate comprises:

dissolving the crystalline carbonate hydrate to form a dissolved inorganic carbon; and reacting the dissolved inorganic carbon with the proton-shuttling species to form the feed solution and carbon dioxide gas, before the flowing the water stream and the feed solution to the electrochemical cell.

28. The method of claim 26, wherein reacting the proton-shuttling species with the portion of carbonate comprises:

dissolving the crystalline carbonate hydrate to form a dissolved inorganic carbon;

flowing the dissolved inorganic carbon to a flash tank; and reacting the dissolved inorganic carbon with the proton-shuttling species in the flash tank to form the feed solution and carbon dioxide gas, before the flowing the water stream and the feed solution to the electrochemical cell.

29. The method of claim 23, wherein flowing the water stream and the feed solution to the electrochemical cell comprises:

separating a recycle stream including hydroxide from the first product stream; and flowing the recycle stream to the electrochemical cell.

30. The method of claim 23, wherein flowing the water stream and the feed solution to the electrochemical cell comprises:

flowing the water to an alkaline regeneration compartment of the electrochemical cell, the alkaline regeneration compartment defined between a cathode and a cation exchange membrane of the electrochemical cell; and flowing the feed solution to a feed compartment of the electrochemical cell separate from the alkaline regeneration compartment.

31. The method of claim 30, wherein flowing the feed solution to the feed compartment comprises flowing the feed solution to the feed compartment defined between an anode of the electrochemical cell and the cation exchange membrane.

32. The method of claim 30, wherein:

flowing the feed solution to the feed compartment comprises flowing the feed solution to the feed compartment defined between an anion exchange membrane of the electrochemical cell and the cation exchange membrane; and applying the electric potential to the electrochemical cell comprises moving the proton-shuttling species across the anion exchange membrane into an acid compartment defined between the anion exchange membrane and an anode of the electrochemical cell.

33. The method of claim 30, wherein flowing the first product stream to use in capturing the carbon dioxide from the air comprises flowing the first product stream from the alkaline regeneration compartment of the electrochemical cell.

34. The method of claim 23, wherein flowing the first product stream to use in capturing the carbon dioxide from the air comprises:

separating the first product stream into a hydrogen stream and into the CO2 capture solution; and flowing the CO2 capture solution to use in capturing the carbon dioxide from the air.

35. The method of claim 23, wherein flowing the second product stream comprising the proton-shuttling species to react the proton-shuttling species with the portion of carbonate comprises:

separating the second product stream into an oxygen stream and into a proton-shuttling species stream; and flowing the proton-shuttling species stream to react the proton-shuttling species with the portion of carbonate.

36. The method of claim 26, wherein crystallizing the portion of the carbonate comprises crystallizing the portion of carbonate to form a mother liquor, the method comprising:

combining at least a portion of the mother liquor with at least a portion of the $CO_2$ capture solution for use in the capturing of carbon dioxide from the air with the $CO_2$ capture solution.

* * * * *